United States Patent [19]

Ozeki et al.

[11] Patent Number: 4,961,155

[45] Date of Patent: Oct. 2, 1990

[54] XYZ COORDINATES MEASURING SYSTEM

[75] Inventors: Osamu Ozeki; Kazunori Higuchi; Shin Yamamoto, all of Aichi, Japan

[73] Assignee: Kabushiki Kaisha Toyota Chuo Kenkyusho, Aichi, Japan

[21] Appl. No.: 246,131

[22] Filed: Sep. 19, 1988

[30] Foreign Application Priority Data

Sep. 19, 1987 [JP] Japan .................................. 62-235292
Sep. 19, 1987 [JP] Japan .................................. 62-235293
Sep. 19, 1987 [JP] Japan .................................. 62-235294

[51] Int. Cl.$^5$ ..................... G01B 11/00; G06F 15/46
[52] U.S. Cl. ............................. 364/559; 364/571.07; 364/474.37; 73/865.8; 340/686; 356/375
[58] Field of Search .............. 364/559, 571.07, 474.36, 364/474.37; 356/363, 375; 73/865.8; 340/686

[56] References Cited

U.S. PATENT DOCUMENTS

| | | | |
|---|---|---|---|
| 4,185,918 | 1/1980 | DiMatteo et al. | 356/375 |
| 4,396,945 | 8/1983 | DiMatteo et al. | 364/559 |
| 4,435,835 | 3/1984 | Sakow et al. | 364/559 |
| 4,578,768 | 3/1986 | Racine | 364/560 |
| 4,611,292 | 9/1986 | Ninomiya et al. | 364/559 |
| 4,627,722 | 12/1986 | Falk et al. | 356/363 |
| 4,672,562 | 6/1987 | Egli et al. | 364/559 |
| 4,825,393 | 4/1989 | Nishiya | 356/363 |
| 4,831,561 | 5/1989 | Utsumi | 356/375 |

Primary Examiner—Parshotam S. Lall
Assistant Examiner—Brian M. Mattson
Attorney, Agent, or Firm—Oblon, Spivak, McClelland, Maier & Neustadt

[57] ABSTRACT

An XYZ coordinates measuring system has a slit light source for projecting a slit light beam onto the surface of a work to be measured with a predetermined angle. Furthermore a television camera takes a light line formed on the surface of the work by the slit light beam to generate an output video signal. A coordinate measuring circuit has a look-up table for previously storing the interrelationship between the horizontal and vertical imaging positions of the light line and the XYZ coordinates on the surface of the actual work. The coordinate measuring circuit is adapted to process the video signal to detect the horizontal and vertical imaging positions Ks and Ls of the light line and to output the XYZ coordinates on the surface of the work from the look-up table, depending on the detected horizontal and vertical imaging positions Ks and Ls, the XYZ coordinates on the surface of the work can thus be real-time measured along the light line.

20 Claims, 61 Drawing Sheets

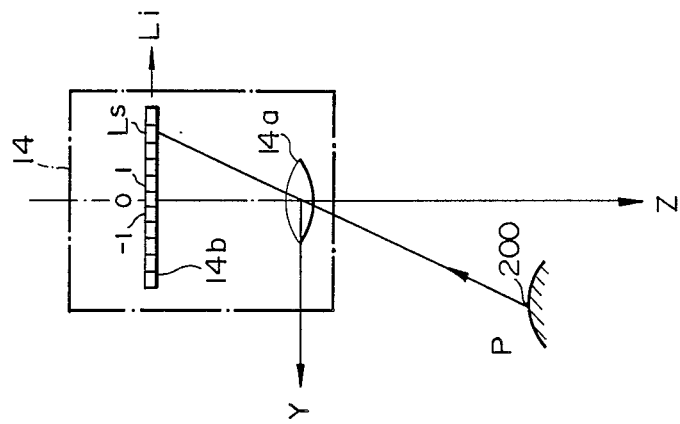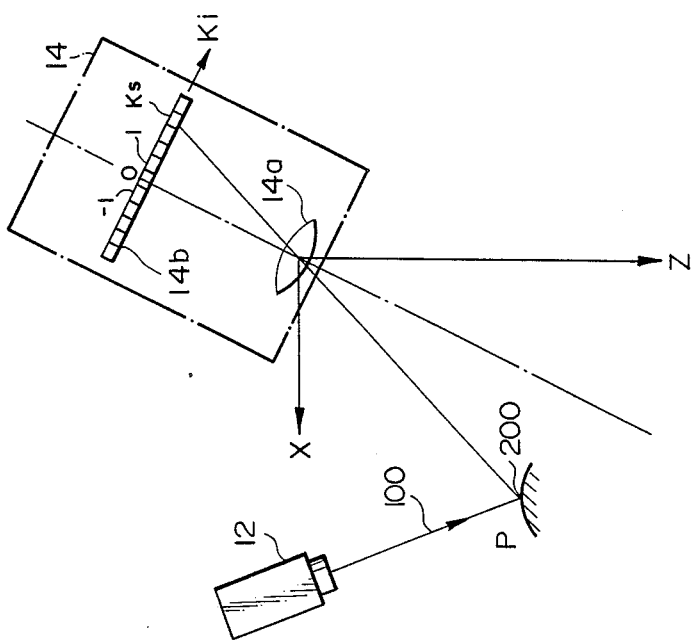

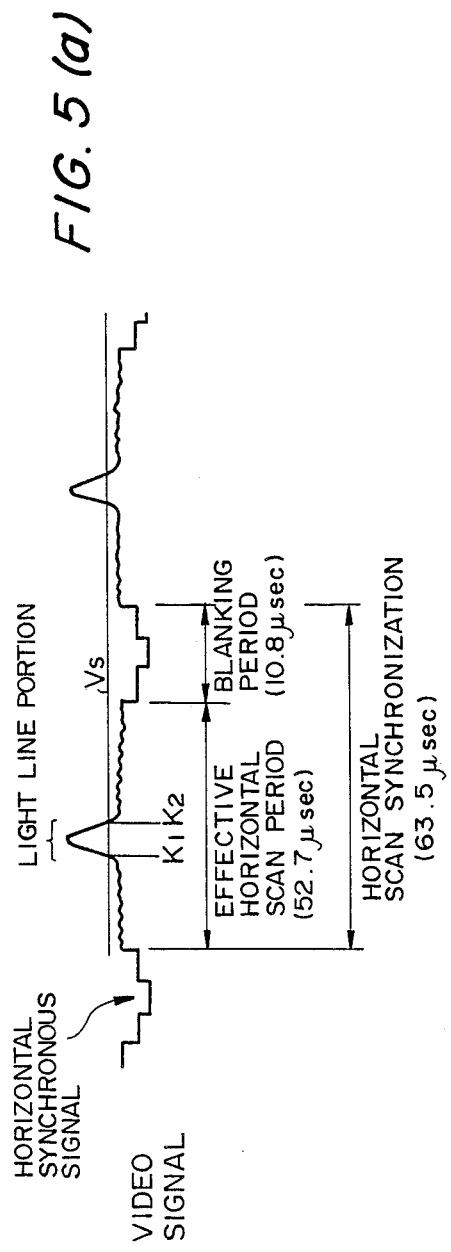
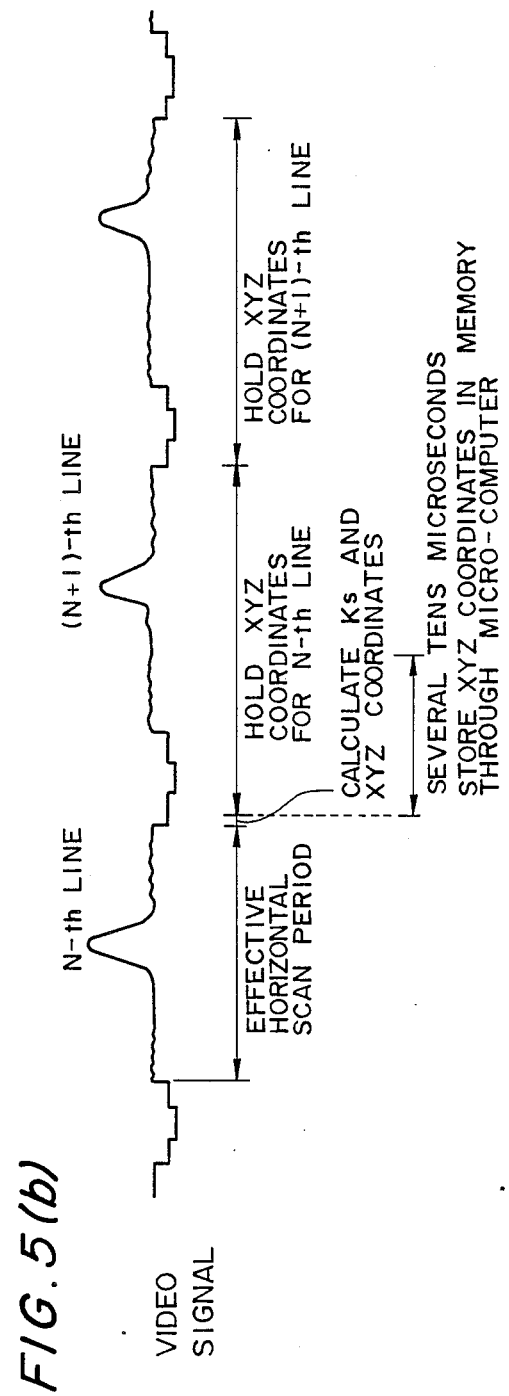

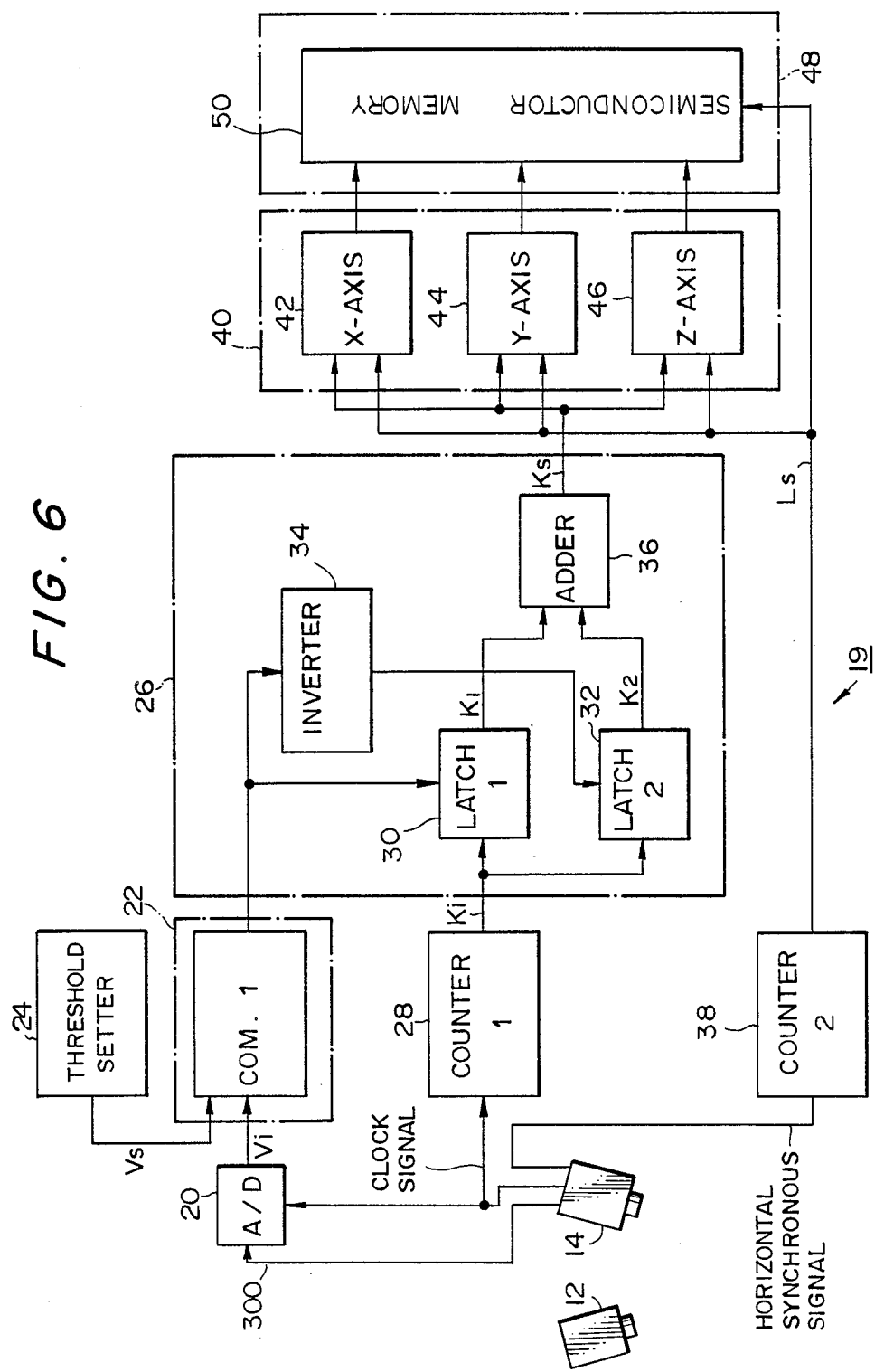

| FIG.7A | FIG.7B |

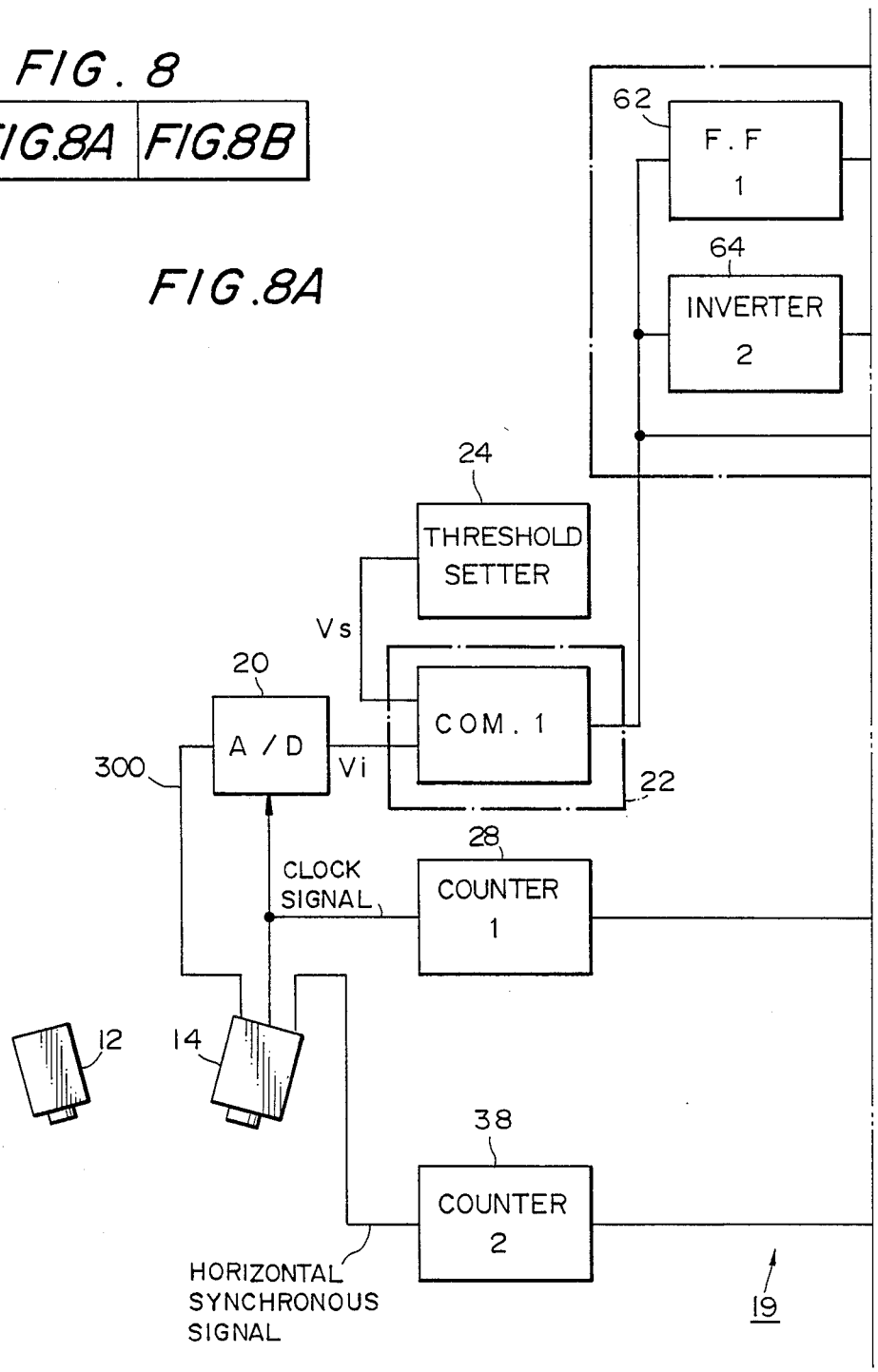

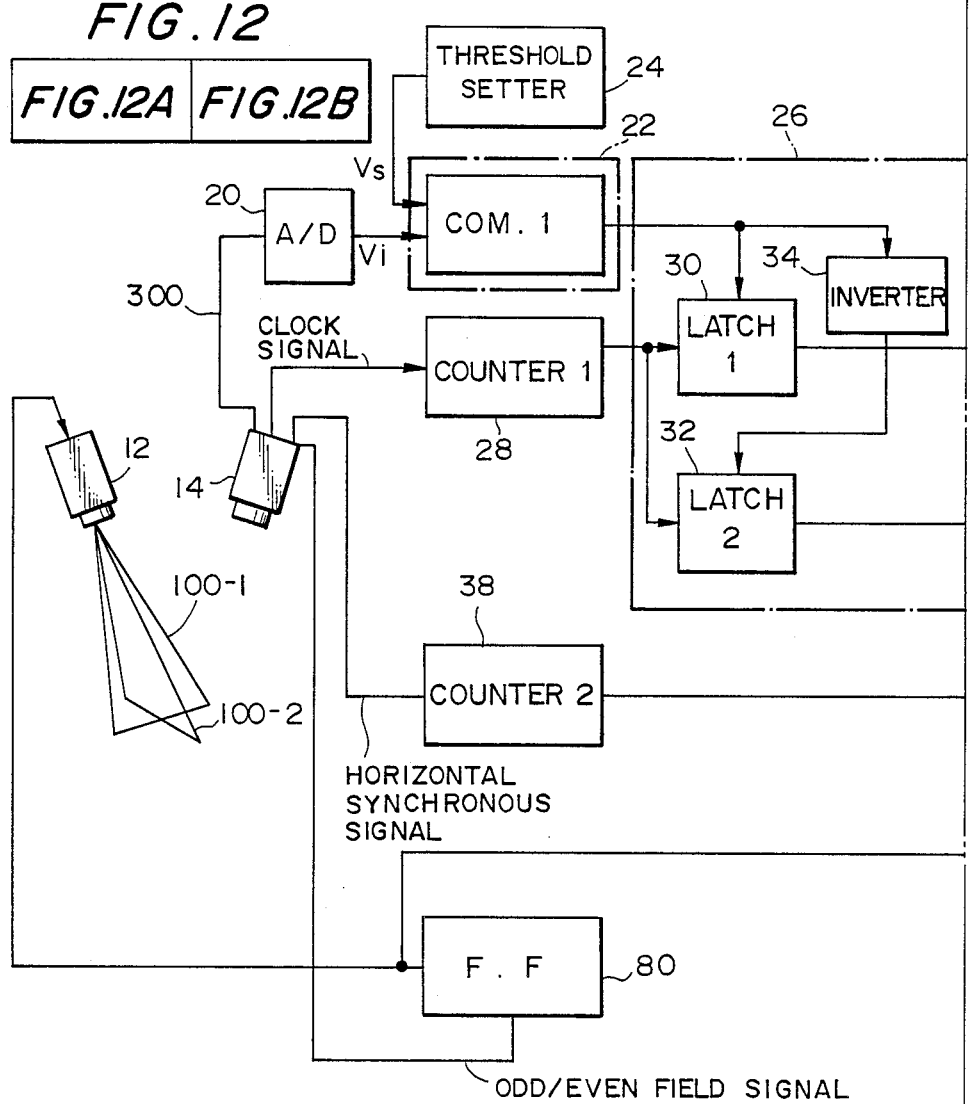

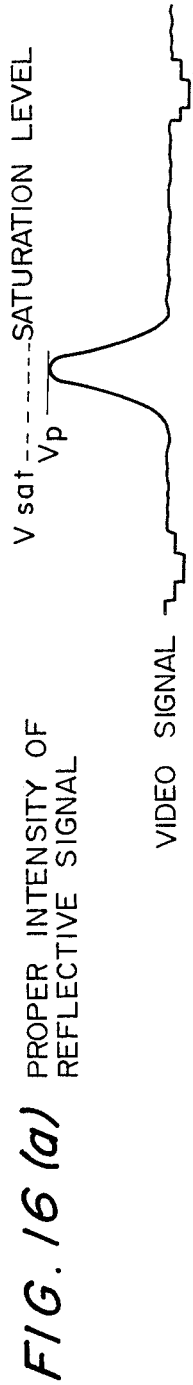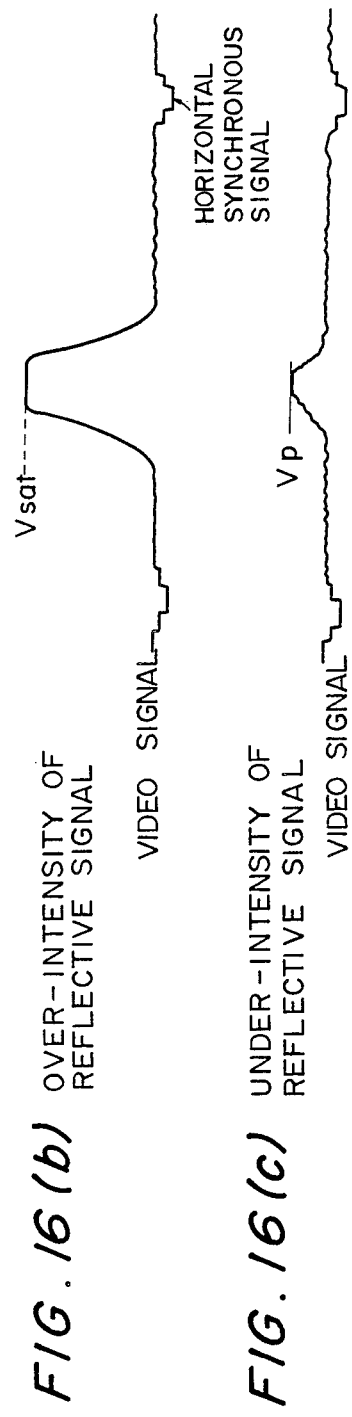
FIG. 16(a) PROPER INTENSITY OF REFLECTIVE SIGNAL
FIG. 16(b) OVER-INTENSITY OF REFLECTIVE SIGNAL
FIG. 16(c) UNDER-INTENSITY OF REFLECTIVE SIGNAL

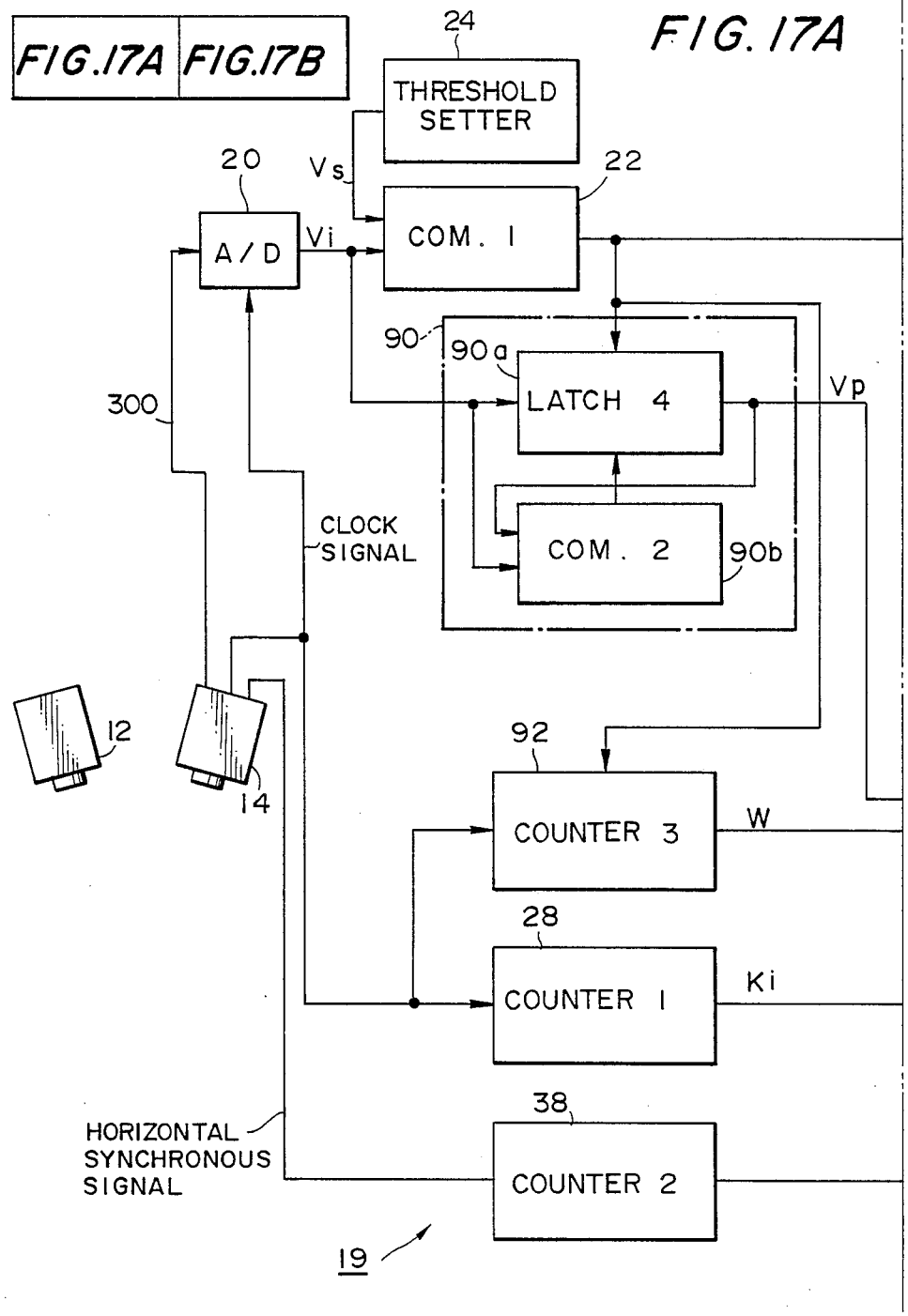

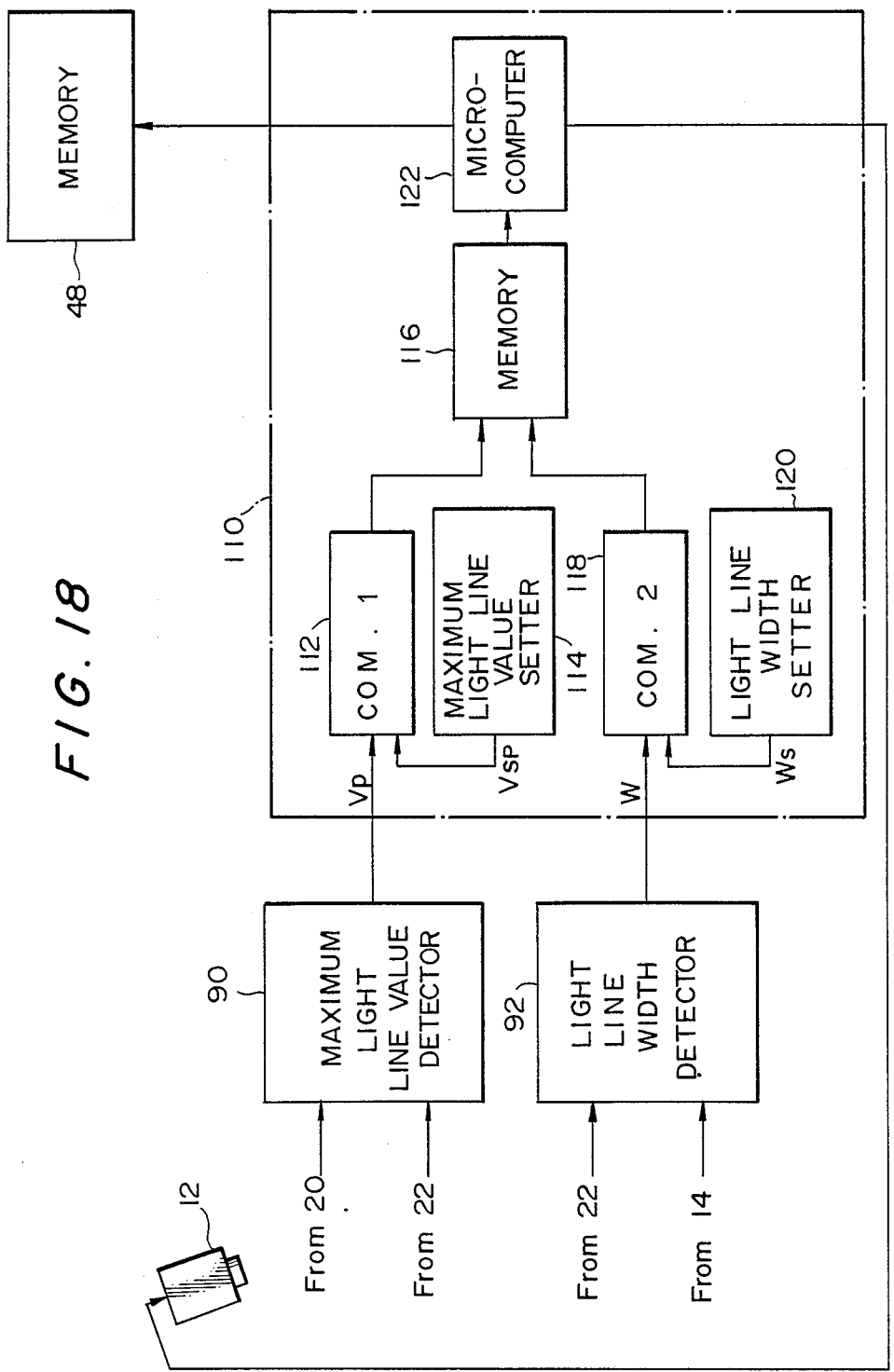

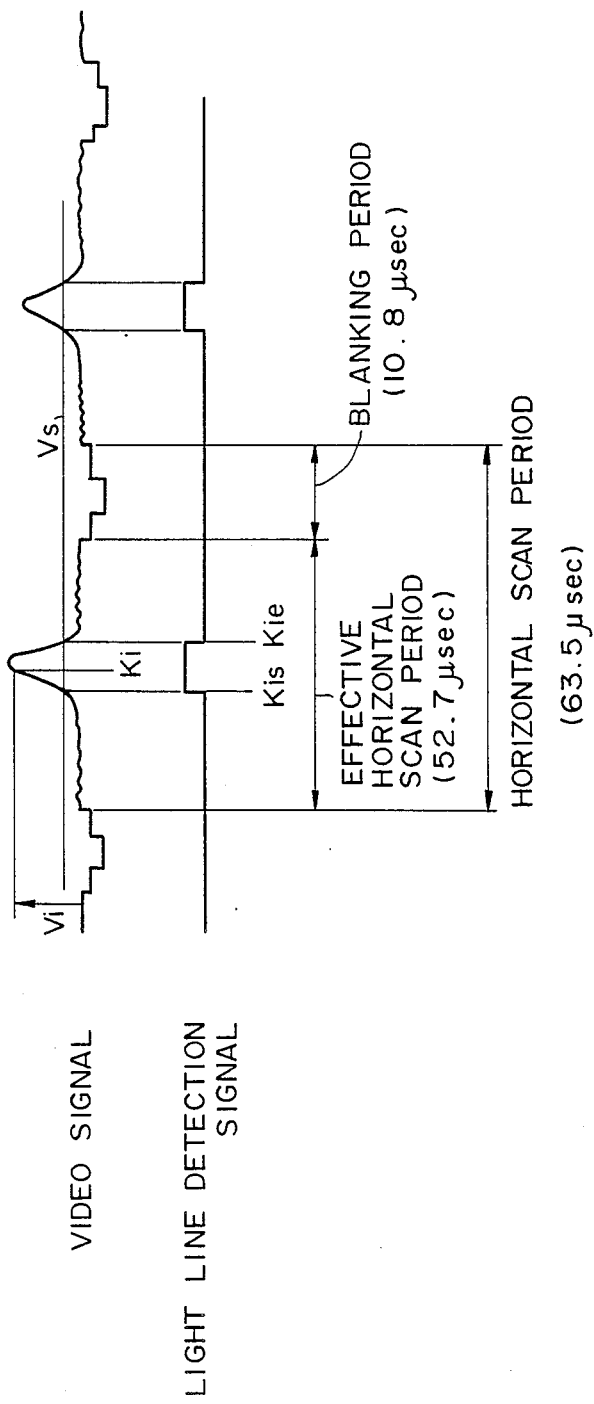

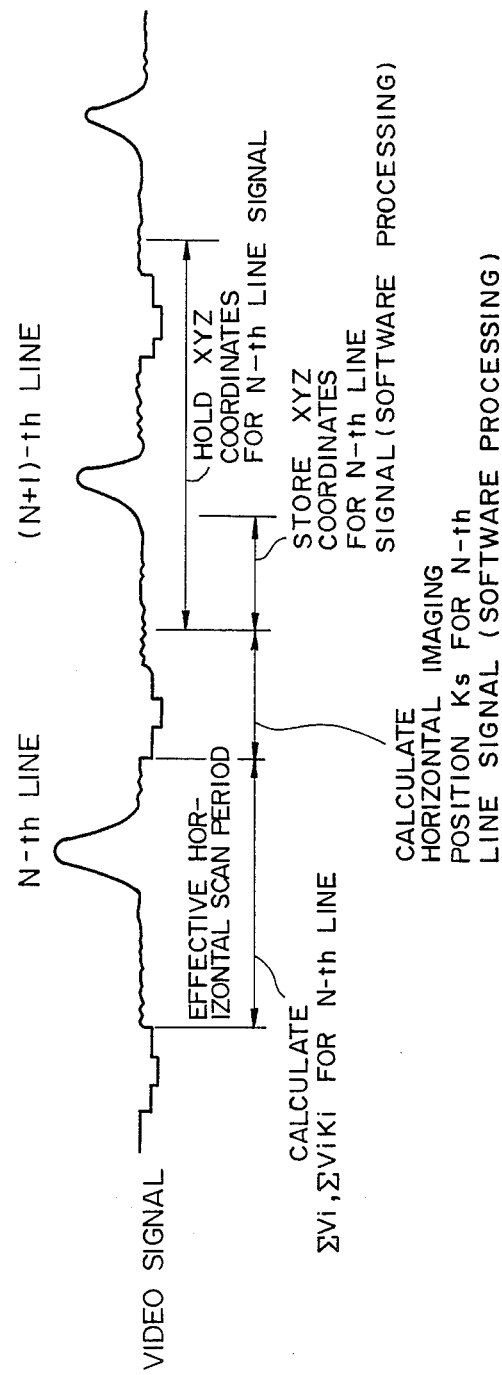

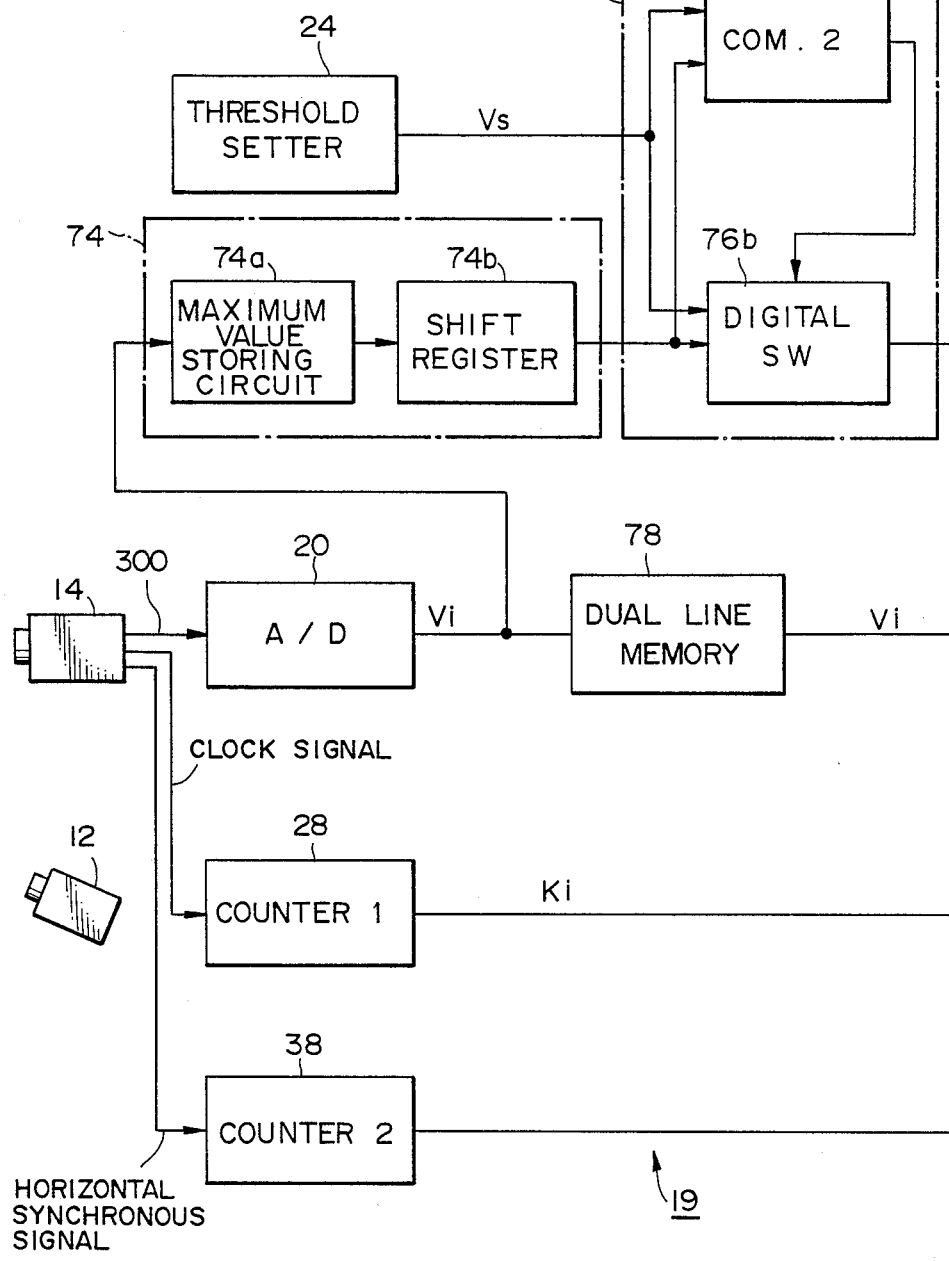

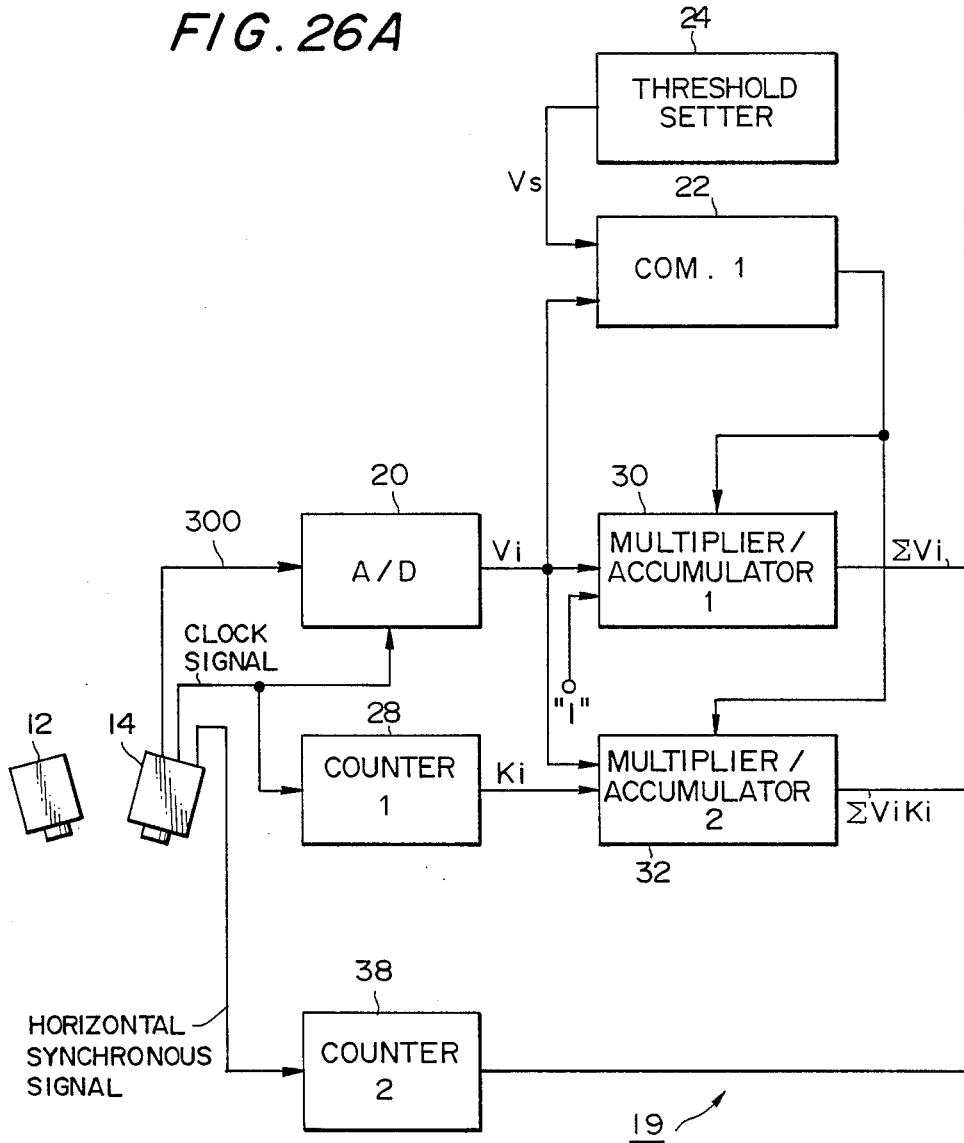

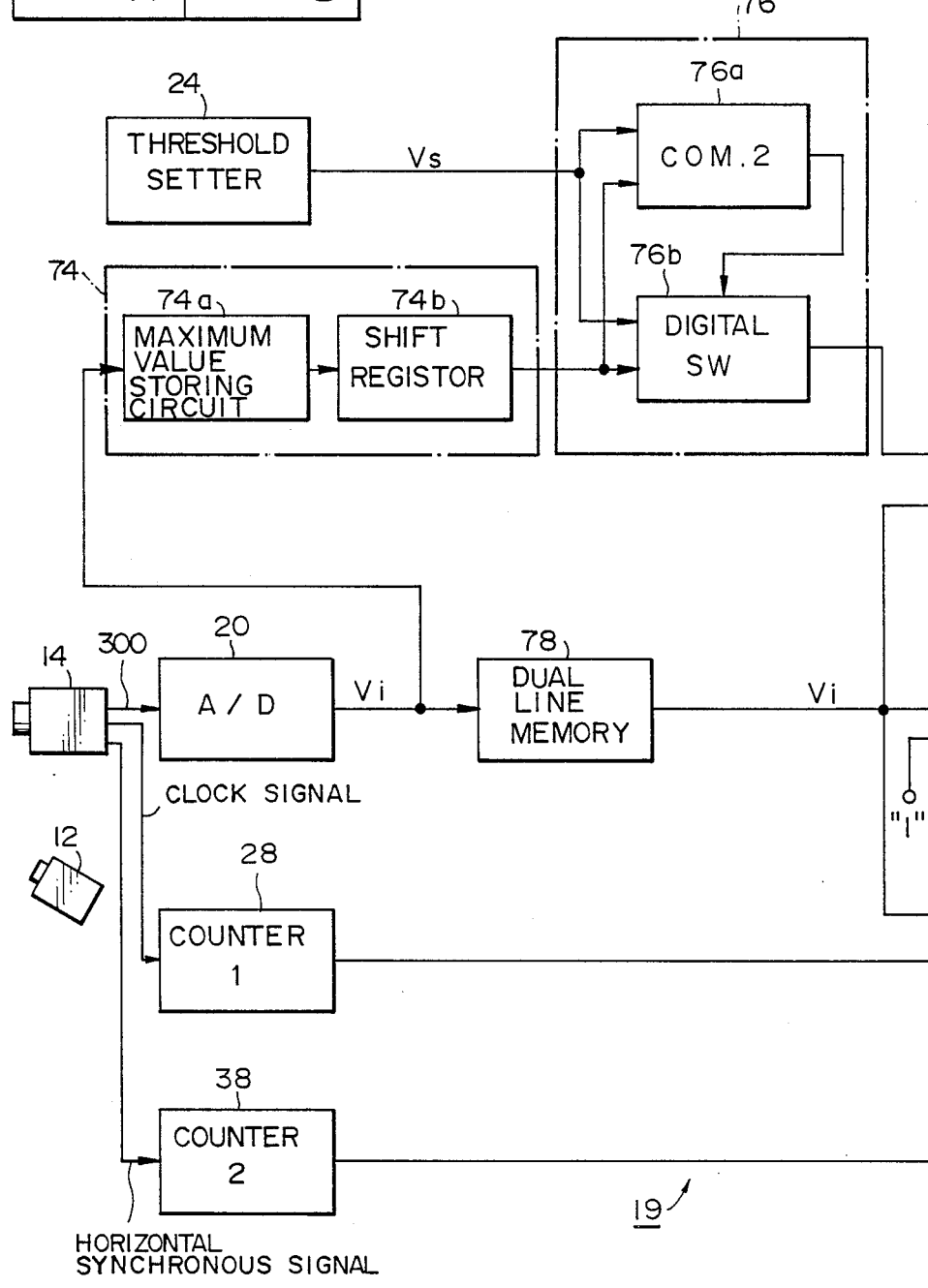

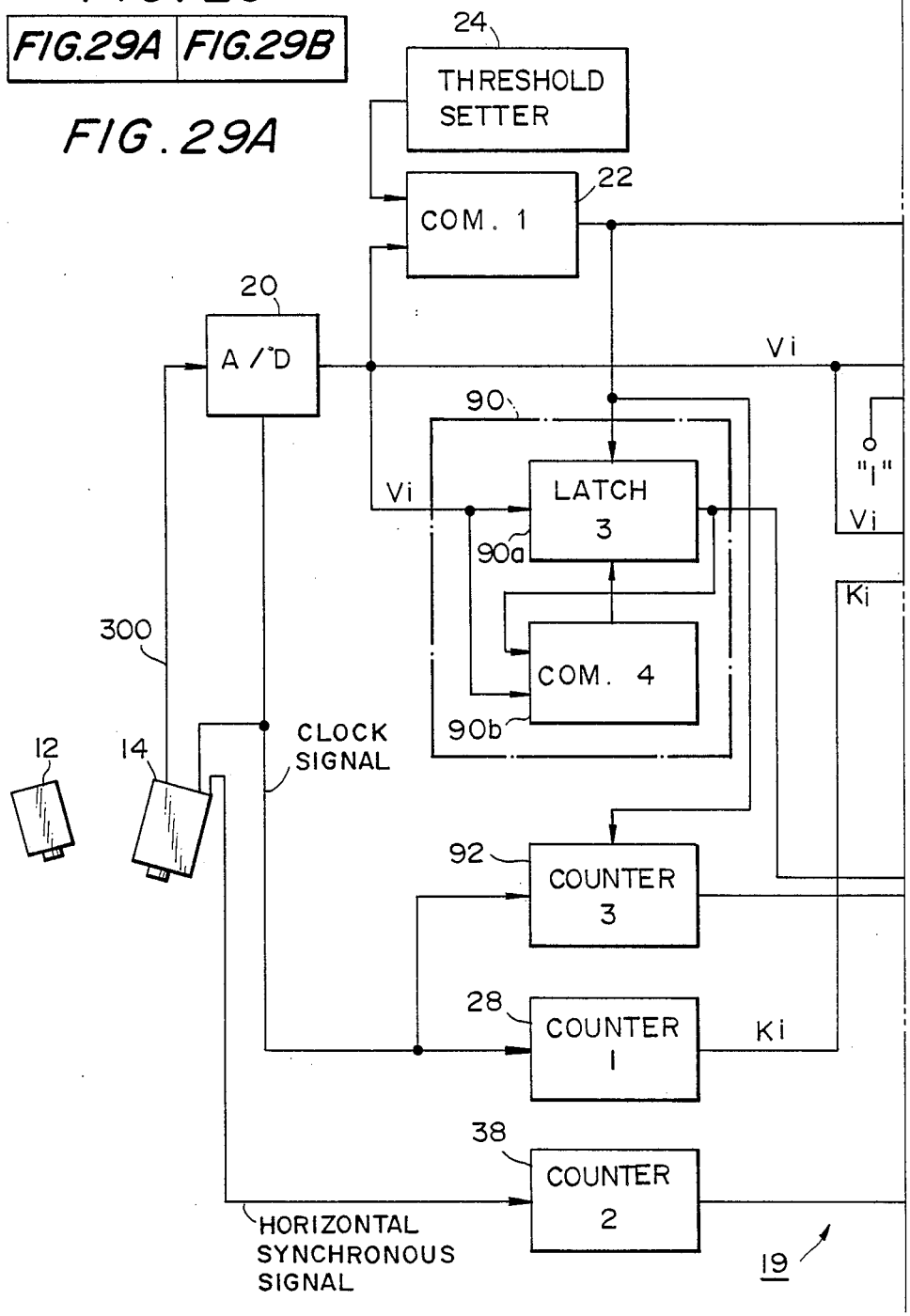

| FIG.30A | FIG.30B |

| FIG.31A | FIG.31B |

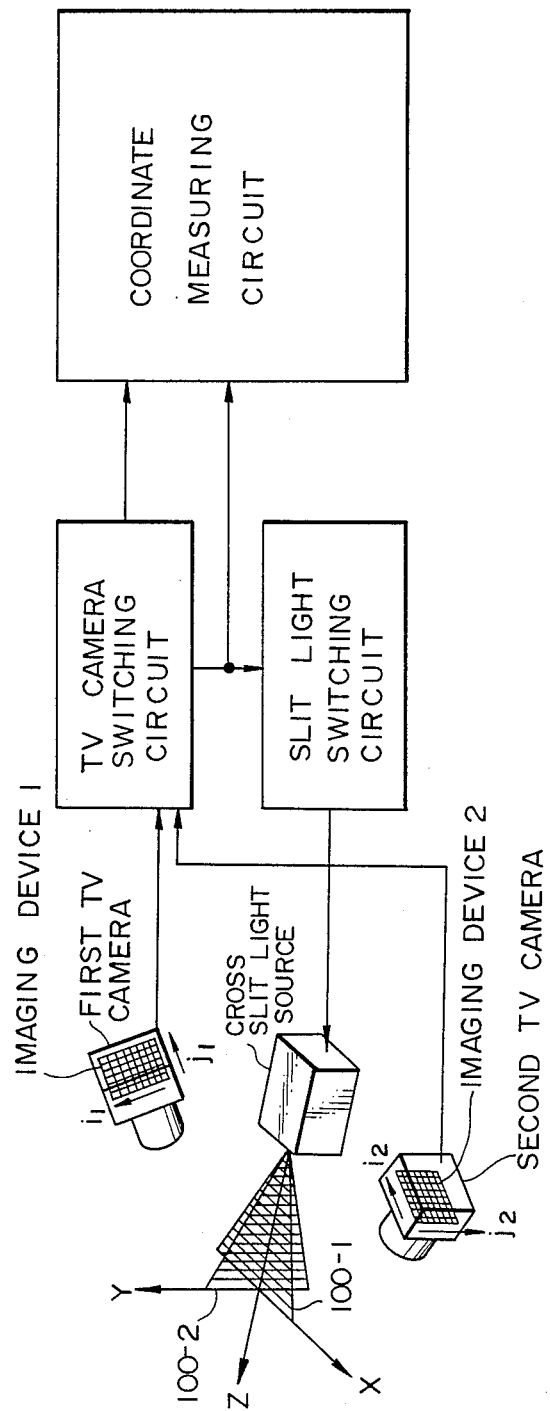

| FIG. 33A | FIG. 33B |

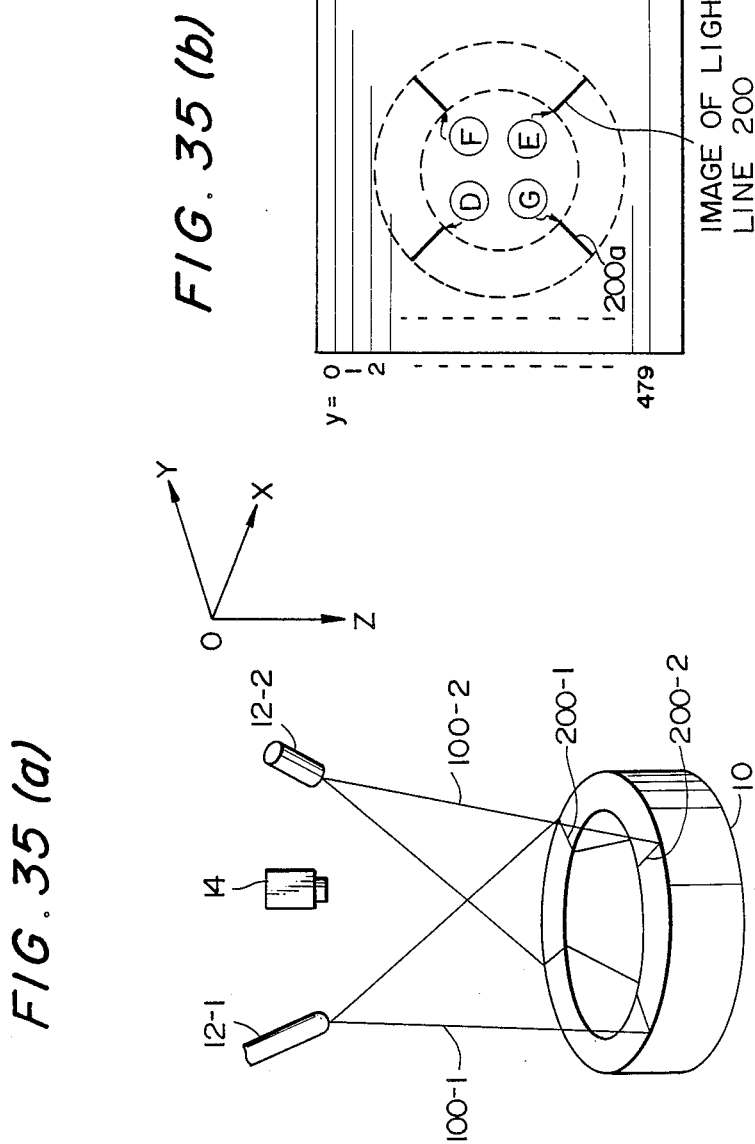

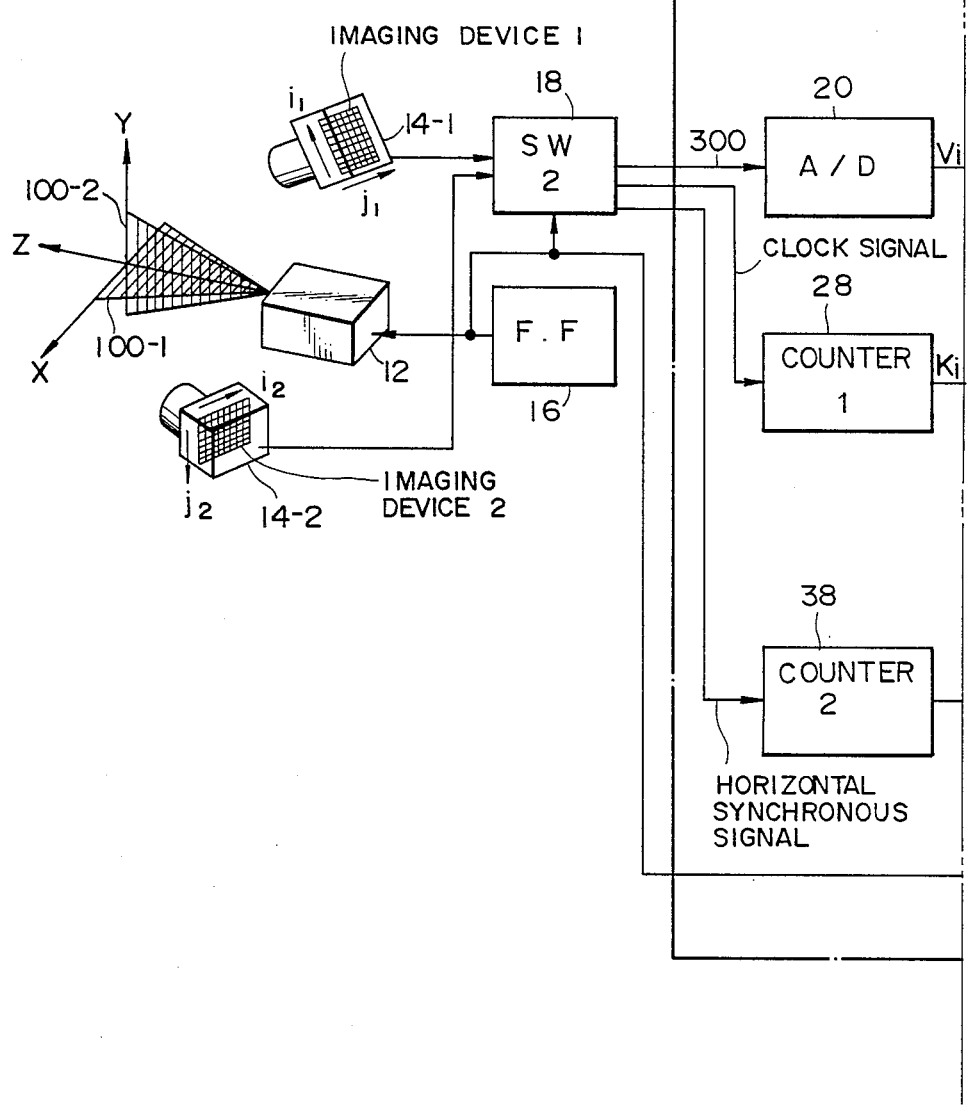

| FIG.37A | FIG.37B |

| FIG.38A | FIG.38B |

| FIG.39A | FIG.39B |

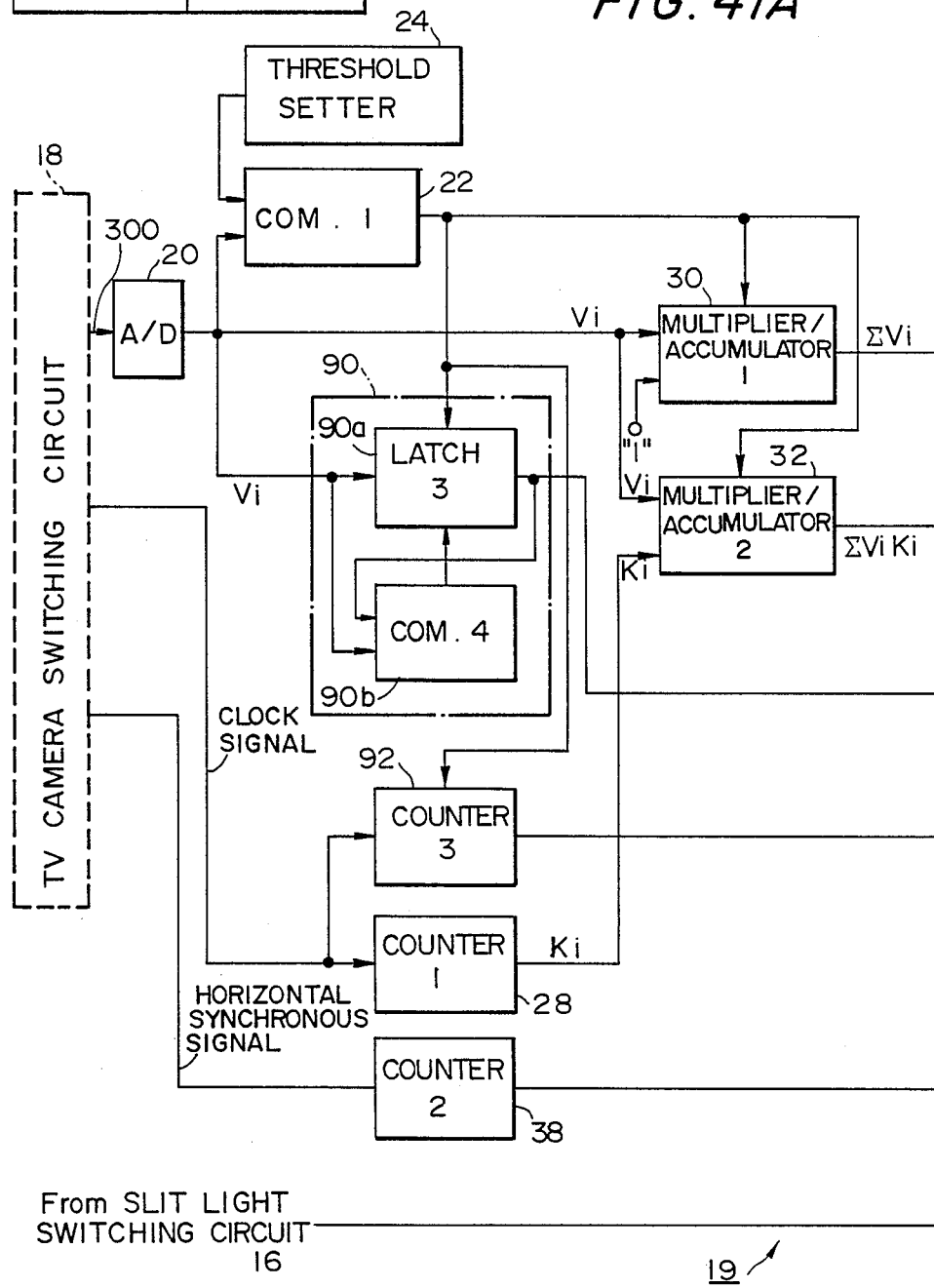

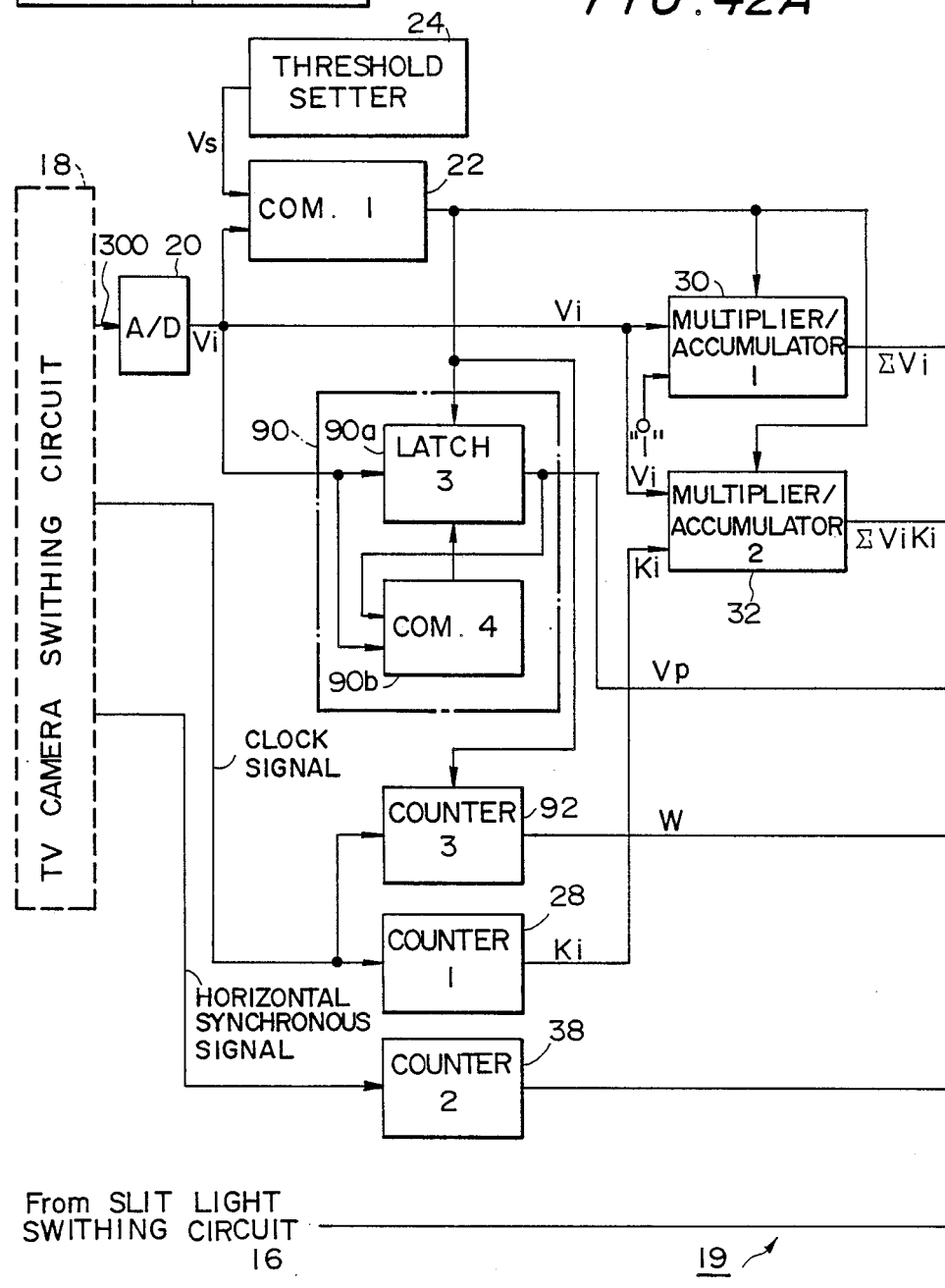

XYZ COORDINATES MEASURING SYSTEM

BACKGROUND OF THE INVENTION

1. Field of the Invention

The present invention relates to an XYZ coordinates measuring system and particularly to an improved high-speed system for measuring the XYZ coordinates on the surface of a work to be measured.

2. Description of the Related Art

On production of machine parts or products, it is frequently required to attain the high-speed dimension measurement of a machine part or product and the high-speed measurement of a distance between the machine part or product and a parts handling device such as measuring device, inspecting device or automatically assembling robot arm.

When a work to be handled is of a three-dimensional configuration, it is particularly desired to perform the high-speed detection of XYZ coordinates on the surface of the work so that the geometrical feature thereof can be accurately grasped.

FIG. 2 shows one of the related art systems for optically measuring the surface configuration of a three-dimensional work 10. The optical measuring system comprises a source of slit light 12 adapted to project a slit light beam 100 onto the surface of the work 10, and a TV camera 14 adapted to take a light line 200 formed on the surface of the work by the slit light 100. Each of the points on the surface of the work is determined with respect to XYZ coordinates by the use of the triangulation technique.

FIG. 3 shows an image 200a of the light line 200 taken by the TV camera 14. It will be apparent from this figure that the respective points (P1, P1, P2 . . . ) at which the light line 200 intersects the respective horizontal scanning lines (y=0, 1, . . . and 479) correspond to XYZ coordinates on the work. For example, if it is assumed that there is used a conventional TV camera 14 including 480 horizontal scanning lines, XYZ coordinate data relating to the maximum number of 480 points will be detected from the image 200a of the light line.

If the slit light source 12 and the TV camera 14 are stationary and when the three-dimensional work 10 is moved at a constant speed in a direction X shown in FIG. 2 by the use of a belt conveyor or the like, the three-dimensional configuration of the entire surface of the work can be measured by scanning it with the light line 200.

Principle of Triangulation

FIG. 4 shows the principle of triangulation used to measure the XYZ coordinates on each of points P along the light line 200. FIG. 4(a) shows the X-Z plane at a given position shown in FIG. 2 while FIG. 4(b) shows the Y-Z plane at the given position shown in FIG. 2.

A slit light beam 100 from the source of slit light 12 is reflected onto a lens 14a at a point P on the work 10 and then passes through the lens 14a to be imaged on an imaging device 14b. Horizontal and vertical addresses on the imaging device 14b at the imaging point are defined as horizontal and vertical imaging positions $K_s$ and $L_s$, respectively.

Since in FIG. 4 the values of Ks and Ls are variable proportional to the position of the point P in space, the XYZ coordinates can be determined by measuring the above values Ks and Ls.

Such a measuring system practically requires such an ability that the surface of the work 10 placed on a belt conveyor moving at a constant speed such as 30 mm/sec can be scanned by the light line 200 with a pitch equal to one millimeter to attain the real-time measurement of the XYZ coordinates on each of the points on the surface of the work.

If a single light line is used to measure 480 points P0, P1 P2 . . . and P479, it is necessary to measure the XYZ coordinates on each point for a very reduced time period which is equal to or shorter than about 63.5 microseconds.

Since the conventional XYZ coordinates measuring systems are adapted to process all the video signals from the TV camera 14 by the use of software to calculate the XYZ coordinates on that point, however, they could not determine the XYZ coordinates on each of the points P1, P2 . . . P479 for the period of time which is practically required to be equal to or shorter than 63.5 microseconds.

More particularly, the conventional measuring system is operated such that the video signals from the TV camera 14 are temporally stored in an image memory and thereafter processed in accordance with the software to determine the horizontal imaging position Ks. Where a standard image memory having horizontal picture elements equal to 512 and vertical picture elements equal to 480 is used, however, such software processing has a disadvantage in that a processing time between 700 microseconds and 800 microseconds is required to process one horizontal scanning line to detect the horizontal imaging position Ks on one point P.

The related art is further required to pre-determine a theoretical or experimental equation for representing the relationship between the values Ks, Ls and the XYZ coordinates. Based on such an equation, the horizontal and vertical imaging positions Ks and Ls so detected are subjected to the software processing to determine the XYZ coordinates.

However, such software processing method requires a very increased time as much as about several hundred microseconds to perform each calculation from the equation. Therefore, the related art requires the total processing time equal to several thousands microseconds per one point P. This means that the related art cannot possibly fulfill the processing time which is requested to be equal to or smaller than 63.5 microseconds on the actual production.

SUMMARY OF THE INVENTION

It is, therefore, an object of the present invention to provide an XYZ coordinates measuring system for high-speed measuring of XYZ coordinates on the surface of a three-dimensional work at each of various points thereon.

To this end, the present invention provides a measuring system comprising a source of slit light for projecting a slit light onto the surface of a work with a predetermined angle, a TV camera device for taking a light line formed on the surface of the work by the slit light to generate output video signals, and a coordinate measuring circuit including a look-up table for previously storing the interrelationship between the horizontal and vertical imaging positions and the actual XYZ coordinates on the surface of the work, the coordinate measuring circuit being adapted to process the video signals and to detect the horizontal and vertical imaging positions Ks and Ls of the light line, on which positions the XYZ coordinates on the surface of the work are output from the look-up table, whereby the XYZ coordinates on the surface of the work can be real-time measured along the light line.

BRIEF DESCRIPTION OF THE DRAWINGS

FIGS. 4(a) and 4(b) illustrate the principle of triangulation utilizing the slit light and the TV camera.

FIGS. 5(a) and 5(b) also illustrate the video signal from the TV camera: FIG. 5(a) being a graph of the relationship between the video signal and a threshold, while FIG. 5(b) being a timing table illustrating the relationship between the video signal and the three-dimensional coordinates from the look-up table.

FIG. 6 is a block diagram of a first concrete example of the XYZ coordinates measuring system according to the first embodiment.

FIGS. 8, 8A and 8B are block diagrams of a third concrete example of the XYZ coordinates measuring system according to the first embodiment.

FIG. 9(a) illustrating the formation of plural light lines on the surface of a work from the multi-reflection of the slit light, while FIG. 9(b) being the timing chart on various parts of the circuit shown in FIG. 8 when the above multiple reflection occurs.

FIG. 10(a) illustrates a plurality of slit lights projected from a single source of slit light, while FIG. 10(b) illustrates a plurality of slit lights projected from a plurality of slit light sources.

FIGS. 12, 12A and 12B are block diagrams of the system relating to the fourth concrete example.

FIGS. 16(a), 16(b) and 16(c) illustrate the video signals: FIG. 16(a) showing a signal produced when the light line has a proper intensity in reflective a signal; FIG. 16(b) showing a signal generated when the intensity of reflective signal is too large; FIG. 16(c) showing a signal produced when the intensity is too small.

FIGS. 17, 17A and 17B are block diagrams of a fifth concrete example of the XYZ coordinates measuring system according to the first embodiment.

FIG. 18 is a block diagram of a sixth concrete example of the XYZ coordinates measuring system according to the first embodiment.

FIGS. 20(a) and 20(b) illustrate video signals from the TV camera: FIG. 20(a) illustrates the relationship between a video signal and a threshold, while FIG. 20(b) illustrates the output timing between a video signal and the XYZ coordinates output from the look-up table.

FIGS. 23, 23A and 23B are block diagrams of a third concrete example of the XYZ coordinates measuring system according to the second embodiment.

FIG. 24(a) illustrates the formation of plural light lines on the surface of a work from multiple reflection of the slit light, while FIG. 24(b) is the timing chart on various parts of the circuit shown in FIG. 22 when the above multiple reflection occurs.

FIGS. 26, 26A and 26B are block diagrams of a fourth concrete example of the XYZ coordinates measuring system according to the second embodiment.

FIGS. 27, 27A and 27B are block diagrams of the fourth concrete example when it is provided with a proportional threshold setting circuit.

FIGS. 29, 29A and 29B are block diagrams showing a fifth concrete example of the XYZ coordinates measuring system according to the second embodiment.

FIG. 32 is a view of a third preferred embodiment of the present invention.

FIG. 34(a) illustrates the interrelationship between the slit light source and the TV camera, while FIG. 34(b) illustrates the video signals from the TV camera.

FIGS. 35(a) and 35(b) illustrate a one-camera and two-slit light type measuring system in the related art: FIG. 35(a) illustrates the interrelationship between the slit light source and the TV camera, while FIG. 35(b) illustrates the video signals from the TV camera.

FIGS. 36, 36A and 36B are block diagrams showing a first concrete example of the XYZ coordinates measuring system according to the third preferred embodiment of the present invention.

FIGS. 41, 41A and 41B are block diagrams showing a fifth concrete example of the XYZ coordinates measuring system relating to the third preferred embodiment.

FIGS. 42, 42A and 42B are block diagrams showing a sixth concrete example of the XYZ coordinates measuring system according to the third embodiment.

DETAILED DESCRIPTION OF THE PREFERRED EMBODIMENTS

Figure 1:
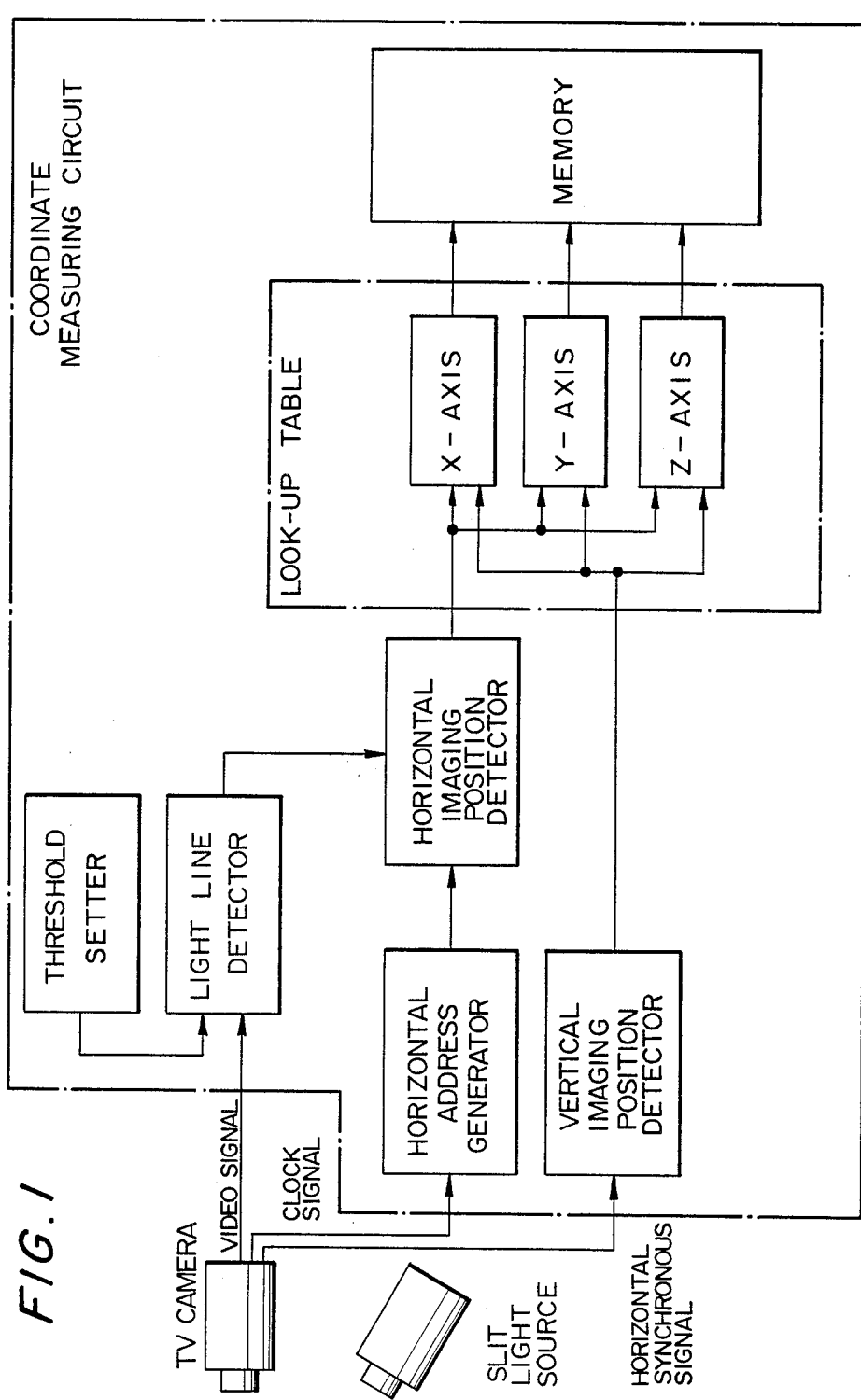
FIG. 1 is a block diagram illustrating the schematic arrangement of a first preferred embodiment of an XYZ coordinates measuring system constructed in accordance with the present invention.

The present invention will now be described in detail with respect to some preferred embodiments thereof illustrated in the drawings.

(1) First Embodiment

FIG. 1 shows a first preferred embodiment of an XYZ coordinates measuring system constructed in accordance with the present invention, which comprises a slit light source adapted to project a slit light onto the surface of a work with a predetermined angle; a TV camera for taking a light line formed on the surface of the work by the slit light to generate an output video signal; a coordinate measuring circuit for processing the video signal to generate, at its output, XYZ coordinates on the surface of the work along the light line, the coordinate measuring circuit comprising a threshold setting circuit for setting a threshold to detect the light line from the video signal; a light line detecting circuit for generating a light line detecting signal at the output thereof only for a time period when the video signal exceeds said threshold; a horizontal address generating circuit for generating a horizontal address representative of the position of a horizontal picture element on the imaging device of the TV camera; a horizontal imaging position detecting circuit for adding addresses at the positive and negative edges for such a period when the light line detecting signal is being output from the light line detecting circuit, the sum thereof being output from said detecting circuit as a horizontal imaging position; a vertical imaging position detecting circuit for counting the horizontal synchronous signals in the TV camera to detect a vertical imaging position; a look-up table for storing the interrelationship between the horizontal and vertical imaging positions and the actual XYZ coordinates on the surface of the work, the look-up table being adapted to output the XYZ coordinates on the surface of the work, based on the detected values of the horizontal and vertical imaging positions; and a memory for storing the three-dimensional coordinate values from the look-up table, whereby the XYZ coordinates on the surface of the work can be real-time measured along the light line.

Such an arrangement will operate as follows:

When a slit light 100 is projected onto the surface of a work as shown in FIG. 4, the slit light 100 forms a light line 200 on the surface of the work, which line 200 in turn is taken by a TV camera 14. The TV camera 14 is adapted to sequentially generate output video signals in synchronism with the horizontal scan thereof.

The first feature of the present embodiment is that as each of the horizontal scan video signals is output from the TV camera, the horizontal and vertical imaging positions Ks and Ls of the light line 200 on that scanning line can immediately be detected.

According to the present embodiment, the entire arrangement of the measuring system is simplified by adding and averaging the horizontal imaging positions Ks.

The second feature of the present embodiment is that the XYZ coordinates of a point P to be measured on the scanning line at the respective imaging positions Ks and Ls can be determined substantially at the same time as the positions Ks and Ls are detected. As a result, the XYZ coordinates of each of plural points ($P_0$, $P_1$ . . .) located along the light line can be real-time measured by the measuring system of the present invention.

In the present embodiment, the look-up table is particularly adapted to previously store the interrelationship between the horizontal and vertical imaging positions Ks and Ls and the actual XYZ coordinates on the surface of the work. Based on the detected values of the horizontal and vertical imaging positions Ks and Ls, the XYZ coordinates on the surface of the work can be output without any particular calculation.

The operation of the present embodiment will be described on the respective detections of the imaging positions (Ks and Ls) and the XYZ coordinates.

Detection of Ks

The system of the present embodiment is adapted to add and average the horizontal imaging positions Ks.

FIG. 5(a) shows video signals from the output of the TV camera in synchronism with the horizontal scan thereof. The commercially available TV camera has normally its horizontal scan period equal to 63.5 microseconds among which the effective scan period is equal to 52.7 microseconds with the remaining period being a blanking time equal to 10.8 microseconds.

In FIG. 5(a), each of the raised portions in the video signals is representative of a light line. In order to perform the exact coordinate measurement, it is required that a peak position in this raised portion should be accurately determined as a horizontal imaging position Ks. The raised portion of the light line approximates the Gaussian symmetry distribution, as disclosed in a literature 1 (NARUSE Hiroshi and NOMURA Yoshihiko, "High-Accuracy Distance and Attitude Measurement Using Slit-Ray Projection Method", National Convention Record of Information System Section of the Institute of Electronics and Communication Engineers of Japan, pp. 1–165, 1985).

During such a period that the video signal exceeds the threshold Vs, that is, during the period of FIG. 5(a) for which the light line is being detected. The peak value in the raised portion can be accurately approximated from a value (K1+K2)/2 which is determined by adding and averaging the positive and negative edges K1 and K2.

Aiming at this point, the present embodiment is characterized by that a light line detecting circuit is used to detect and add horizontal addresses K1 and K2 in the positive and negative edges to produce the sum (K1+K2) which in turn is outputted from the light line detecting circuit as a horizontal imaging position Ks.

If a commercially available adder, for example, is used to add the horizontal addresses in the present embodiment, the detection of Ks can be completed after about several tens nanoseconds from when the effective horizontal scan period has been terminated in the TV camera.

Detection of Ls

The vertical imaging position Ls corresponds to the number of horizontal scanning lines which are being used to detect the horizontal imaging position Ks.

In the present embodiment, a vertical imaging position detecting circuit is used to count horizontal synchronous signals in the TV camera to detect the vertical imaging postion Ls as each of the horizontal scan video signals is output from the TV camera.

In such a manner, the horizontal and vertical imaging positions Ks and Ls with respect to a light line measuring point P on the horizontal scanning line can be detected at the same time as the effective horizontal scan period is terminated in the TV camera.

XYZ Coordinates

The XYZ coordinates corresponding to the detected imaging positions Ks and Ls will be determined as follows:

The feature of the present invention is that the interrelationship between the imaging positions (Ks, Ls) and the actual XYZ coordinates on the surface of the work is previously determined theoretically or experimentally and then stored in the look-up table.

It is therefore not required that any software processing utilizing an operating equation is performed to determine the XYZ coordinates on the surface of the work from the detected values Ks and Ls. Such a determination can be carried out simply by reading out the XYZ coordinates corresponding to the imaging positions Ks and Ls from the look-up table.

In accordance with the present invention, therefore, the coordinates X, Y and Z corresponding to the positions Ks and Ls can promptly be output from the look-up table at the same time as the above values Ks and Ls are detected.

It is to be noted that if the look-up table is formed by any existing electronic part, such as ROM, it can output the coordinates X, Y and Z for a very decreased time which is in the order of several hundred nanoseconds.

The coordinates X, Y and Z output from the look-up table are sequentially stored in the memory in synchronism with the horizontal scan in the TV camera.

If data are written in the memory in DMA (direct memory addressing) manner by the use of a commercially available RAM, for example, the XYZ coordinates on each point can be completely stored after several hundreds nanoseconds from when they are output from the look-up table.

For about one microsecond after the effective horizontal scan cycle has been terminated in the TV camera, that is, during the blanking time, the XYZ coordinates relating to the light line measurement point P on the horizontal line can be completed.

In such a manner, it is possible according to the present invention that the XYZ coordinates on one point can be detected leaving a sufficient margin within the horizontal scan period (63.5 microseconds) in the TV camera. As a result, XYZ coordinates on each of the respective points (P0, P1, P2 . . .) can be real-time measured along the light line.

A microcomputer may be used to write the coordinates X, Y and Z from the look-up table into the memory.

In such a case, a time which is in the order of several tens microseconds is required to store the XYZ coordinates output from the look-up table. If the microcomputer is not modified at all, the process cannot be completed within the blanking time.

As shown in FIG. 5(b), however, the writing of the coordinates into the memory can be carried out within a horizontal scan period next to the horizontal scan period in question if the outputs of the look-up table are held during one horizontal scan period. In such a manner, even the microcomputer may be used to perform the real-time measurement of coordinates within the horizontal scan period (63.5 microseconds) in the TV camera.

COMPARISON OF THE INVENTION WITH THE RELATED ART

(A) Related Art

The related art is adapted to subject all the horizontal scan video signals from the TV camera to the software process for calculating the XYZ coordinates.

Therefore, the related art requires a time period ranged between 700 microseconds and 800 microseconds to determine the horizontal imaging position Ks on one point P by processing video signals in one horizontal scanning line, for example. The related art further requires a time period of about several hundreds microseconds in software processing based on the imaging position Ks so determined.

As a result, the related art eventually requires a processing time of several thousands microseconds to calculate the XYZ coordinates on one point P. This cannot fulfill a processing time of about 63.5 microseconds which is required by the actual production.

(B) Present Embodiment

On the contrary, the present embodiment is adapted to determine the horizontal imaging position Ks simply by adding the horizontal addresses K1 and K2 at the positive and negative edges in the output light line detecting signal. Thus, the present embodiment can determine the horizontal imaging position Ks substantially at the same time as the video signals in one horizontal scanning line have been output. Further, the present embodiment can provide a simplified circuit for calculating the horizontal imaging position since the latter can be determined only by the simplified adding and averaging operation.

Furthermore, the present invention is adapted to previously determine the XYZ coordinates on the surface of the work corresponding to the imaging positions Ks and Ls theoretically or experimentally, this relationship being stored in the look-up table.

At the same time as the imaging positions Ks and Ls relating to the measurement point P on the surface of the work are detected, therefore, the XYZ coordinates corresponding to these imaging positions can be output directly from the look-up table. The output of the XYZ coordinates can be completed within one horizontal scan period or the next horizontal scan period, leaving a sufficient margin.

In such a manner, the XYZ coordinates measuring system of the present invention which uses a slit light and a TV camera can greatly reduce the calculating and processing time of the coordinates and detect the coordinates on the surface of any three-dimensional work with an increased speed.

In particular, the present invention can perform the detection of coordinates on one point within one horizontal scan time (63.5 microseconds) in the TV camera. Therefore, the present invention can measure coordinates on the entire surface of a three-dimensional work moving at a constant speed equal to several tens mm/sec, which could not be measured in the related art. Consequently, the present invention can be broadly applied as sensors which are used, for example, to inspect parts or products on the cutting step, to measure the size of the parts or products and to perform the automatic assembly of the parts or products by the use of a robot.

The applicant has already proposed an XYZ coordinates measuring system by Japanese Patent Application No. 61-64565 which was filed on Mar. 20, 1986. In the related art measuring system, only two coordinates X and Y among the XYZ coordinates are previously related to Ks and Ls and then stored in a two-axis coordinate look-up table. The remaining Z-axis coordinate is determined by using a factor look-up table and an operation circuit. As a result, it cannot be avoided that the entire construction of the system becomes complicated.

On the contrary, the measuring system of the present invention is previously adapted to relate all the coordinates X, Y and Z to the positions Ks and Ls and then to store them in the look-up table. Therefore, factor look-up table and operation circuits are not required. As a result, the entire measuring system of the present invention can be simplified.

EXAMPLES

Figure 2:
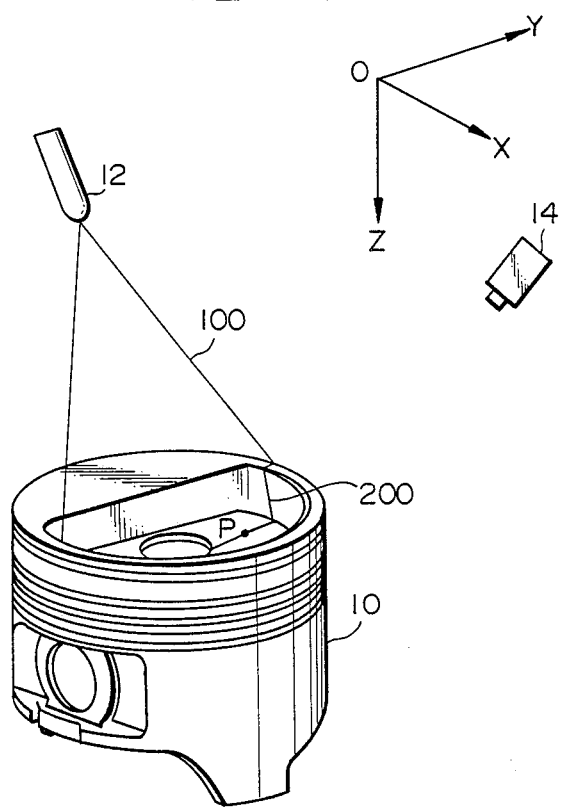
FIG. 2 illustrates the interrelationship between a source of slit light and a TV camera.
Figure 3:
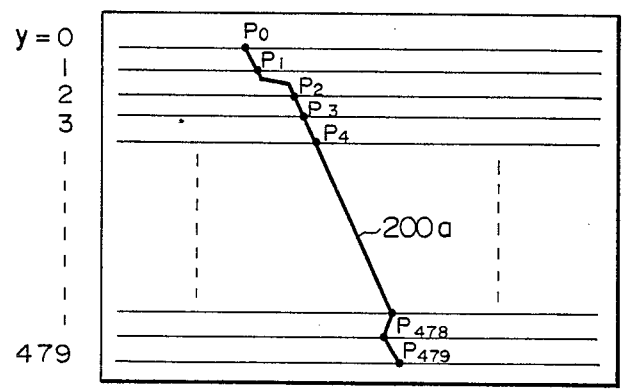
FIG. 3 illustrates a video signal from the TV camera.

Some concrete examples of the first embodiment of the present invention will be described in detail with reference to the drawings, in which parts similar to those shown in FIGS. 2 and 3 are designated by similar reference numerals and their description will be omitted.

FIRST CONCRETE EXAMPLE

FIG. 6 shows a first concrete example of the XYZ coordinates measuring system according to the present invention.

The system comprises a source of slit light 12 and a TV camera 14. As shown in FIG. 2, the slit light source 12 is adapted to project a slit light 100 onto a three-dimensional work 10 with a predetermined angle to form a light line 200 on the work 10, which in turn is taken by the TV camera 14.

The TV camera 14 generates at its output a video signal which in turn is input into a coordinate measuring circuit 19. The video signal 300 input into the coordinate measuring circuit 19 is then converted into a digital video signal Vi at an A/D converter 20 in synchronism with a clock cycle in the TV camera 14 with the digital video signal in turn being input into a light line detecting circuit 22.

The measuring system further comprises a threshold setting circuit 24 in which is set a threshold value Vs used to detect the light line 200 from the video signal. The set threshold Vs is then input into the light line detecting circuit 22.

In the first concrete example, the light line detecting circuit 22 is constituted of a comparator in which the video signal Vi input as shown in FIG. 5(a) is compared with the threshold Vs. Only during a period for which the video signal Vi exceeds the threshold Vs, a light line detecting signal is sent to a horizontal imaging position detecting circuit 26.

A horizontal address generating circuit 28 is formed by a counter which is adapted to count clock signals from the TV camera 14. The resulting count Ki is then supplied to the horizontal imaging position detecting circuit 26 as a horizontal address representative of the horizontal position of the imaging device 14b in the TV camera 14.

The horizontal imaging position detecting circuit 26 is adapted to perform the simple addition of addresses K1 and K2 at the respective positive and negative edges of the light line detecting signal from the light line detecting circuit 22, with the resulting sum (K1+K2) being then output therefrom as a horizontal imaging position Ks.

The horizontal imaging position detecting circuit 26 further includes latch circuits 30 and 32, an inverter 34 and an adder 36.

One of the latch circuits 30 is adapted to store a horizontal address signal Ki from the horizontal address generating circuit 28 in synchronism with the positive edge of the light line detecting signal from the light line detecting circuit 22. The horizontal address signal so stored is assumed to be K1. Subsequently, the other latch circuit 32 stores the horizontal address signal Ki at the positive edge of the output signal from the inverter 34 which inverts the output of the light line detecting circuit 22, that is, at the negative edge of the light line detecting signal. The horizontal address signal so stored is assumed to be K2.

The horizontal addresses K1 and K2 stored in the latch circuits 30 and 32 are then added by the adder 36 to form an output representative of a horizontal imaging position Ks=K1+K2.

In accordance with the present invention, as shown in FIG. 5(a), the horizontal addresses K1 and K2 at the start and termination of the output of the light line detecting signal are simply added to determine the horizontal imaging position Ks. Thus, the entire construction of the horizontal imaging position detecting circuit 26 itself can be very simplified.

In the first concrete example, a vertical imaging position detecting circuit 38 is formed by a counter which is adapted to count horizontal synchronous signals from the TV camera 14 and to detect the number of a horizontal line presently scanned in the TV camera 14, that is, a vertical imaging position Ls.

The horizontal and vertical imaging positions Ks and Ls detected with respect to each point P are then input into a look-up table 40. The look-up table 40 previously stores the interrelationship between the horizontal and vertical imaging cutting positions (Ks, Ls) and the XYZ coordinates on the surface of the actual three-dimensional work 10 at each of various points thereon. At each time when the horizontal and vertical imaging positions (Ks, Ls) are input into the look-up table 40, the latter sends the corresponding XYZ coordinates to a memory 48.

In such a manner, the present invention can rapidly output the XYZ coordinates at each measurement point P on the work 10 without any particular calculating or software processing operation, at each time when the horizontal and vertical imaging positions Ks and Ls are detected.

In the first concrete example, the look-up table 40 comprises an X-axis table 42, a Y-axis table 44 and a Z-axis table 46. Each of these tables 42, 44 and 46 includes a ROM in which tables corresponding to values Ks and Ls and the XYZ coordinates are previously stored.

At the same time as each of the effective horizontal scan periods shown in FIG. 5(a) is terminated and when the values Ks and Ls are input into each of the tables 42, 44 and 46, the table 42, 44 or 46 is adapted to output the corresponding XYZ coordinates after several hundreds nanoseconds with the coordinates being then written in the memory 48.

The memory 48 includes a semiconductor memory 50 having addresses corresponding to the number of each of the horizontal scan lines in the TV camera 14.

The XYZ coordinates output from each of the tables 42, 44 and 46 are sequentially stored in the memory at the respective one of addresses specified by the corresponding vertical imaging position Ls (that is, the number of the corresponding horizontal scanning line in the TV camera 14) from the vertical imaging position detecting circuit 38. Such a direct addressing of the memory 50 without need of any computer is called "DMA (direct memory addressing)".

Where data are stored directly in the semiconductor memory 50 in such a manner, the storage of data will be terminated after several hundreds nanoseconds from when the coordinates have been input in the memory 50. In other words, the storage of the XYZ coordinates on each point will be terminated within about one microsecond after said effective horizontal scan period has been terminated.

In such a manner, the measuring system according to the first concrete example can terminate the detection and storage of XYZ coordinates at each point corresponding to the light line on the horizontal scanning line within about one microsecond or within the blanking time of the TV camera 14 after each of the effective horizontal scan periods in the TV camera 14 has been terminated.

As a result, the XYZ coordinates on one point can be detected during the horizontal scan period (63.5 microseconds) in the TV camera 14. Therefore, the XYZ coordinates on each of the points (P0, P1 . . . ) along the light line 200 can be real-time measured.

SECOND CONCRETE EXAMPLE

Although the first concrete example shown in FIG. 6 has been described as to the semiconductor memory 50 into which the XYZ coordinates from the look-up table 40 are written directly, the present invention is not limited to such an arrangement and may be applied to the writing of them into the semiconductor memory 50 through a microcomputer.

Figures 7, 7A:
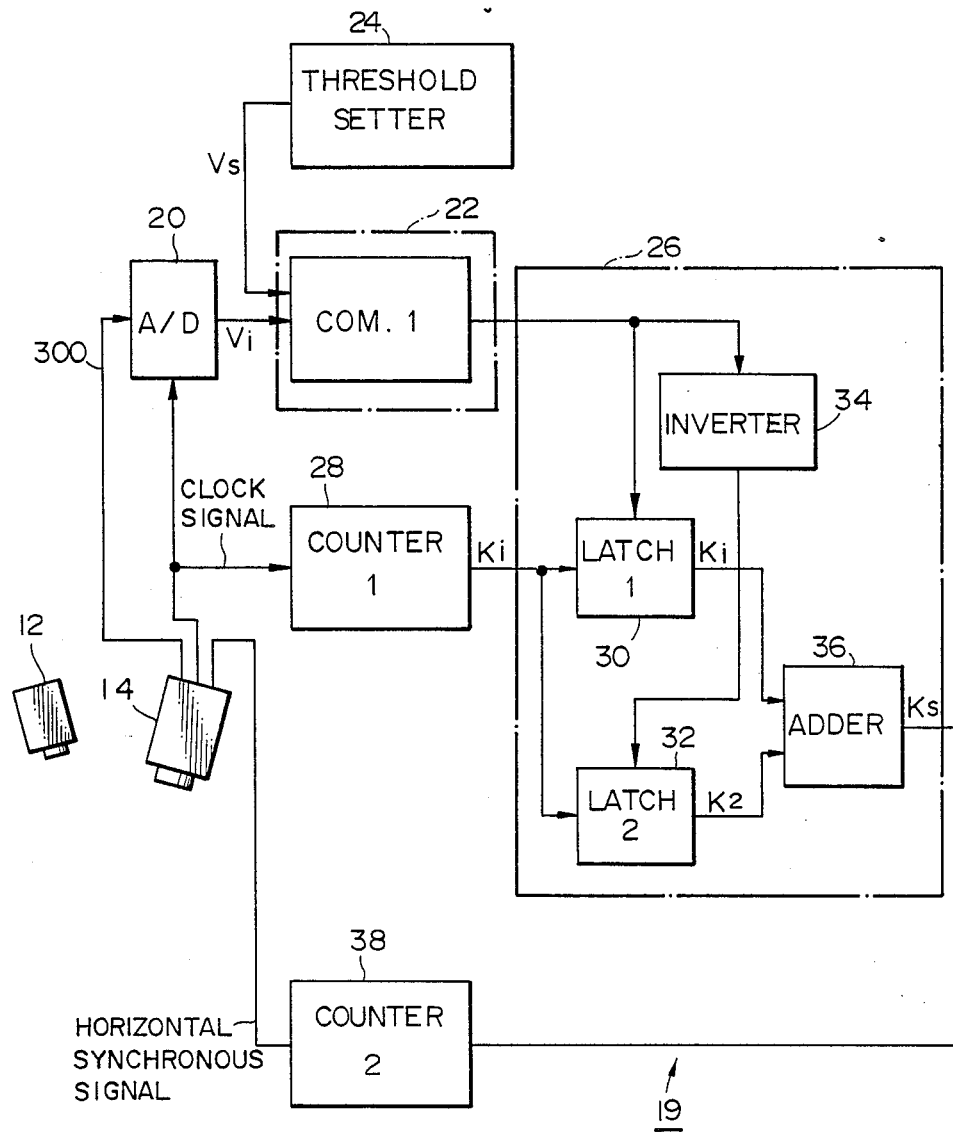
FIGS. 7, 7A and 7B are block diagrams of a second concrete example of the XYZ coordinates measuring system according to the first embodiment.
Figure 7B:
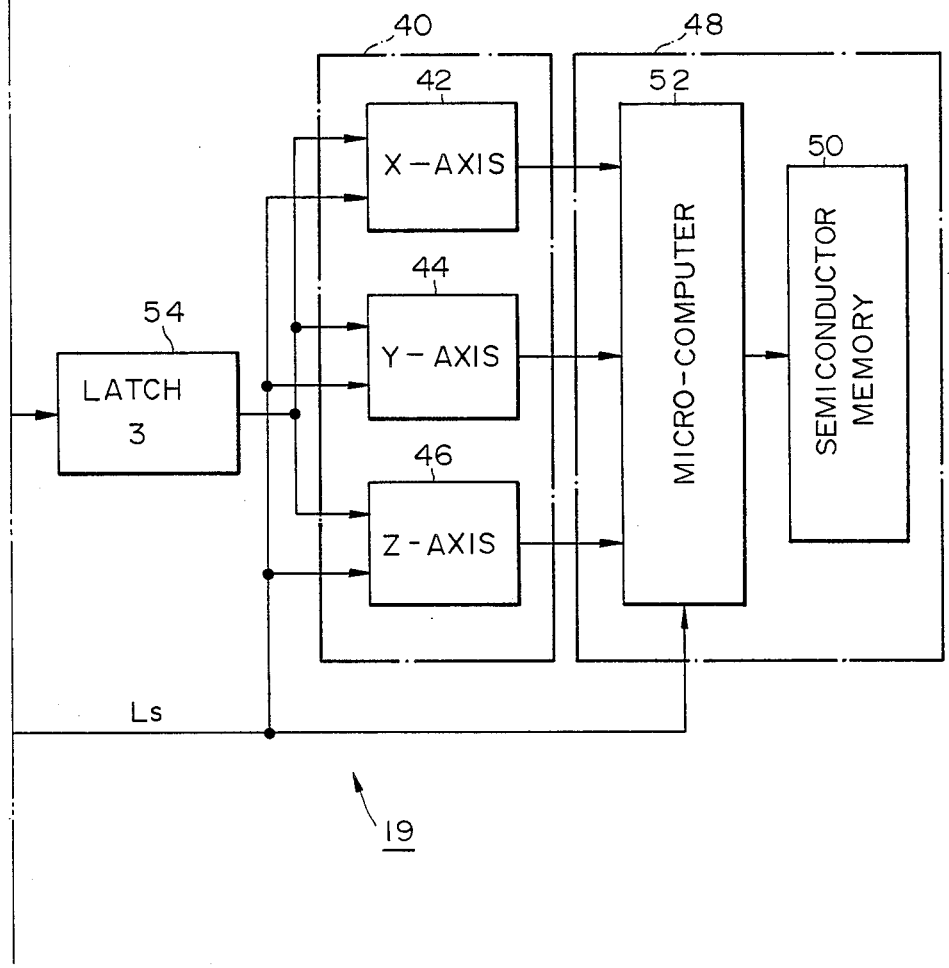

FIG. 7 shows a second concrete example in which a microcomputer is used as the memory circuit 48. In the second concrete example, the memory 48 comprises a semiconductor memory 50 and a microcomputer 52.

The microcomputer 52 is adapted to read X-, Y- and Z-axis coordinate values sequentially from the respective tables 42, 44 and 46 and to write them in the semiconductor memory 50. Since the reading and writing of the X-, Y- and Z-axis coordinates due to the microcomputer 52 require a total time equal to about several tens of microseconds, the microcomputer cannot process the data within the blanking time without modification.

To this end, the measuring system of the second concrete example is provided with a latch circuit 54 between the horizontal imaging position detecting circuit 26 and the look-up table 40. As seen from FIG. 5(b), this latch 54 is used to hold the horizontal imaging position Ks on the horizontal line for the next horizontal scan time.

In such a manner, the values Ks and Ls input into the look-up table 42 can be held constant until the next horizontal scan is terminated. Thus, the XYZ coordinates output from the look-up table 40 also are held constant for the next horizontal scan time (63.5 microseconds), so that the coordinate values can be written in the semiconductor memory 50, leaving a sufficient margin.

Even if the microcomputer 52 is used to write the coordinate values in the semiconductor memory 50 as in the second concrete example, the XYZ coordinates at one point can be detected and stored within one horizontal scan period (63.5 microseconds) to real-time measure the XYZ coordinates on each of the points (P0, P1 . . . ) along the light line 200.

THIRD CONCRETE EXAMPLE

Figure 8B:
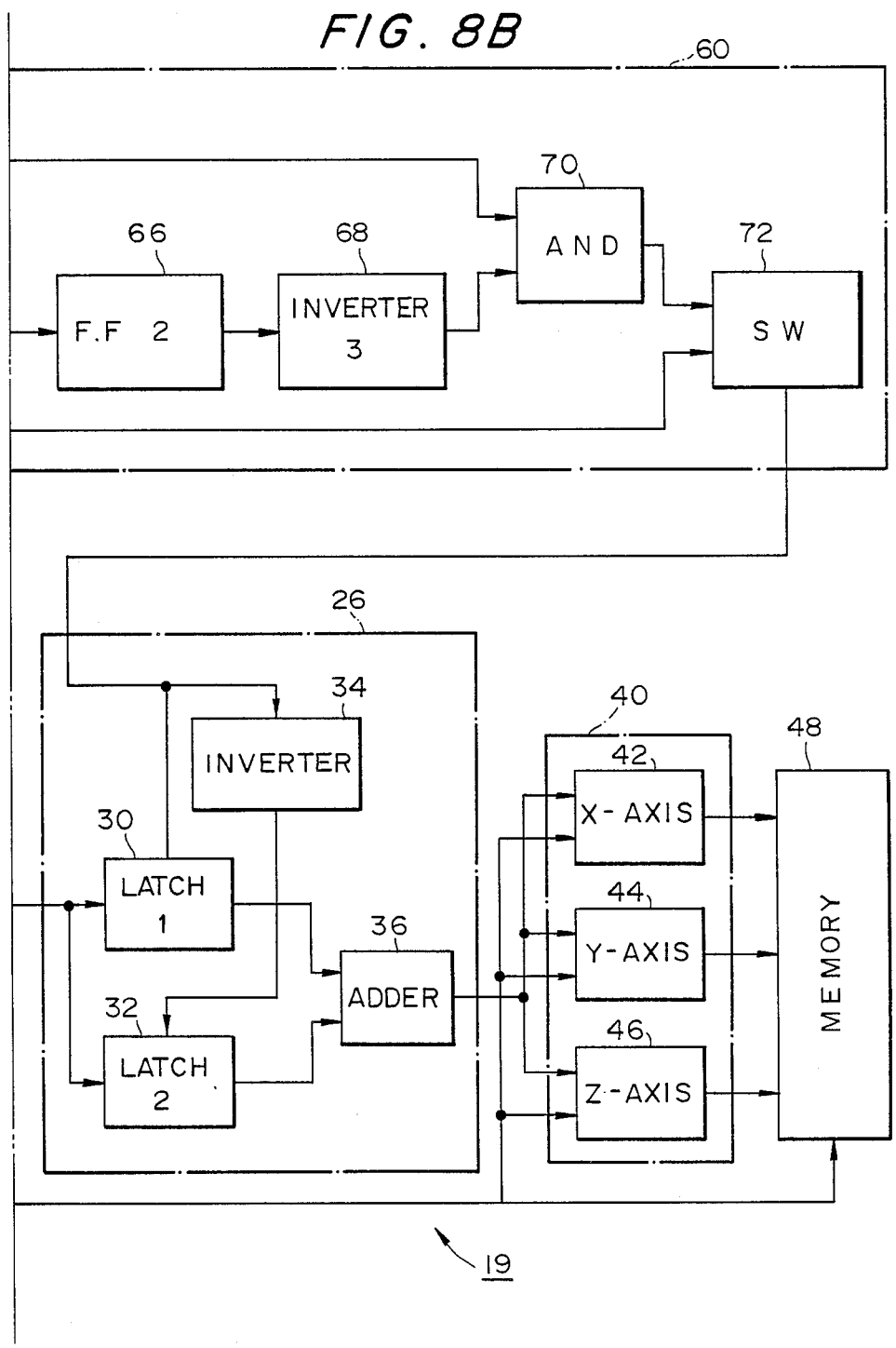

FIG. 8 shows a third concrete example of the XYZ coordinates measuring system according to the present invention.

The third concrete example is characterized by a light line assigning circuit 60 wherein when two or more light lines 200 exist on one horizontal scanning line, the first or last one of two or more detecting signals from the light line detecting circuit 22 is selected to provide it to the horizontal imaging position detecting circuit 26.

In other words, the third concrete example promises that on the measurement of XYZ coordinates using the slit light 100, only one light line 200 will create on one horizontal scan line. However, two or more light lines 200 may be produced on one horizontal scanning line, for example, due to the multi-reflection, depending on the geometry of the work to be measured.

Figure 9:
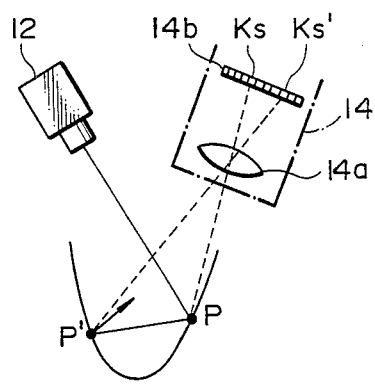
FIGS. 9(a) and 9(b) illustrate reflective lights in the third concrete example shown in FIG. 8 and the timing chart thereof.
Figure 9:
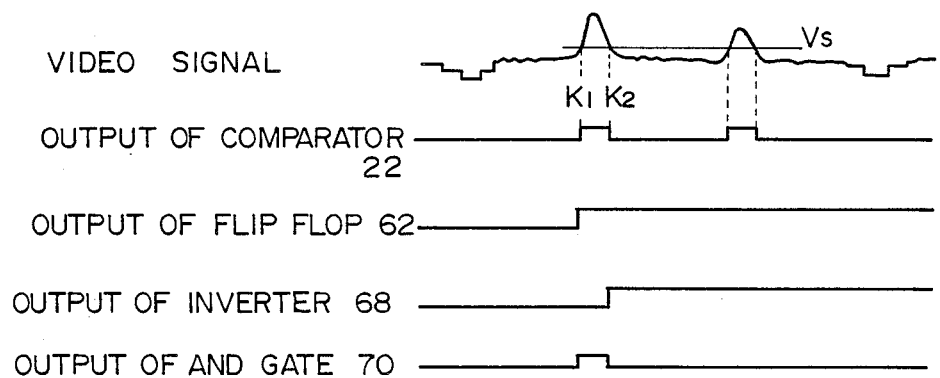

FIG. 9(a) shows a case wherein a light beam is reflected by two points P and P' to create two light lines 200 on one horizontal scanning line.

In such a case, the prior art performed the extraction of a proper imaging position Ks by software processing video signals stored in a frame memory or the like and setting a threshold Vs such that only the main reflective fraction from the point P can be detected or by separating a region wherein the reflective fraction from the point P is produced.

However, such a software processing requires an increased time to process one horizontal scanning line. It was impossible to fulfill the processing time required to be 63.5 microseconds or less in the actual production.

In the actual measurement, the general configuration of the work 10 to be measured is frequently known. In such a case, even if there are two or more peaks in the video signal Vi, it can be judged by an operator whether anyone of these peaks is a true value, as shown in FIG. 9(b).

Further, two images 200a of a light line may be formed on horizontal scanning lines also depending on the positional relationship of the TV camera 14 and the slit light source 12 and the work 10.

Figure 43C:
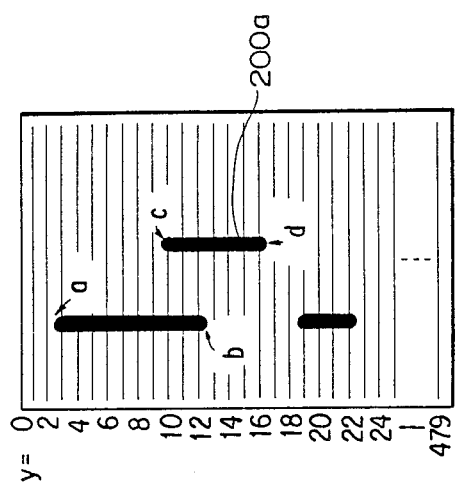
FIGS. 43(a)–(c) illustrate the images of two light line formed on the horizontal scanning line depending on the positional relationship of the slit light source and the TV camera relative to the work.
Figure 43A:
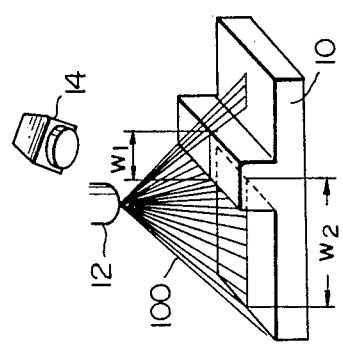
Figure 43B:
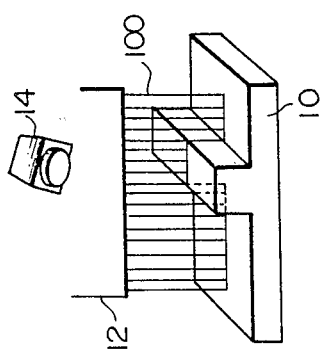

FIG. 43(c) shows images 200a of a light line formed on the work 10 by projecting a slit light beam 100 thereonto, these images being taken by the TV camera 14, as shown in FIG. 43(a). As seen from FIG. 43(c), two images 200a of the slit line may be created on one horizontal scanning line (ranged between the horizontal scanning lines y=9 and y=11 in this figure). This phenomenon is created depending on the geometrical configuration of the work and the relationship between the slit light source and the TV camera since a portion of the work adjacent the TV camera is imaged with larger magnification. FIG. 43(a) illustrates a radial array of slit light beams 100 from the source, but the above phenomenon may be produced depending on the relationship of the work and slit light source relative to the TV camera even if slit light beams are radiated from the source parallel to one another, as shown in FIG. 43(b).

Now assume that it is desired to measure the width $W_1$ of the work. This requires to detect XYZ coordinates at each of the points (c) and (d) on the light line 200a. On the other hand, to determine the width $W_2$ of the work requires the determination of XYZ coordinates at each of the points (a) and (b) on another light line image. When two light lines are formed on one horizontal scanning line as shown in FIG. 43(c), therefore, it must be judged whether either of the first or last light line, that is, either of the points (b) and (c) should be detected. Considering the work to be measured, however, such a determination can be made previously.

Thus, the measuring system of the third concrete example utilizes the light line assigning circuit 60 such that either of the first or last light line 200 is previously assigned, the assigned light line being selectively output to measure the coordinates.

Thus, the XYZ coordinates on the surface of the work can be exactly measured even if there are produced two light lines due to the multi-reflection. Even if two light lines are created depending on the geometry of the work and the positional relationship between the slit light cource and the TV camera, the exact measurement of the necessary XYZ coordinates can be performed.

The light line assigning circuit 60 comprises a flip flop 62, an inverter 64, a flip flop 66, an inverter 68, an AND gate 70 and a switch 72.

The output of the light line detecting circuit 22 is input directly into the flip flop 62 and also inverted through the inverter 64 before the inverted output is input into the flip flop 66.

If the first light line 200 is detected by the light line detecting circuit 22, therefore, the flip flop 62 is set at the positive edge K1 while the other flip flop 68 is set at the negative edge K2, as shown in FIG. 9(b).

The output of one of the flip flops 62 is input directly into the AND gate 72 while at the same time the output of the other flip flop 66 is inverted through the inverter 68. Thus, a pulse signal corresponding to the first light line 200 will selectively be output from the AND gate 70.

If one of the outputs from the AND gate 70 and light line detecting circuit 22 is selected by using the switch 72, the first or last one of light lines output from the light line detecting circuit 22 can be selected.

FOURTH CONCRETE EXAMPLE

Figure 10:
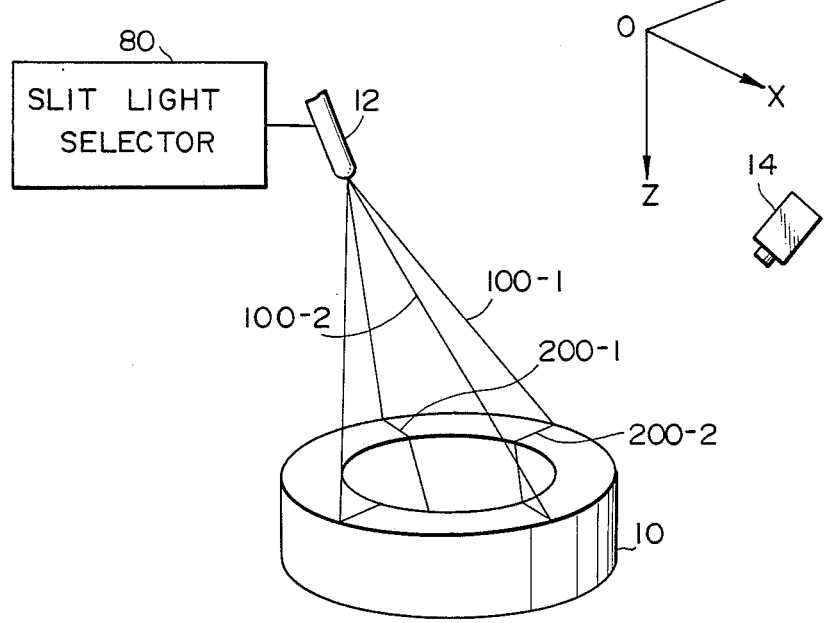
FIGS. 10(a) and 10(b) illustrate a fourth concrete example of the XYZ coordinates measuring system according to the first embodiment.
Figure 10:
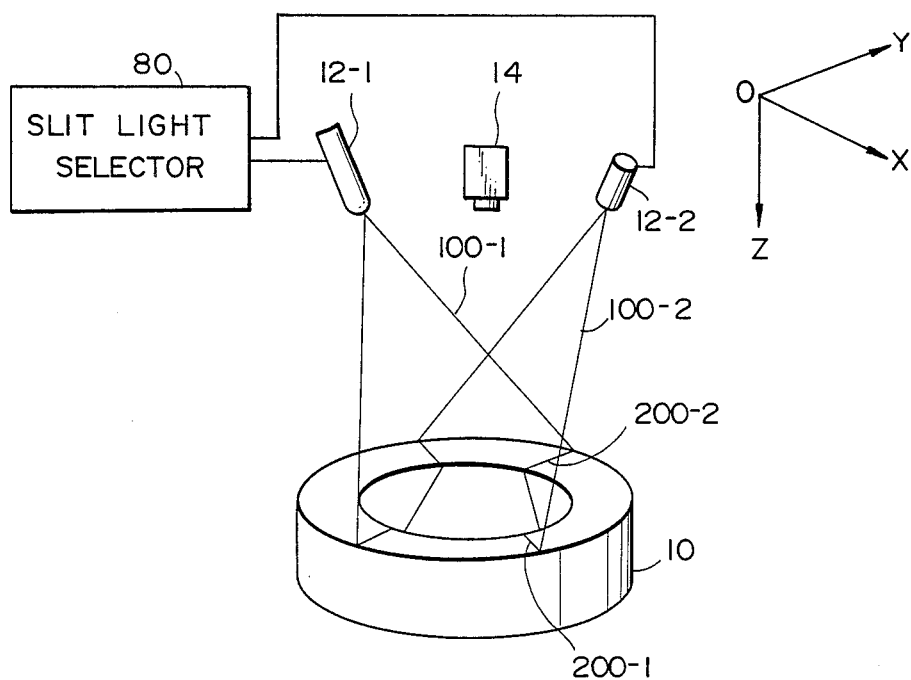
Figure 11:
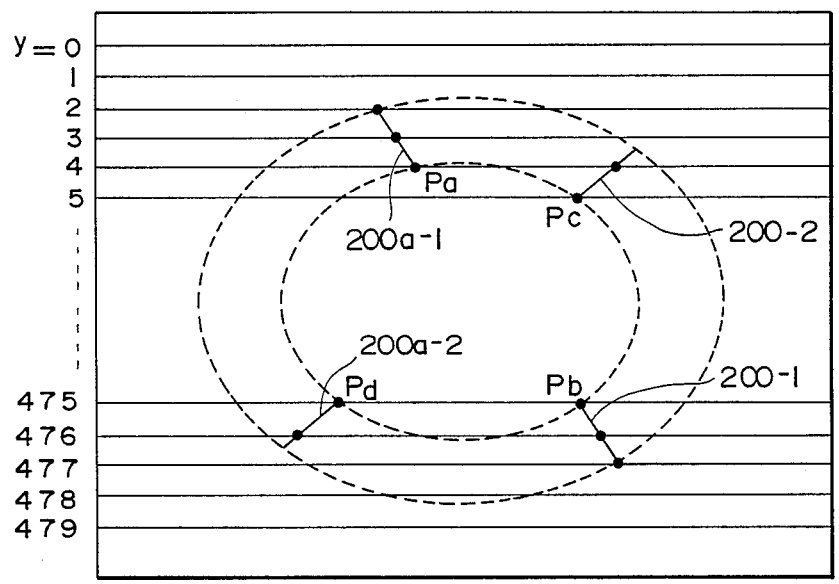
FIG. 11 illustrates an image in the TV camera, obtained using the system shown in FIG. 10.
Figure 12B:
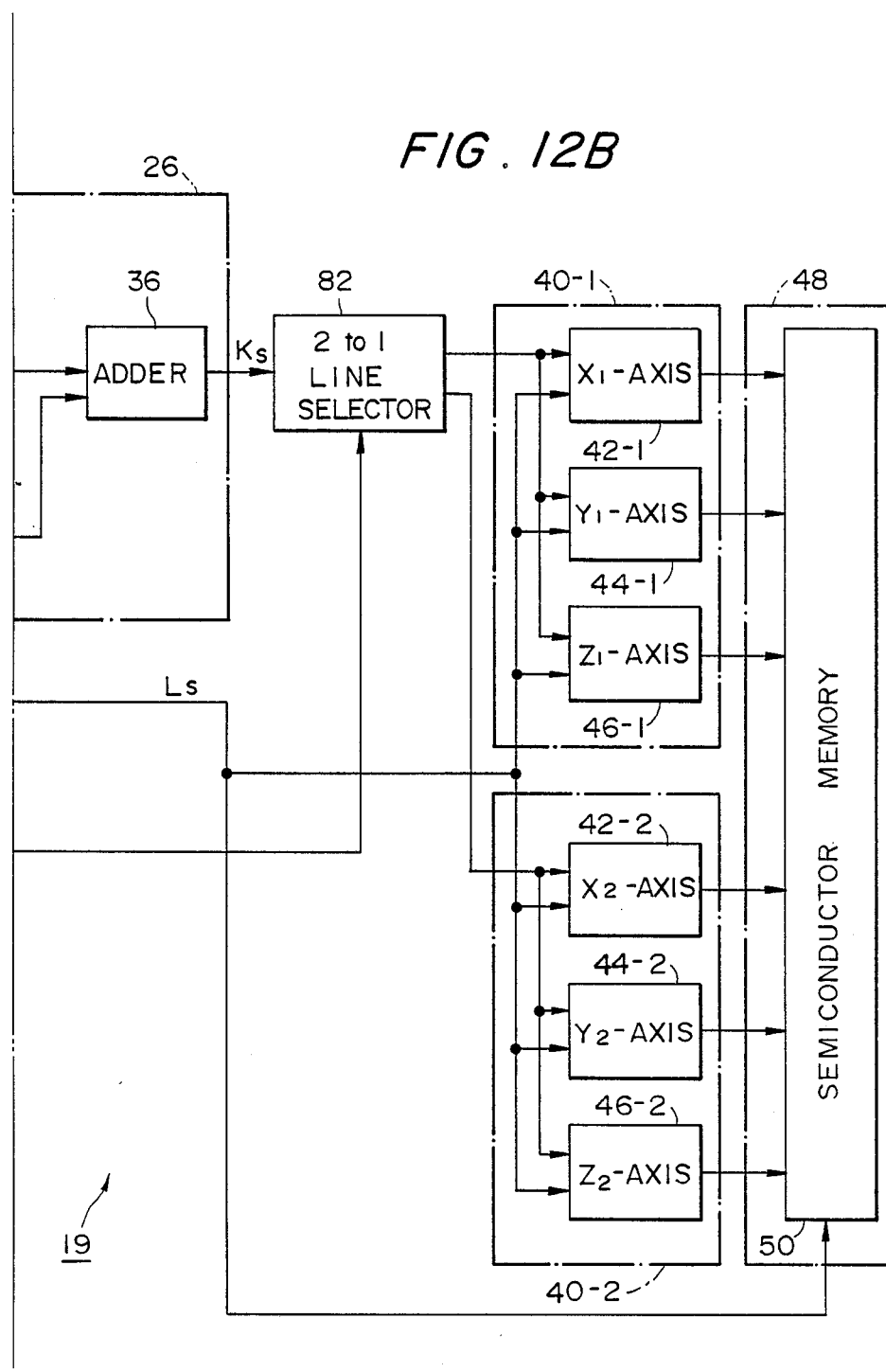

FIGS. 10 through 12 show a fourth concrete example of the XYZ coordinates measuring system according to the present invention.

The fourth concrete example is characterized by that a work having its three-dimensional configuration such as a machine part or product is to be high-speed measured with respect to its attitude, diameter or position to perform the automatic assembling or measuring of the part or product.

FIG. 10 shows a preferred example wherein a three-dimensional work 10 is optically measured with the XYZ coordinates on the surface thereof to control the attitude or to detect the aperture center.

The measuring system according to the fourth concrete example comprises a slit light source 12 adapted to project two non-parallel slit light beams 100-1 and 100-2 toward the surface of the work 10 with predetermined angles, and a slit light selecting circuit 80 adapted to select and project only anyone of the two slit light beams 100-1 and 100-2.

When the selected one of the slit light beams 100-1 or 100-2 is projected onto the work 10 through the slit light selecting circuit 80, a light line 200-1 or 200-2 is formed on the surface of the work and taken by the TV camera 14.

In the fourth concrete example, a plurality of slit light beams 100-1 and 100-2 may be projected from a single source of slit light 12 as shown in FIG. 10(a). Alternatively, a plurality of non-parallel slit light beams 100-1 and 100-2 may be projected respectively from a plurality of slit light sources 12-1 and 12-2 as shown in FIG. 10(b). Although the fourth concrete example has been described as to two slit light beams 100-1 and 100-2 selectively projected, three slit light beams may be selectively projected in accordance with the principle of the present invention, if required.

FIG. 11 shows two images 200a-1 and 200a-2 of light lines which are taken by the TV camera 14. (In the actual practice, the light line images 200a-1 and 200a2 will be taken by the TV camera 14 one at a time since the slit light beams 100-1 and 100-2 are projected one at a time.)

If it is assumed that the work 10 is of a cylindrical configuration, the coordinates of the central point in the circular bore of the cylinder, the diameter of the same bore and the attitude (inclination) of the top face of this cylinder can be detected when the XYZ coordinates at each of the end points $P_a$, $P_b$, $P_c$ and $P_d$ along the light lines 200 are known.

It is to be noted that the XYZ coordinates at each point $P_a$, $P_b$, $P_c$ or $P_d$ can be determined by sequentially detecting the light line positions Ks and Ls along the horizontal scanning line in the TV camera 14 at each time when the slit light beams 100-1 and 100-2 are projected.

If such a measuring system is incorporated into a movable mechanism in a robot or the like, therefore, the attitude or aperture size of the work 10 can be measured by positioning the measuring system relative to the work 10 and determining the XYZ coordinates thereof. The concrete circuit used in such an arrangement is shown in FIGS. 12.

The measuring system of the fourth concrete example further comprises two look-up tables 40-1 and 40-2 respectively adapted to receive the slit light beams 100-1 and 100-2 projected from the slit light source 12 and a look-up table selecting circuit 82 for suitably changing the look-up tables 40-1 and 40-2 from one to another.

One of the look-up tables 40-1 stores the interrelationship between the imaging positions Ks and Ls obtained on projection of the slit light beam 100-1 and the XYZ coordinates on the surface of the actual work 10.

Similarly, the other look-up table 40-2 stores the interrelationship between the imaging positions Ks and Ls obtained on projection of the slit light beam 100-2 and the XYZ coordinates on the surface of the actual work.

Although the fourth concrete example utilizes two look-up tables 40-1 and 40-2 for the two slit light beams 100-1 and 100-2, the present invention is not limited to such an arrangement and may utilize look-up tables corresponding in number to the number of slit light beams used therein.

The slit light selecting circuit 80 comprises a flip flop which is adapted to alternately change the slit light beams 100-1 and 100-2 from one to another in the regular order for one frame time (33.3 milliseconds) in accordance with an odd/even field signal from the TV camera 14.

The coordinate table selecting circuit 82 comprises a line selector which is adapted suitably to change the look-up tables 40-1 and 40-2 from one to another for one frame time period in accordance with the odd/even field signal from the TV camera 14.

Thus, the imaging positions Ks and Ls are input into the look-up table 40 corresponding to the selected slit light beam 100 from the horizontal and vertical imaging position detecting circuits 26 and 38, respectively.

In accordance with the fourth concrete example, therefore, the XYZ coordinates on the surface of the work can be measured by using a plurality of slit light beams 100-1 and 100-2. For example, the measuring system may be incorporated into an actuator in a robot or the like to measure the XYZ coordinates on the work such that a certain measuring operation such as detection of attitude in the work 10 or measurement of a circular bore in the work 10 as shown in FIG. 11.

Figure 13:
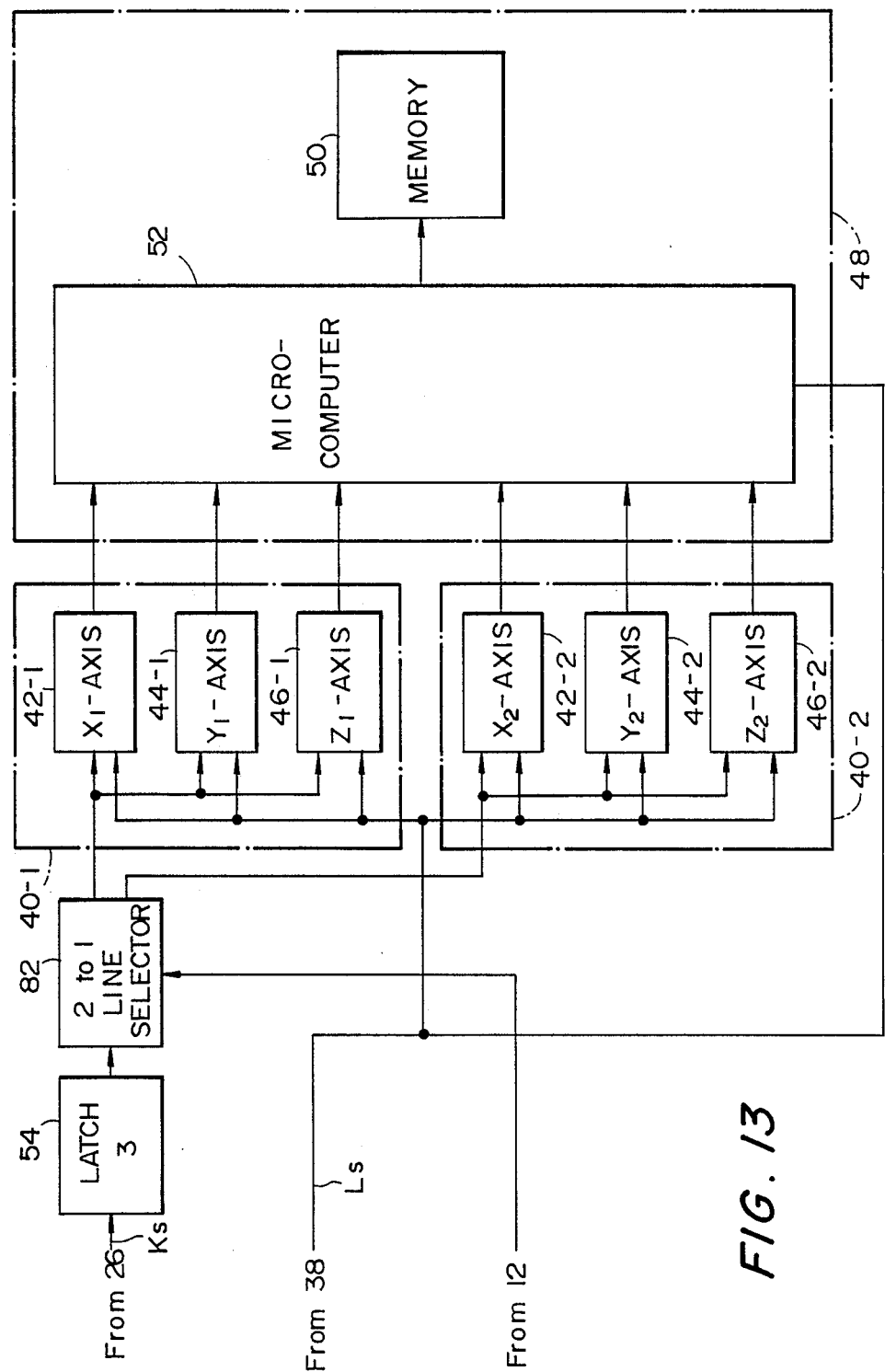
FIG. 13 is a block diagram showing another example of the memory in the system of FIG. 12.

Although the XYZ coordinates measuring system shown in FIG. 12 uses the memory circuit 48 including the semiconductor memory 50, the present invention is not limited to such an arrangement and may comprise a memory circuit consisting of a semiconductor memory and a microcomputer in a manner similar to the second concrete example, as shown in FIG. 13.

As seen from FIG. 13, a latch circuit 54 having the same function as that of the second concrete example is similary disposed between the horizontal imaging position detecting circuit 26 and the coordinate table selecting circuit 82.

Figure 14:
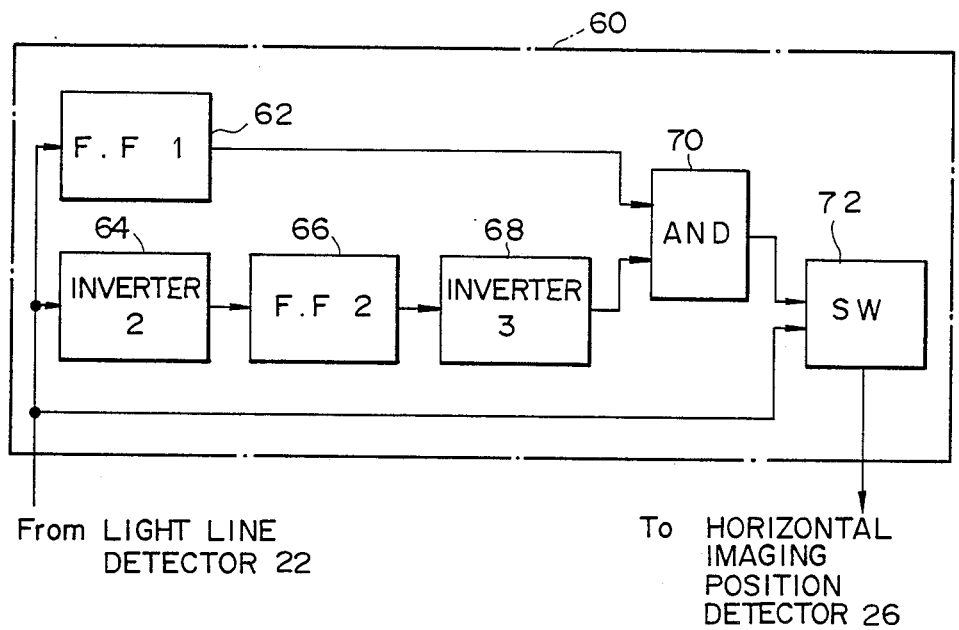
FIG. 14 is a block diagram of a light line assigning circuit used in the system of FIG. 12.

As shown in FIG. 14, the measuring system of the fourth concrete example preferably comprises a light line assigning circuit 60, if required. In such a case, the XYZ coordinates on the surface of the work can be measured even if there are a plurality of light lines 200 on one horizontal scanning line, as in the third concrete example.

Fifth Concrete Example

When the triangulation is used to measure the coordinates with the slit light 100 and the TV camera 14 as in the present invention, the accuracy of measurement is highly influenced by the width W of the light line 200 detected by the TV camera 14.

Figure 15:
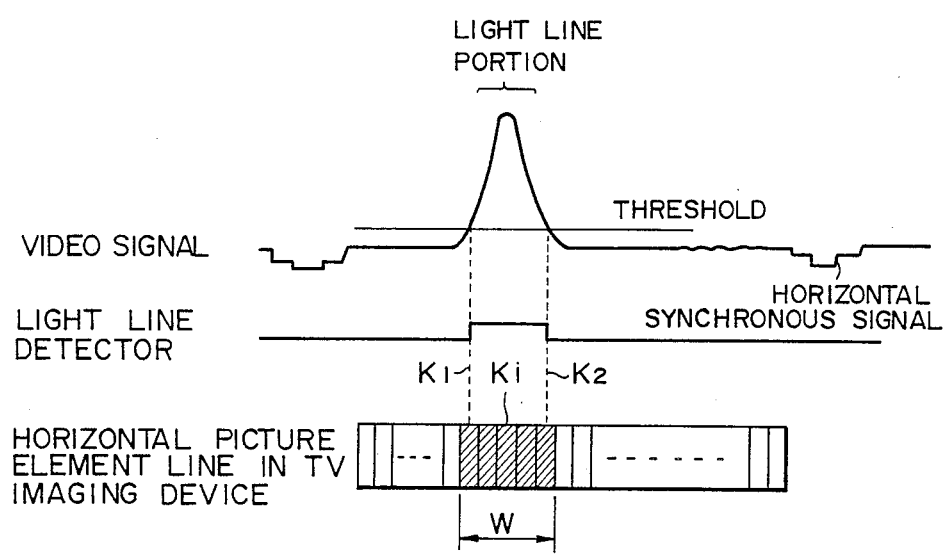
FIG. 15 illustrates the relationship between the video signal and the width of a light line received by the imaging device of the TV camera.

FIG. 15 shows the relationship between the width of a light line received by the imaging device 14b of the TV camera 14 and a video signal Vi.

If the light line has a narrow width W, for example, equal to one picture element in the imaging device 14b of the TV camera 14, the accuracy of measurement cannot be increased beyond the quantization error in one picture element even though the averaged value of the horizontal imaging positions K1 and K2 at the respective positive and negative edges of the light line 200 is determined. On the contrary, if the width W of the light line is too broad, another problem is raised in that the spacial resolution is decreased. Experiments showed that the optimum width W of the light line is a width corresponding to three through five picture elements (literature 1).

In the triangulation using the slit light beam 100 and the TV camera 14 as in the present invention, the accuracy of measurement is very influenced by whether or not the maximum value $V_p$ of the detected light line 100 is smaller than the saturated level of the imaging device 14b in the TV camera 14.

Furthermore, the maximum value $V_p$ of the light line 100 may be data effective to realize the measurement of coordinates with an increased accuracy, such as indexes for estimating coordinate data such that only coordinate data slightly smaller than the saturated level of the imaging device 14b are effective or feedback data used to weaken the intensity of slit light when the saturation level has been reached.

As shown in FIG. 16(a), the horizontal imaging position Ks can be determined under a condition wherein both the accuracy and spacial resolution are improved, when the reflective signal has the optimum intensity with the waveform thereof being of a configuration approximate to the Gaussian symmetry distribution.

On the contrary, the imaging device 14b is saturated to provide a trapezoidal waveform if the intensity of the reflective signal exceeds the saturation level $V_{sat}$, as shown in FIG. 16(b). The imaging position Ks determined at this time is reduced both in accuracy and spacial resolution.

If the intensity of the reflective signal is too weak as shown in FIG. 16(c), the S/N ratio is reduced and the accuracy of measurement is degraded.

The fifth concrete example is characterized by that the width W of the light line on each of the horizontal scans and the maximum value $V_p$ of that light line intensity are high-speed detected at the same time as the coordinates are measured, so that it is judged whether or not the width W of the light line and the intensity of the reflective signal are proper.

Figure 17B:
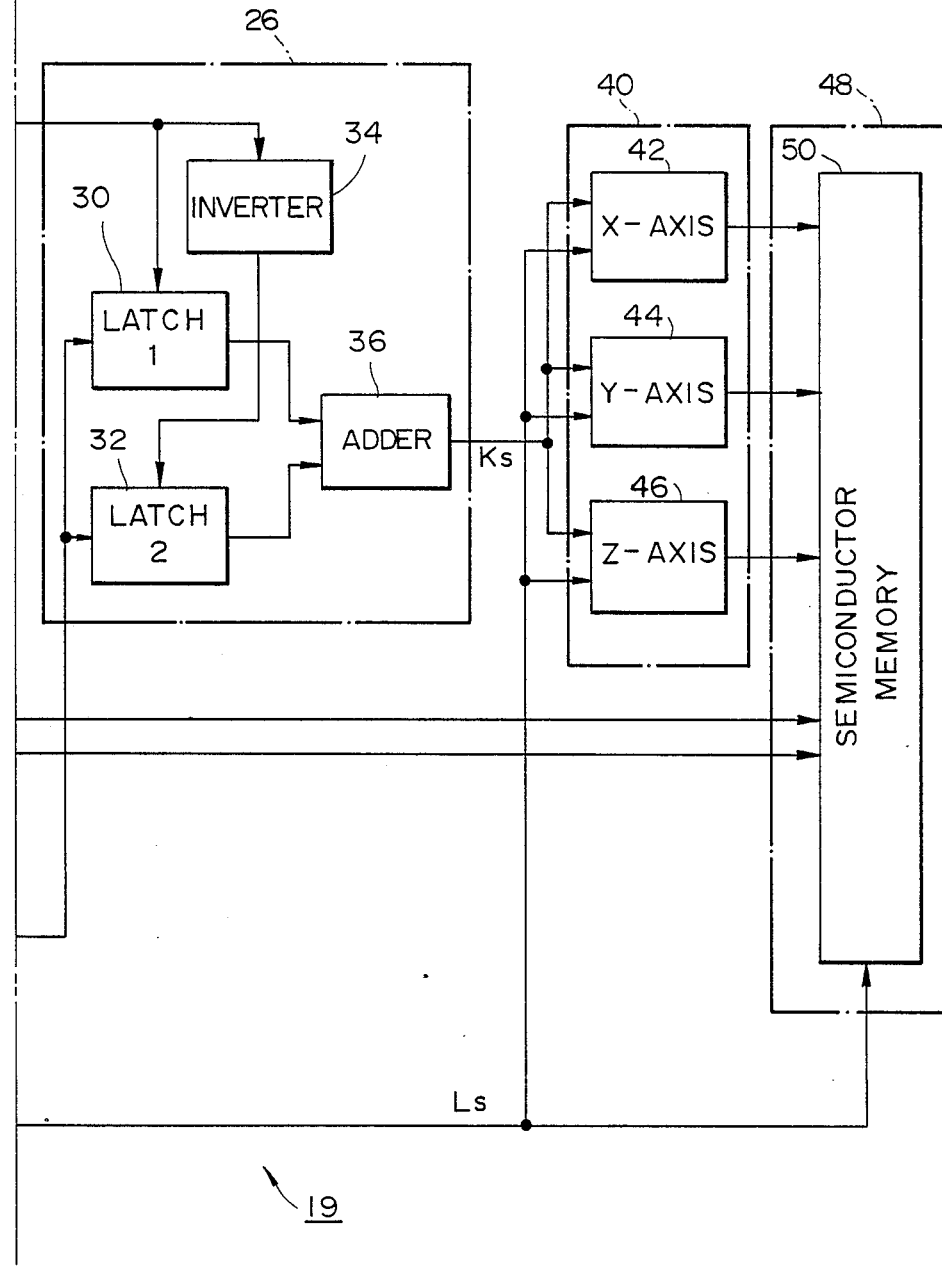

FIG. 17 shows a concrete circuit used in the XYZ measuring system according to the fifth concrete example, which system comprises a maximum light line value detecting circuit 90 and a light line width detecting circuit 92.

The maximum light line value detecting circuit 90 is adapted to detect the maximum value $V_p$ of a light line 200 extracted on each of the horizontal scans. This circuit 90 comprises a latch circuit 90a and a comparator 90b.

The latch circuit 90a is cleared at each point of time when a light line is detected. The latch 90a thereafter latches a video signal Vi output from the A/D converter 20.

The comparator 90b is adapted to compare the video signal Vi form the A/D converter 20 with the output of the latch circuit 90a. If the video signal Vi is larger than the latch output, the content of the latch circuit 90a will be updated.

As a result, the latch circuit 90a latches the maximum value $V_p$ of the light line with the latch output thereof being sent to the memory circuit 48.

The light line width detecting circuit 92 is adapted to detect the width W of the light line when each of the horizontal scans is accomplished.

The light line width detecting circuit 92 comprises a counter which is adapted to count clock signals from the TV camera 14 during such a period that the light line detecting signal is being output from the light line detecting circuit 22. Thus, the number of picture elements on the imaging device 14b receiving the light line 200 is detected to provide a detection signal W which in turn is supplied to the memory circuit 48.

Delay time in each of the latch circuit 90a and comparator 90b defining the maximum light line value detecting circuit 90 and the counter defining the light line width detecting circuit 92 is equal to several tens of nanoseconds. Therefore, each of these detecting circuits 90 and 92 can detect the maximum light line value $V_p$ or the light line width W at least within a time period ranged between several tens of nanoseconds and several hundreds of nanoseconds after the effective horizontal scan has been terminated.

The maximum value $V_p$ and width W so detected are written into the semiconductor memory 50 in the DMA (direct memory addressing) manner. As a result, they can be written into the memory 50 within several hundreds of nanoseconds after termination of the effective horizontal scan.

As will be apparent from the foregoing, the fifth concrete example can perform the high-speed measure with respect to the maximum light line value $V_p$ and the light line width W as well as the XYZ coordinates at each time whereat the TV camera 14 is operated to perform each of the horizontal scans, leaving a sufficient margin.

The fifth concrete example may also comprise a memory circuit consisting of a semiconductor memory and a microcomputer in a manner similar to those of the second and third concrete examples, if required. Further, the measuring system can include a light line assigning circuit as described at 60 in the preceding concrete examples.

COMPARISON OF THE FIFTH CONCRETE EXAMPLE WITH THE RELATED ART

The maximum light line value detecting circuit 90 and the light line width detecting circuit 92 which are used in the fifth concrete example will be described in comparison with the related art.

When it is to be judged whether the levels of the reflective signal value and light line width are proper, the prior art determined the maximum light line value $V_p$ and the light line width W by temporally storing video signals in the frame memory and then subjecting them to the software processing. This required a processing time equal to several hundreds microseconds per one measurement point and could not fulfill the desirable processing time equal to 63.5 microseconds which was pratically required in the production.

One the contrary, the measuring system of the fifth concrete example comprises the maximum light line value detecting circuit 90 and the light line width detecting circuit 92 which can detect the maximum light line value and the light line width parallel to the coordinate measurement and yet realize the high-speed detection within the desirable processing time equal to 63.5 microseconds per one measurement point.

Although the fifth concrete example has been described as to both the maximum light line value detecting circuit 90 and the light line width detecting circuit 92 which are incorporated into the XYZ coordinates measuring system, the present invention is not limited to such an arrangement and may be applied similarly to any arrangement in which only one of both the circuits 90 or 92 is provided.

SIXTH CONCRETE EXAMPLE

FIG. 18 shows a sixth concrete example of the XYZ coordinates measuring system according to the present invention.

The sixth concrete example is characterized by that it comprises a control circuit 110 adapted to control the width and intensity of a slit light beam into the optimum levels, depending on the light line width W and the maximum light line value $V_p$ which have been detected in each of the horizontal scans.

The control circuit 110 comprises a comparator 112, a maximum light line value setting device 114, a memory circuit 116, a comparator 118, a light line width setting device 120 and a microcomputer 122.

The comparator 112 is adapted to compare the maximum light line value $V_p$ from the circuit 90 with a maximum light line value $V_{sp}$ set by the maximum value setting device 114. The results ($V_p > V_{sp}$; $V_p \approx V_{sp}$; $V_p < V_{sp}$) are sequentially written into the memory circuit 116 at each of the horizontal scans.

Similarly, the comparator 118 is adapted to compare the light line width W from the circuit 92 with a light line width Ws set by the setting device 120. The results (W > Ws; W $\approx$ Ws; W < Ws) are written into the memory circuit 116 at each of the horizontal scans.

In such a manner, the maximum light line value $V_p$ and the light line width Ws which are detected on each of the horizontal scans are written and stored in the memory circuit 116.

The microcomputer 122 is adapted to control the width and value (W, $V_p$) of each of the slit light beams 100 projected from the source 12 into the optimum level, based on the contents of the memory circuit 116.

In other words, the control circuit 110 controls the intensity of the slit light to set it at a level slightly lower than the saturation level $V_{sat}$ of the imaging device 14b (for example, 0.8 to 0.9 X $V_{sat}$), based on the maximum light line value $V_p$ from the maximum value detecting circuit 90.

Similarly, the control circuit 110 controls the slit light to have its width W ranged between three and five picture elements in the imaging device 14b, based on the light line width W from the width detecting circuit 92.

The control of the slit light 100 may be carried out either prior to or parallel to the XYZ coordinate measurement.

More particularly, the three-dimensional measurement may be performed under such a condition that the maximum value $V_p$ and width W of a slit light beam 100 detected are in their optimum levels. If it is judged that these values are improper, the XYZ coordinate measurement is initiated after the value $V_p$ and width W of the slit light beam 100 have been controlled into the optimum values, respectively.

Alternatively, the judgement of a light line may be made parallel to the coordinate measurement.

For example, three-dimensional coordinate data obtained when it is judged that a light line is proper are stored in any suitable memory as effective data. On the other hand, three-dimensional coordinate data introduced when it is judged that a light line is improper are stored in the memory as noneffective data. If the three-dimensional coordinate data are improper, that slit light beam is properly controlled in intensity and width before the three-dimensional coordinate measurement is again carried out to rewrite them to effective data.

By repeating such a cycle, the XYZ coordinates measuring system of the sixth concrete example can measure the surface of the work 10 with an increased accuracy using the slit light beam 100 which has the optimum intensity and width.

Although the sixth concrete example has been described as to the control of both the maximum value $V_p$ and width W of the light line 100 detected into the optimum levels, the present invention is not limited to such a control and may be applied to such a construction that only the intensity of a slit light 100 is controlled based on the maximum light line value $V_p$ from the maximum value detecting circuit 90, if required. Alternatively, only the width of the slit light beam 100 may be controlled based on the light line width W from the width detecting circuit 92.

The sixth concrete example may be applied to the fourth concrete example such that a plurality of light lines formed on the work 10 can be controlled into their optimum intensity and width levels.

Although the first through sixth concrete examples of the first embodiment have been described as to such an arrangement that the horizontal scan video signals from the TV camera 14 are converted into digital signals through the A/D converter 20 and then input in the light line detecting circuit 22, the present invention is not limited to such an arrangement and may be adapted to input horizontal scan video signals from the TV camera 14 directly to the light line detecting circuit 22.

Although these concrete examples have been described as to that the slit light source 12 and the TV camera 14 are optionally set at any positions, the present invention can be further simplified by the fact that the plane including the slit light beam 100 is located incident with the Y-Z plane of FIG. 4(b) and the X-axis coordinate is defined to be always zero so that only two coordinate outputs from the Y- and Z-axis coordinates are used to reduce the number of coordinate tables.

(2) Second Embodiment

Figure 19:
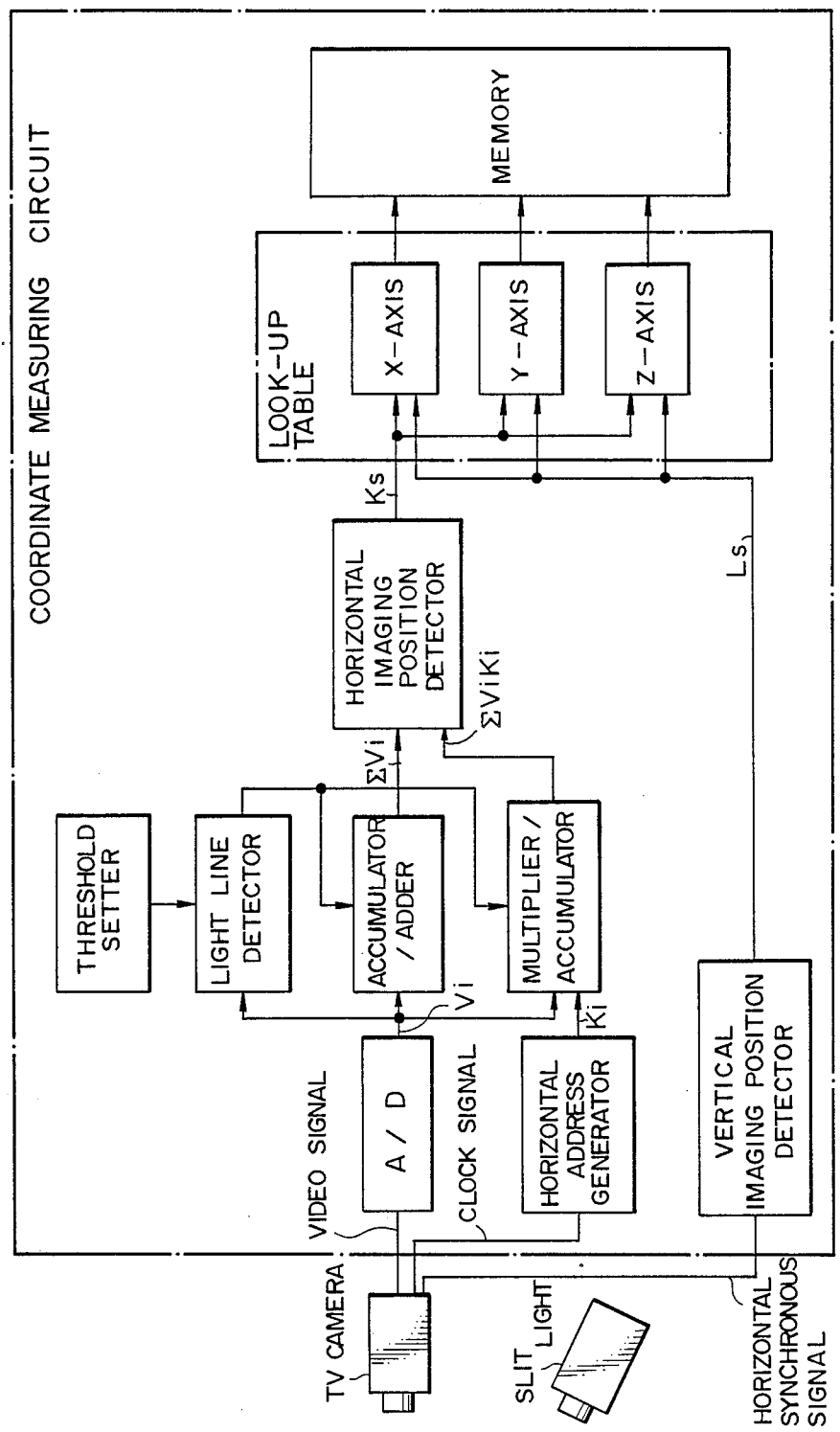
FIG. 19 shows a second preferred embodiment of an XYZ coordinates measuring system constructed in accordance with the present invention.

FIG. 19 shows a second preferred embodiment of an XYZ coordinates measuring system according to the present invention, which comprises a source of slit light for projecting a slit light beam onto the surface of a work with a predetermined angle; a TV camera for taking a light line formed on the work surface by the slit light beam and generating an output video signal; and a coordinate measuring circuit for processing the video signal to output XYZ coordinates on the surface of the work along the light line, the coordinate measuring circuit comprising an A/D converter for converting the video signal from the TV camera into a digital video signal Vi in synchronism with a horizontal scan; a threshold setting circuit for setting a threshold used to detect the light line from the video signal; a light line detecting circuit for outputting a light line detecting signal only during a period that the digital video signal Vi exceeds said threshold; a horizontal address generating circuit for generating a horizontal address Ki representative of the position of a horizontal picture element on the imaging device of the TV camera; an adder/accumulator for accumulating video signals Vi from the TV camera through the A/D converter during a period for which the light line detecting signals are being outputted from the light line detecting circuit; a multiplier/accumulator for accumulating a product Vi×Ki of each video signal Vi from the A/D converter and each horizontal address Ki from the horizontal address generating circuit during a period for which the light line detecting signals are being output from the light line detecting circuit; a horizontal imaging position detecting circuit for dividing the output $\Sigma Vi \times Ki$ from the multiplier/accumulator by the output Vi of the adder/accumulator with the result Ks being generated as an output signal representative of a horizontal imaging position; a vertical imaging position detecting circuit for counting horizontal synchronizing signals from the TV camera to detect a vertical imaging position Ls; a look-up table for previously storing the interrelationship between the horizontal and vertical imaging positions and the XYZ coordinates on the surface of the actual work to be measured and for outputting the XYZ coordinates on the surface of the work based on the detected values Ks and Ls of the horizontal and vertical imaging positions; and memory circuit for storing the XYZ coordinate data output from the look-up table, whereby the XYZ coordinates on the surface of the work along the light line can be real-time measured.

Such an arrangement of the present invention will operate as follows. In this connection, the description of the same functions as those of the first preferred embodiment previously described will not be omitted.

Detection of Ks

The second embodiment is different from the first embodiment in that the XYZ coordinates measuring system according to the second embodiment is adapted to detect the horizontal imaging position Ks by the use of the center-of-gravity calculation.

FIG. 20 (a) shows a video signal output from the TV camera in synchronism with a horizontal scan, in which raised signal portions represent parts of a light line to be indicated. In order to perform the exact measurement of coordinates, it is required that the peak value of each of the raised signal portions is accurately determined as a horizontal imaging position Ks.

In accordance with said literature 1, the configuration of each raised signal portion of the light line 200 is approximated to the Gaussian symmetry distribution.

During a time period for which the video signal exceeds a threshold Vs as shown in FIG. 20(a) (the start and end points of this time period being defined by horizontal picture element addresses Kis and Kie, respectively), therefore, a value Ks obtained by subjecting the horizontal picture element address Ki to the center-of-gravity calculation can be approximated to the peak of the raised signal portion based on the following equation. This has been confirmed experimentally in literature (OKADA Takushi; SUGIMOTO Yoshihiro; OKABE Takafumi and HATA Seiji, "3-Dimensional Recognition Using ITV Camera and Slit Light Range Finder (1)", National Convention Record of the Institute of Electronics and Communication Engineers of Japan, pp. 5–54, 1985).

$$Ks = \sum_{i=is}^{ie} Ki \cdot Vi / \sum_{i=is}^{ie} Vi \qquad (1)$$

Thus, the measuring system of the second embodiment is adapted to first input a horizontal scan video signal from the TV camera into the light line detecting circuit in which the indicating position of the light line 200 on that horizontal scan line is detected and output. Such an detection of the light line 200 can be easily performed by comparing the horizontal scan video signal with a predetermined threshold Vs, as shown in FIG. 20(a).

In the second embodiment, further, the horizontal scan video signal Vi output from the A/D converter is input respectively into the adder/accumulator and multiplier/accumulator by which the denominator and numerator of the above first equation are calculated, respectively.

The adder/accumulator accumulatively adds the outputs Vi of the A/D converter during a time period for which the light line detecting circuit is detecting and outputting the light line 200 on each of the horizontal scan lines. Thus, the adder/accumulator will output the calculated value of the denominator of the first equation (1), that is, the accumulated value of the video signals Vi:

$$\sum_{i=is}^{ie} Vi$$

The multiplier/accumulator accumulates a product of each output Vi from the A/D converter and each output Ki from the horizontal address generating circuit during a time period for which the light line detecting circuit is detecting and outputting the light line 200 on each of the horizontal scan lines. Thus, the multiplier/accumulator will output the calculated value of the numerator in the above first equation, that is, the accumulated products of the video signals Vi and the horizontal picture element addresses Ki:

$$\sum_{i=is}^{ie} Vi \times Ki$$

The outputs of the respective adder/accumulator and multiplier/accumulator are input into the horizontal imaging position detecting circuit wherein the horizontal imaging position Ks is determined from the aforementioned first equation (1).

The calculating time for the horizontal imaging position Ks will be described below.

There is first studied a case where commercially available multiplier/accumulators are used as the adder/accumulator and multiplier/accumulator of the second embodiment, and a commercially available divider is used to perform the division for detecting the horizontal imaging position such that the center-of-gravity calculation represented by the first equation is carried out in the hardware manner.

In such a case, the delay time in the multiplier/accumulator is equal to about 100 nanoseconds while the delay time in the divider is in the order of a few microseconds. In accordance with the second embodiment, therefore, the detection of the horizontal imaging position Ks can be completed within a reduced time period equal to about 5-6 microseconds after the effective horizontal scan period shown in FIG. 20(a) has been terminated.

Detection of Ls

The vertical imaging position Ls corresponds to the number of horizontal scanning lines used for detecting the horizontal imaging position Ks.

In the second embodiment, as each horizontal scan video signal is output from the TV camera, the vertical imaging position detecting circuit is used to count horizontal synchronous signals from the TV camera to determine the vertical imaging position Ls for that horizontal scan video signal.

In such a manner, the horizontal and vertical imaging positions Ks and Ls at a light line point P on the horizontal scanning line can be detected within about 5-6 microseconds after the effective horizontal scan period of the TV camera has been terminated.

XYZ Coordinates

The measuring system of the second embodiment can determine XYZ coordinates corresponding to the detected values of the imaging positions Ks and Ls as in the first embodiment.

Therefore, the detection and storage of XYZ coordinates at one point corresponding to a light line on a horizontal scanning line can be completed within 6-7 microseconds, that is, the blanking time after the effective horizontal scan period of the TV camera has been terminated.

In such a manner, the measuring system of the second embodiment can perform the detection of XYZ coordinates on one point within one horizontal scan period of the TV camera (63.5 microseconds), leaving a sufficient margin. Thus, the measuring system can real-time measure XYZ coordinates on each of points (P0, P1, P2 . . . ) along the light line 200.

The software processing from the microcomputer may be utilized for the division on detection of the horizontal imaging position Ks and the writing of the coordinate values X, Y and Z into the memory circuit. This requires a division time equal to about 20 microseconds, and a storage time equal to about 20 microseconds and therefore cannot complete these processing operations within the blanking time as it is. If the output of the look-up table can be held during one horizontal scan period as shown in FIG. 20(b), however, the storage in the memory circuit can be executed in the next horizontal scan period. Thus, the real-time measurement can be made within the effective horizontal scan period (63.5 microseconds) in the TV camera.

Such an arrangement provides a further advantage in that the entire construction of the measuring system can be more simplified, in comparison with such a system that a hardware divider is used to form a horizontal imaging position detecting circuit or that the writing is made to the memory circuit in the DMA manner.

In accordance with the second embodiment, thus, XYZ coordinates at each of various points on the surface of a three-dimensional work along a light line can be high-speed measured with an increased accuracy.

Furthermore, the second embodiment can more accurately detect horizontal imaging positions Ks since it utilizes the center-of-gravity calculation.

Since the second embodiment is adapted to previously store the horizontal and vertical imaging positions Ks and Ls and the XYZ coordinates at each measurement point P on the surface of the work into the look-up table, it can cause an XYZ coordinate position to output directly from the look-up table without need of any particular processing operation if the imaging positions Ks and Ls for that measurement point are once determined. Therefore, the second embodiment can simply convert the detected imaging positions Ks and Ls into the XYZ coordinate values such that the entire construction of the measuring system can be more simplified.

CONCRETE EXAMPLES

Some concrete examples of the second embodiment will be described with reference to the drawings, in which parts similar to those of the concrete examples in the first embodiment are denoted by similar reference numerals and the description thereof will be omitted.

FIRST CONCRETE EXAMPLE

Figure 21:
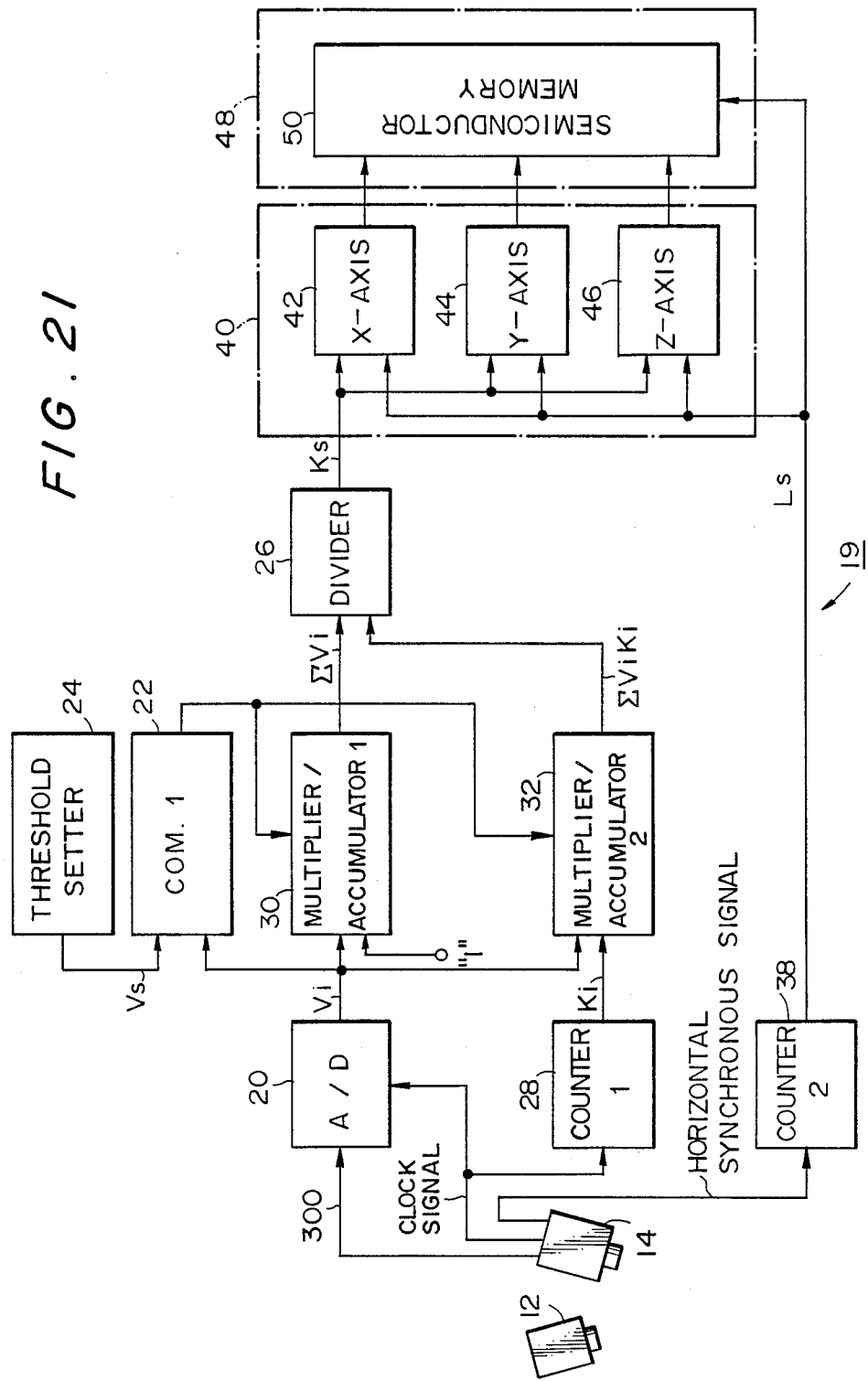
FIG. 21 is a block diagram of a first concrete example of the XYZ coordinates measuring system relating to the second preferred embodiment.

FIG. 21 shows a first concrete example of the XYZ coordinates measuring system according to the second embodiment of the present invention.

The measuring system is adapted to project a slit light beam 100 from a source of slit light 12 onto a three-dimensional work 10 with a predetermined angle to form a light line 200 on the work 10, which line 200 in turn is taken by a TV camera 14. The output of the TV camera 14 generates a video signal 300 which in turn is input into a coordinate measuring circuit 19.

After input into the coordinate measuring circuit 19, the video signal 300 is converted into a digital video signal Vi by an A/D converter 20 in synchronism with the clock cycle in the TV camera 14. The digital video signal Vi is then input into a light line detecting circuit 22, an adder/accumulator 30 and a multiplier/accumulator 32.

A threshold setting circuit 24 is adapted to set a threshold value used to detect the light line from the video signal, the threshold also being input into the light line detecting circuit 22.

The light line detecting circuit 22 comprises a comparator adapted to compare the input video signal Vi with the threshold Vs, as shown in FIG. 20(a). If the video signal Vi is larger than the threshold Vs, light line detecting signals are supplied to the adder/accumulator and multiplier/accumulator 30 and 32 during a time period for which the video signal Vi exceeds the threshold Vs.

The measuring system of the first concrete example further comprises a horizontal address generating circuit 28 which consists of a counter adapted to count clock signals from the TV camera 14. The resulting count Ki is then sent to the multiplier/accumulator 32 as a horizontal address representative of the horizontal position of the imaging device 14b.

The adder/accumulator 30 comprises a hardware type multiplier/accumulator adapted to multiply the output Vi of the A/D converter circuit 20 by a value "1" to calculate the accumulated value $$\sum_{i=is}^{ie} Vi$$

during a time period for which the light line detecting circuit 22 is detecting and outputting the light line 200.

Such an accumulative calculation is repeated at each time when a horizontal synchronous signal is output from the TV camera 14. Therefore, the adder/accumulator 30 will calculate the denominator of the first formula to generate an output signal at each time when a horizontal scan video signal is output from the TV camera 14.

The multiplier/accumulator 32 is composed of a hardware type multiplier/accumulator device which is adapted to multiply the signals Vi from the A/D converter 20 by the horizontal addresses Ki from the horizontal address generating circuit 28 during a time period for which the light line detecting circuit 22 is outputting light line detecting signals. The resulting accumulated value is:

$$\sum_{i=is}^{ie} Vi \times Ki$$

This multiplier/accumulator is repeated at each time when a horizontal synchronous signal is output from the TV camera 14.

The multiplier/accumulator 32 will calculate the numerator of the first equation to form an output signal at each time when a horizontal scan video signal is output from the TV camera 14.

These two accumulated values ΣVi and ΣVi×Ki are then supplied to the horizontal imaging position detecting circuit 26 which consists of a divider. In the divider, the latter value is divided by the former value to determine the horizontal imaging position Ks shown in the first equation.

The vertical imaging position detecting circuit 38 in the first concrete example of the second embodiment comprises a counter adapted to count horizontal synchronous signals from the TV camera 14 to detect the number of a horizontal line presently scanned by the TV camera 14, that is, its vertical imaging position Ls.

In the first example of the second embodiment, the adder/accumulator and multiplier/accumulator 30 and 32 are of hardware type with the operational delay time ranged in the order of several tens of nanoseconds. Therefore, the measuring system of the first example can detect the values ΣVi, ΣVi×Ki and Ls at least within several tens of nanoseconds after the effective horizontal scan has been terminated as shown in FIG. 20(a).

If the horizontal imaging position detecting circuit 38 is a standard hardware divider which is commercially available, the division time is in the order of a few microseconds, so that the horizontal imaging position Ks can be detected within 5–6 microseconds after the effective horizontal scan of FIG. 20(a) has been terminated.

The horizontal and vertical imaging positions Ks and Ls detected relative to each of the points P are then provided to the look-up table 40.

The look-up table 40 in the first concrete example of the second embodiment also is adapted to previously store the interrelationship between the horizontal and vertical imaging positions Ks and Ls and the XYZ coordinate values at each point on the surface of the three-dimensional work 10. At each time when horizontal and vertical imaging positions Ks and Ls are input into the look-up table 40, the corresponding XYZ coordinates are provided to the memory circuit 48.

In accordance with the first concrete example of the second embodiment, therefore, the XYZ coordinates at each measurement point P on the work 10 can be rapidly measured at each time when the horizontal and vertical imaging positions Ks and Ls are detected with respect to that measurement point P, without any particular calculation or software processing.

The look-up table 40 comprises an X-axis table 42, a Y-axis table 44 and a Z-axis table 46. Each of the tables 42, 44 or 46 consists of a ROM in which the horizontal and vertical imaging positions Ks and Ls and the XYZ coordinates have been stored previously.

When each of the tables 42, 44 or 46 receives the values Ks and Ls at the same time as each of the effective horizontal scans shown in FIG. 20(a) is terminated, the table 42, 44 or 46 outputs the corresponding XYZ coordinates after several hundred nanoseconds, which coordinates in turn are written in the memory circuit 48.

The memory circuit 48 includes a semiconductor memory 50 having addresses each of which corresponds to the number of each horizontal line in the TV camera 14.

The XYZ coordinates output from the tables 42, 44 and 46 are sequentially stored by the memory circuit 48 at an address specified by the corresponding vertical imaging positions Ls (the number of the corresponding line in the TV camera 14) from the vertical imaging position detecting circuit 38. This is called DMA (direct memory addressing) since the addressing is made directly relative to the memory 50 without use of any computer.

In such a case where data are stored directly in the semiconductor memory 50, the storage of data will be terminated after several hundreds of nanoseconds from when the coordinates are provided to the memory 50. In other words, the XYZ coordinates on one point will be completely stored in the memory within about one microsecond after termination of the effective horizontal scan.

In such a manner, the measuring system of the first concrete example of the second embodiment can complete its detection and storage operation for XYZ coordinates at one point corresponding to the light line 200 on the horizontal scanning line within about 6–7 microseconds, that is, within the blanking time after termination of the effective horizontal scan period in the TV camera 14.

As a result, XYZ coordinates on one point can be detected within one horizontal scan period (63.5 microseconds) in the TV camera 14 to realize the real-time measurement of the XYZ coordinates at each of the points (P0, P1 . . . ) along one light line 200.

In the first concrete example of the second embodiment, any suitable software processing due to a microcomputer may be utilized to perform the division for detecting the horizontal imaging position Ks and the writing of the coordinate values into the semiconductor memory 50. Such a concrete arrangement will not be further described with its function since they have been described in detail in connection with the first embodiment of the present invention.

SECOND CONCRETE EXAMPLE

Figure 24:
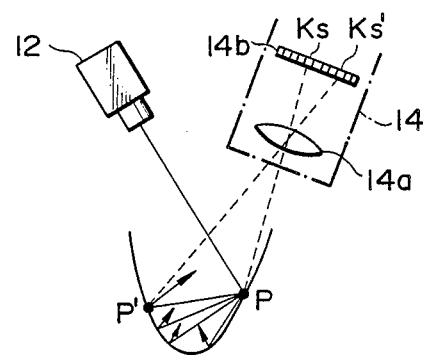
FIGS. 24(a) and 24(b) illustrate reflective lights in the second concrete examples shown in FIG. 22 and the timing chart thereof.
Figure 24:
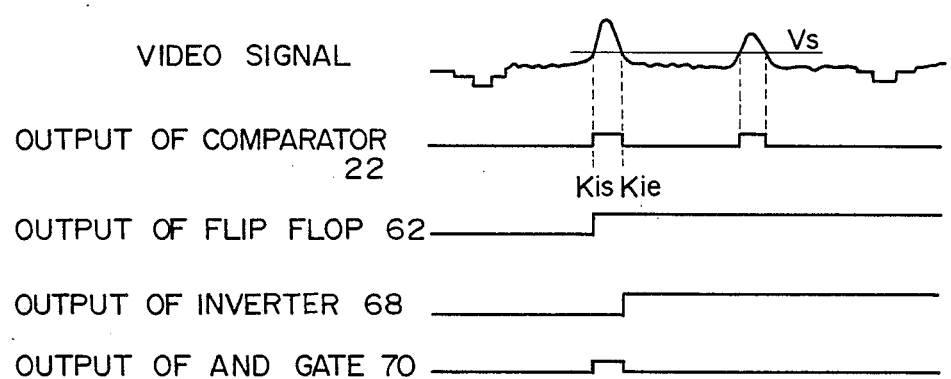

The measurement of XYZ coordinates by the use of the slit light 100 premises that only one light line 200 is created on one horizontal scanning line. However, two light lines 200 may be produced on one horizontal scanning line due to the multi-reflection depending on the configuration of the work 10 and the positional relationship between the slit light source and the TV camera. When a light beam is reflected by two points P and P' due to the double-reflection as shown in FIG. 24, two light lines 200 may be created on one horizontal scanning line. As shown in FIG. 43, two light lines may be produced on one horizontal scanning line depending on the configuration of the work and the positional relationship between the slit light source and the TV camera.

Figure 22:
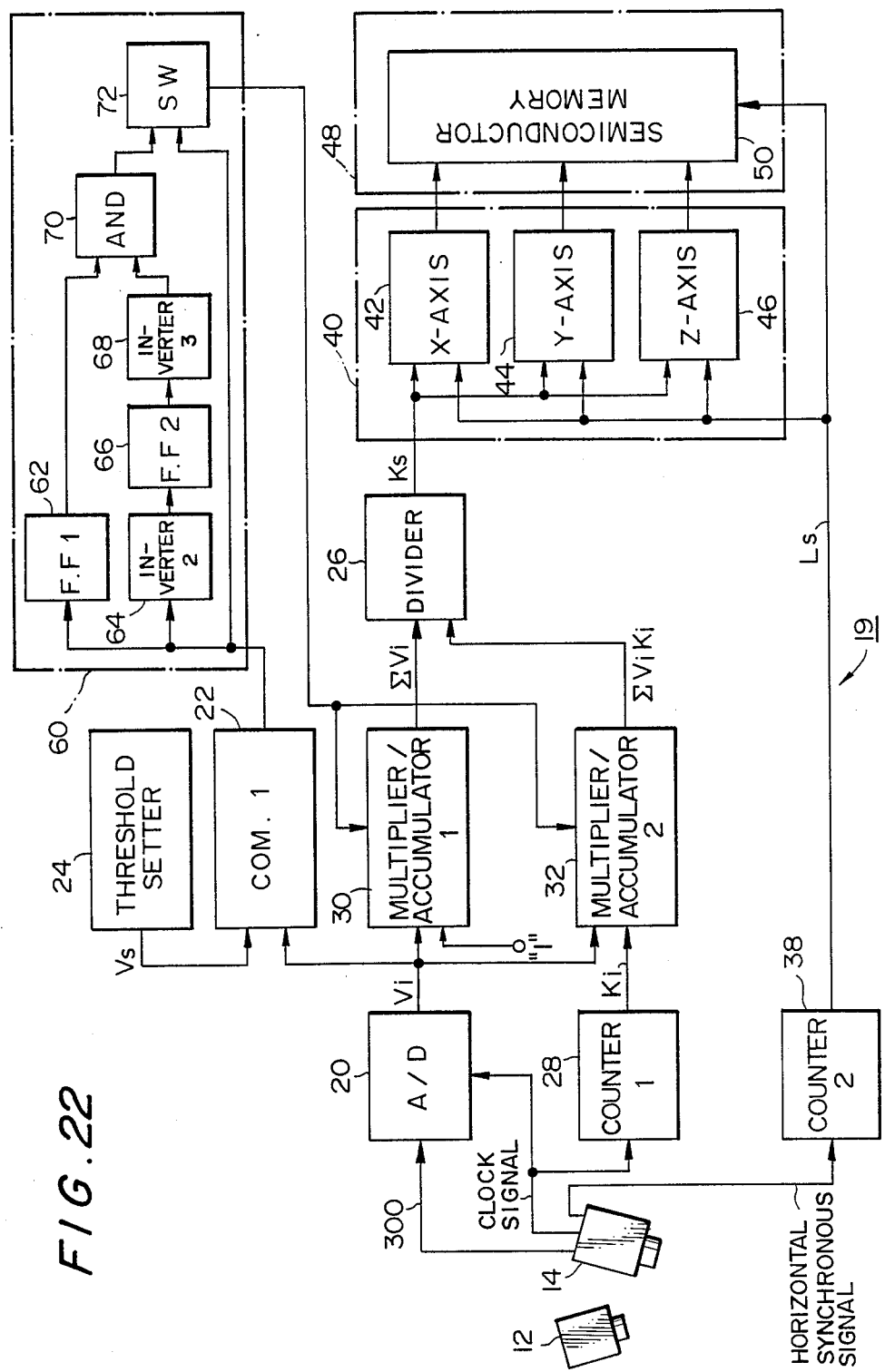
FIG. 22 is a block diagram of a second concrete example of the XYZ coordinates measuring system relating to the second preferred embodiment.

FIG. 22 shows an XYZ coordinates measuring system constructed to overcome the above problem of the multireflection.

The second concrete example is characterized by a light line assigning circuit 60 in which if two light lines 200 exist on one horizontal scanning line, either of the first or last one of two detecting signals from the light line detecting circuit 22 is selected and provided to the adder/accumulator and multiplier/accumulator 30 and 32, respectively.

The concrete arrangement and function of the light line assigning circuit 60 will be omitted since they are not different from the third concrete example of the first embodiment shown in FIG. 8.

THIRD CONCRETE EXAMPLE

Figures 25A, 25B:
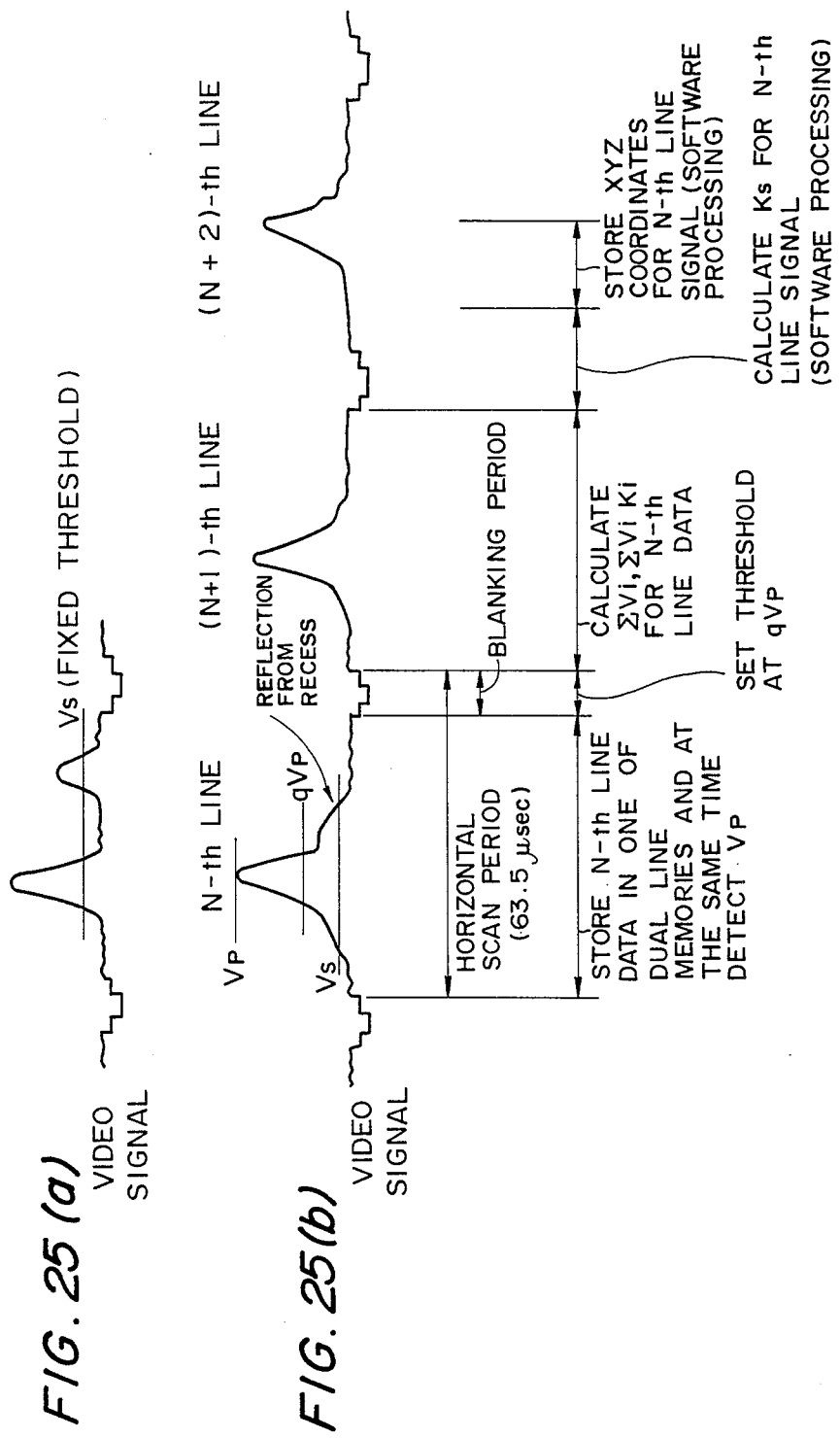
FIGS. 25(a)–(d) illustrate the relationship between video signals and the threshold in the multi-reflection.
Figure 25:
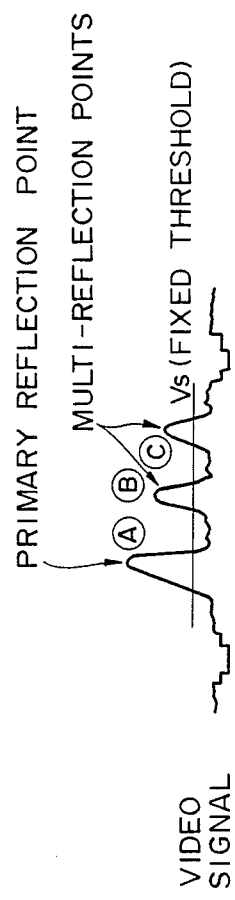
Figure 25:
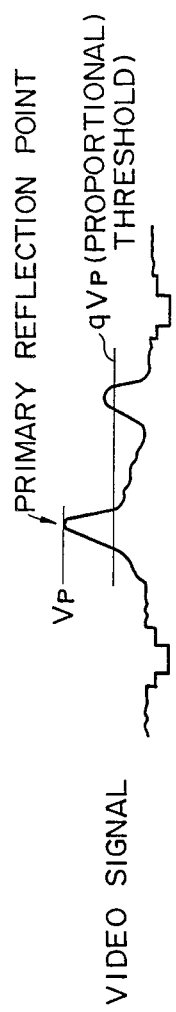

If there are light beams reflected by the interior of a recess on the surface of the work as shown in FIG. 24(a), the root of each of the peak values in the video signal will be lifted as shown in FIG. 25(b). This means that the light imaging position will not be accurately detected by detecting the light line 200 with the fixed threshold Vs.

The third concrete example of the second embodiment is adapted to permit the exact detection of imaging position even in such a multi-reflection and characterized by that there is set a proportional threshold obtained by multiplying the peak $V_p$ of the video signal by a numerical value q. This numerical value q is selected as depending on the reflection coefficient in the work 10. Even if the peak $V_p$ of the video signal is varied, therefore, the light line will be accurately detected without being influenced by the reflection signal from the root of the peak value.

Figure 23B:
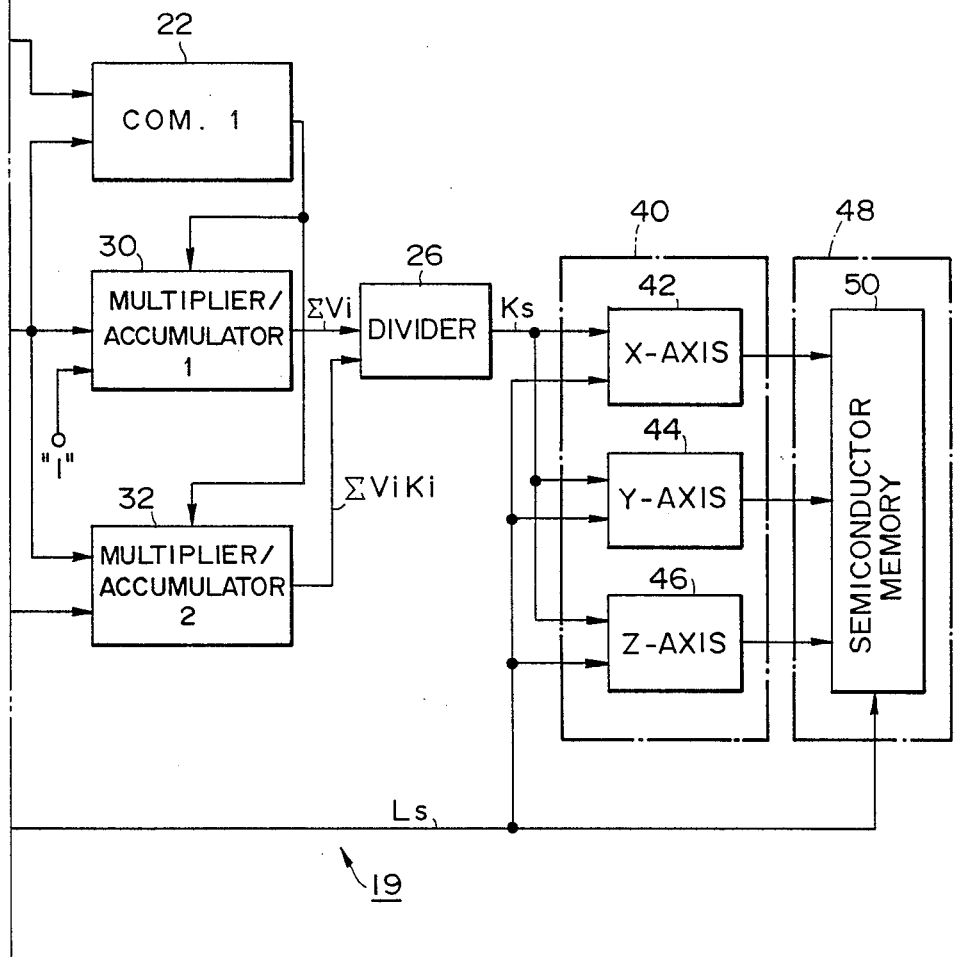

FIG. 23 shows a concrete circuit arrangement of the XYZ coordinates measuring system according to the third concrete example of the second embodiment, which comprises a proportional threshold setting circuit 74, a threshold selecting circuit 76 and a dual-line memory 78.

The dual-line memory 78 includes a pair of storage areas adapted to alternately store video signals Vi from the A/D converter 20 for each horizontal scan. Thereafter, the video signal Vi stored during the immediately preceding horizontal scan period is send to the light line detecting circuit 22 and the adder/accumulator and multiplier/accumulator 30, 32, respectively.

When the A/D converter 20 outputs a video signal Vi relating to the N-th horizontal scanning line, the dual-line memory 78 writes the video signal in one of the storage areas thereof. At the same time, the dual-line memory 78 causes the other storage area to output the video signal relating to the immediately preceding horizontal scanning line, that is, the (N−1)-th horizontal scanning line.

For such a purpose, the measuring system of the third concrete example will determine the horizontal imaging position Ks, that is, XYZ coordinates at each measurement point in accordance with the horizontal scan video signal in the immediately preceding horizontal scan at all times.

It is thus to be understood that if such a delay corresponding to one horizontal scan is utilized to set the threshold at the optimum level depending on the peak $V_p$ of the video signal Vi, the imaging position can be accurately measured even though the root of the peak signal is lifted due to the multi-reflection as in the recess of the work 10.

The proportional threshold setting circuit 74 is adapted to detect the maximum value $V_p$ of the video signal Vi for each horizontal scan in the TV camera 14, the maximum value $V_p$ being multiplied by a preset proportional factor q to form a proportional threshold $qV_p$.

The proportional threshold setting circuit 74 comprises a maximum value memory circuit 74a and a shift register 74b.

The maximum value memory circuit 74a detects and stores the maximum value $V_p$ of the light line portion from the video signal Vi per one horizontal scan output from the A/D converter 20. The maximum value $V_p$ is supplied to the shift register 74b at the same time as termination of that effective horizontal scan.

The shift register 74b multiplies the input maximum value $V_p$ by the preset factor q to provide a proportional threshold value $qV_p$ which in turn is supplied to the threshold selection circuit 76. The calculation of the proportional threshold by the shift register 74b can be accomplished by bit-shifting the inputted maximum value $V_p$ by the number of bits corresponding to the preset factor q. For example, if the factor q is equal to $0.125 = \frac{1}{2}^3$, the bit-shift will be made by three bits to provide a proportional threshold.

The proportional threshold selecting circuit 76 compares the proportional threshold $qV_p$ from the proportional threshold setting circuit 74 with the constant threshold Vs from the threshold setting circuit 24 so that the larger one among these threshold values will be output toward the light line detecting circuit 22 as a reference threshold.

The threshold selecting circuit 76 comprises a comparator 76a and a digital switch 76.

The comparator 76a compares the threshold values from both the setting circuits 24 and 74 with the result being supplied to the digital switch 76b.

After receiving the result from the comparator 76a, the digital switch 76b generates the output signal $qV_p$ if it is larger than the fixed threshold Vs or the output signal Vs if it is larger than the maximum threshold $qV_p$.

Where the proportional threshold setting circuit 74 and the threshold selecting circuit 76 are of hardware, the total delay time is in the order of several hundreds of nanoseconds. There is thus a sufficient margin within the blanking time for the N-th horizontal line during the selection and setting of the reference threshold.

In accordance with the measuring system of the third concrete example, thus, the N-th video signal Vi is written in one of the storage areas of the dual-line memory 78 when the N-th horizontal scan video signal 300 is output from the TV camera 14. At the same time, the threshold setting circuit 76 generates the optimum reference threshold Vs for that video signal Vi within the blanking time of the N-th horizontal scanning line.

At the same time as the TV camera 14 is changed to the N-th horizontal scan to the (N+1)-th horizontal scan, a true light line 200 is extracted from the immediately preceding horizontal scan line, that is, the N-th horizontal scan line provided by the dual-line memory 78. Thus, the horizontal imaging position Ks will be calculated and output as in the first concrete example of the second embodiment.

In such a manner, the third concrete example can positively detect the horizontal imaging position Ks of the light line 200 to perform the real-time measurement of XYZ coordinates even when the root portion of the light line 200 included in the video signal is lifted due to the multi-reflection on the surface of the work such that the light line 200 cannot be detected only by the use of the fixed threshold value Vs.

Since the writing of the XYZ coordinates into the semiconductor memory 50 is made in the DMA manner, the third concrete example has a delay time equal to one horizontal scan period, but can substantially real-time measure the XYZ coordinates at each of the measurement points (P0, P1 . . . ) on the surface of the work along the light line 200 for each horizontal scan.

At this time, it is required that the vertical imaging position Ls corresponding to the immediately preceding horizontal scan is output. To this end, the counter in the vertical imaging position detecting circuit 38 is preferably preset by minus one and operated to count horizontal synchronous signals.

The XYZ coordinates measuring system according to the third concrete example of the second embodiment is not limited to the aforementioned arrangement and may be adapted to write XYZ coordinates into the semiconductor memory 50 through a microcomputer. In such a case, several tens of microseconds are required to write the data into the semiconductor memory 50. For example, the writing of the XYZ coordinates for the N-th horizontal scan video signal Vi into the memory will be completed on termination of the (N+2)-th horizontal scan.

By executing such a pipe line processing, the real-time measurement of XYZ coordinates at each point can be performed without influence from the multi-reflection even if a microcomputer is used.

FOURTH CONCRETE EXAMPLE

When the multi-reflection occurs on the surface of a work, there may be two peaks in the video signal per one horizontal scanning line, as shown in FIG. 25(c). In such a case, there is a problem when it cannot be judged whether any one of two peaks truely corresponds to a light line 200 to be determined.

The fourth concrete example of the second embodiment is intended to positively select the light line 200 to be determined so that the real-time measurement of XYZ coordinates at each point on the surface of a work to be measured can be realized.

Figure 26B:
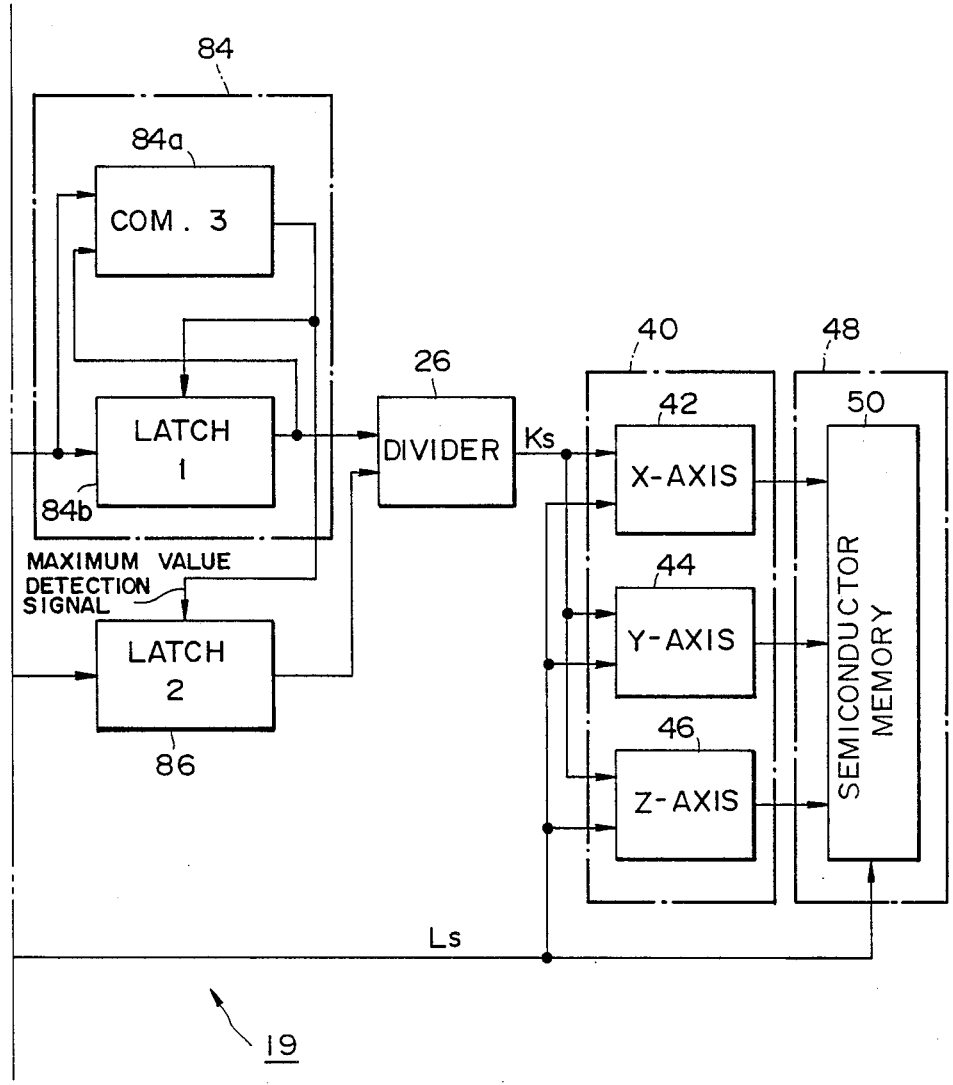

FIG. 26 shows an XYZ coordinates measuring system constructed according to the fourth concrete example of the second embodiment.

The measuring system is characterized by that a true peak value corresponding to the light line 200 to be determined is selected in accordance with the fact that even if a plurality of peaks are contained in one horizontal scan video signal, the true peak $\Sigma Vi$ corresponding to the proper light line 200 becomes maximum.

To this end, the measuring system of the fourth concrete example comprises a storage circuit 84 for storing the maximum value of $\Sigma Vi$ and another storage circuit 86 for storing $\Sigma ViKi$.

The storage circuit 84 is adapted to detect and store the maximum value of $\Sigma Vi$ from the adder/accumulator 30 when two light lines 200 exist on one horizontal scanning line and also to generate a maximum value detection signal in synchronism with the detection of the maximum value.

In the fourth concrete example, the storage circuit 84 consists of a comparator 84a and a latch circuit 84b.

The latch circuit 84b is cleared at each time when one horizontal scan is terminated and then adapted to latch the value $\Sigma Vi$ from the adder/accumulator 30.

The comparator 84a is adapted to compare the output of the adder/accumulator 30 with the output of the latch circuit 84. If the output of the adder/accumulator 30 is larger than the output of the latch circuit 84, the contents of the latch circuit 84 is updated by the comparator 84a which in turn outputs a maximum value detecting signal toward the storage circuit 86.

As a result, the maximum value of $\Sigma Vi$ corresponding to the true light line 200 is latched by the latch circuit 84b, the output of which will be supplied to the horizontal imaging position detecting circuit 26.

The storage circuit 86 is adapted to store a value $\Sigma Vi \times Ki$ from the multiplier/accumulator 32 in synchronism with said maximum value detection signal. More particularly, the storage circuit 86 utilizes a latch circuit, the contents of which is cleared at the same time as each of the horizontal scans is terminated and yet updated by the use of the maximum value detection signal.

Values $\Sigma Vi$ and $\Sigma Vi \times Ki$ corresponding to the true light line 200 will be sent respectively from the storage circuits 84 and 86 to the horizontal imaging position detecting circuit 26.

Assuming that there is a video signal containing three peaks A, B and C produced during one horizontal scan period, the values $\Sigma Vi$ and $\Sigma ViKi$ corresponding to a light line 200 on the peak (A) are first calculated and written in the respective storage circuits 84 and 86.

The values $\Sigma Vi$ and $\Sigma ViKi$ corresponding to a light line 200 on the peak (B) are subsequently calculated and supplied to the respective storage circuits 84 and 86. Since the latter values are smaller than those corresponding to the light line 200 on the peak (A), however, the contents of the storage circuits 84 and 86 will not be the updated.

The values $\Sigma Vi$ and $\Sigma ViKi$ corresponding to the light line 200 on the peak (C) are similarly calculated and sent to the respective storage circuits 84 and 86, but these values also will not update the contents of the storage circuits 84 and 86 because of being smaller than the values corresponding to the light line 200 on the peak (A).

In such a manner, the values $\Sigma Vi$ and $\Sigma ViKi$ corresponding to the light line 200 on the peak (A) having the highest value of $\Sigma Vi$ will be written respectively in the storage circuits 84 and 86, the outputs of which in turn are supplied to the horizontal imaging position detecting circuit 26.

In accordance with the above arrangement, even when there are a plurality of peaks during one horizontal scan period as shown in FIG. 25(c) and where it cannot be judged whether any one of these peaks is representative of a true light line 200, the storage circuits 84 and 86 can assist in positively selecting the peak corresponding to the true light line 200 to determine the XYZ coordinates.

If the storage circuits 84 and 86 are hardware, the delay time may be in the order of 100 nanoseconds. Thus, the values $\Sigma Vi$ and $\Sigma ViKi$ corresponding to the light line having the highest value of $\Sigma Vi$ can be stored in the storage circuits after several hundreds of nanoseconds from termination of the effective horizontal scan for each horizontal scanning line.

The measuring system of the fourth concrete example can accurately perform the real-time and high-speed measurement of XYZ coordinates on the surface of the work even if there are a plurality of peaks during one horizontal scan period.

Figure 27B:
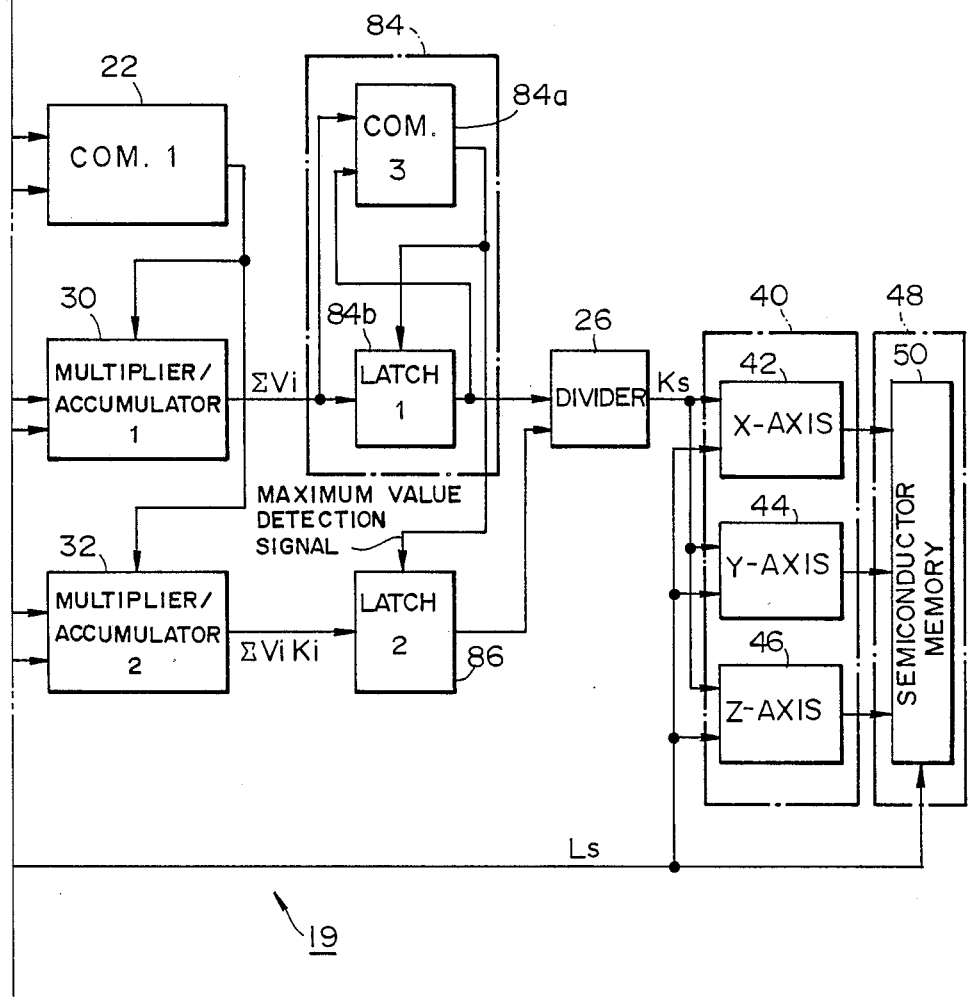

As seen from FIG. 27, the measuring system of the fourth concrete example may comprise a proportional threshold setting circuit 74, a threshold selecting circuit 76 and a dual-line memory 78.

Such an arrangement can set a proportional threshold $qV_p$ without influence from the multi-reflection, as shown in FIG. 25(d), even if there is a light beam reflected from the interior of the recess and a strong light beam reflected at a point P, as shown in FIG. 24(a). Even though there is a multi-reflective signal beyond the proportional threshold value $qV_p$, the storage circuit 84 can properly select the peak value corresponding to the primary reflecting point P.

In accordance with such an arrangement, the XYZ coordinates on the surface of the work can be high-speed measured with an increased accuracy substantially without influence of the multi-reflection.

FIFTH CONCRETE EXAMPLE

The coordinate measurement from the triangulation utilizing the slit light 100 and the TV camera 14 as in the second embodiment cannot avoid the fact that its accuracy of measurement is highly influenced by the width W of a light line 200 detected by the TV camera 14, as described previously.

Figure 28:
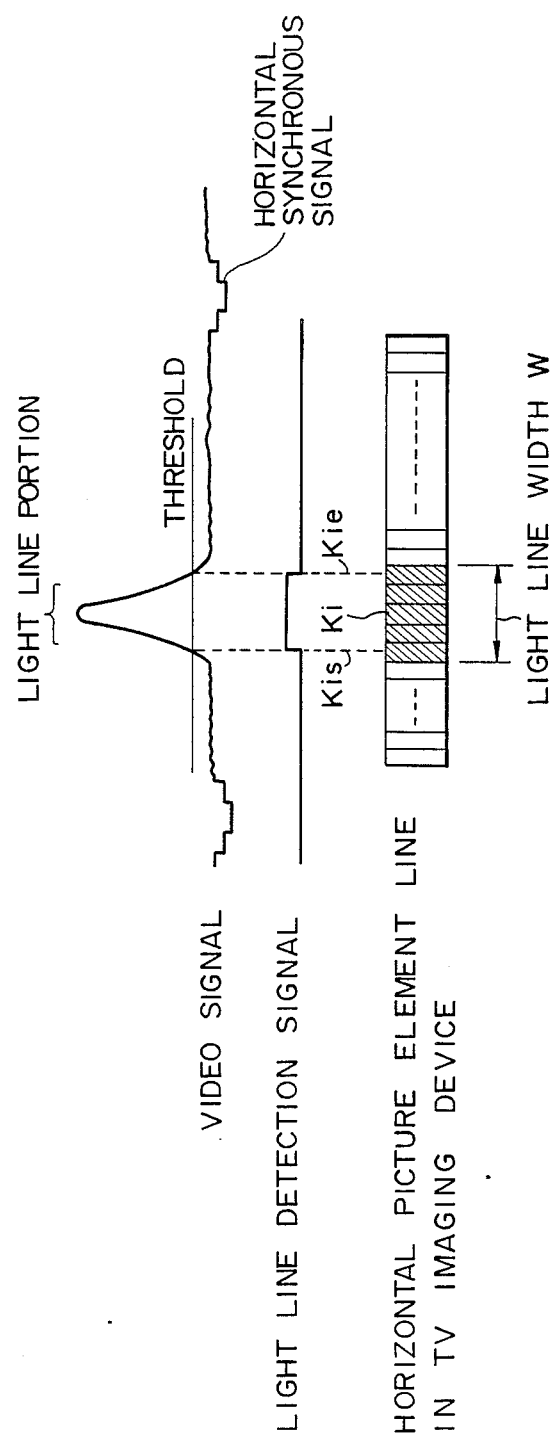
FIG. 28 illustrates the relationship between a video signal and the width of a light line received by the imaging device of the TV camera.

FIG. 28 shows the relationship between the width W of a light line received by the imaging device 14b of the TV camera 14 and a video signal Vi.

When the width W of a light line is small, for example, a value corresponding to one picture element in the imaging device 14b of the TV camera 14, the measurement accuracy cannot be increased over the quantification error in one picture element even if the calculation of the horizontal imaging position is carried out in accordance with the center-of-gravity calculation.

On the contrary, there is another problem in that if the width W of the light line is too large, the spacial resolution decreases.

It is experimentally confirmed that the optimum width W of the light line is ranged between three and five picture elements (literature 1).

Therefore, the width W of the light line 200 may be effective data for realizing a high-accuracy measurement of coordinate as an estimation index which can judge the coordinate data relating to that width W such that they are effective only when the value of the width W is ranged between three and five picture elements in the imaging device 14b or as feedback data used to decrease the intensity of the corresponding slit light if the value of the width W is too small.

The fifth concrete example is characterized by that in order to judge whether or not the light line width W and the reflection signal intensity are proper, the light line width W and the maximum light line value $V_p$ for the respective one of horizontal scans are high-speed detected simultaneously with the coordinate measurement.

Figure 29B:
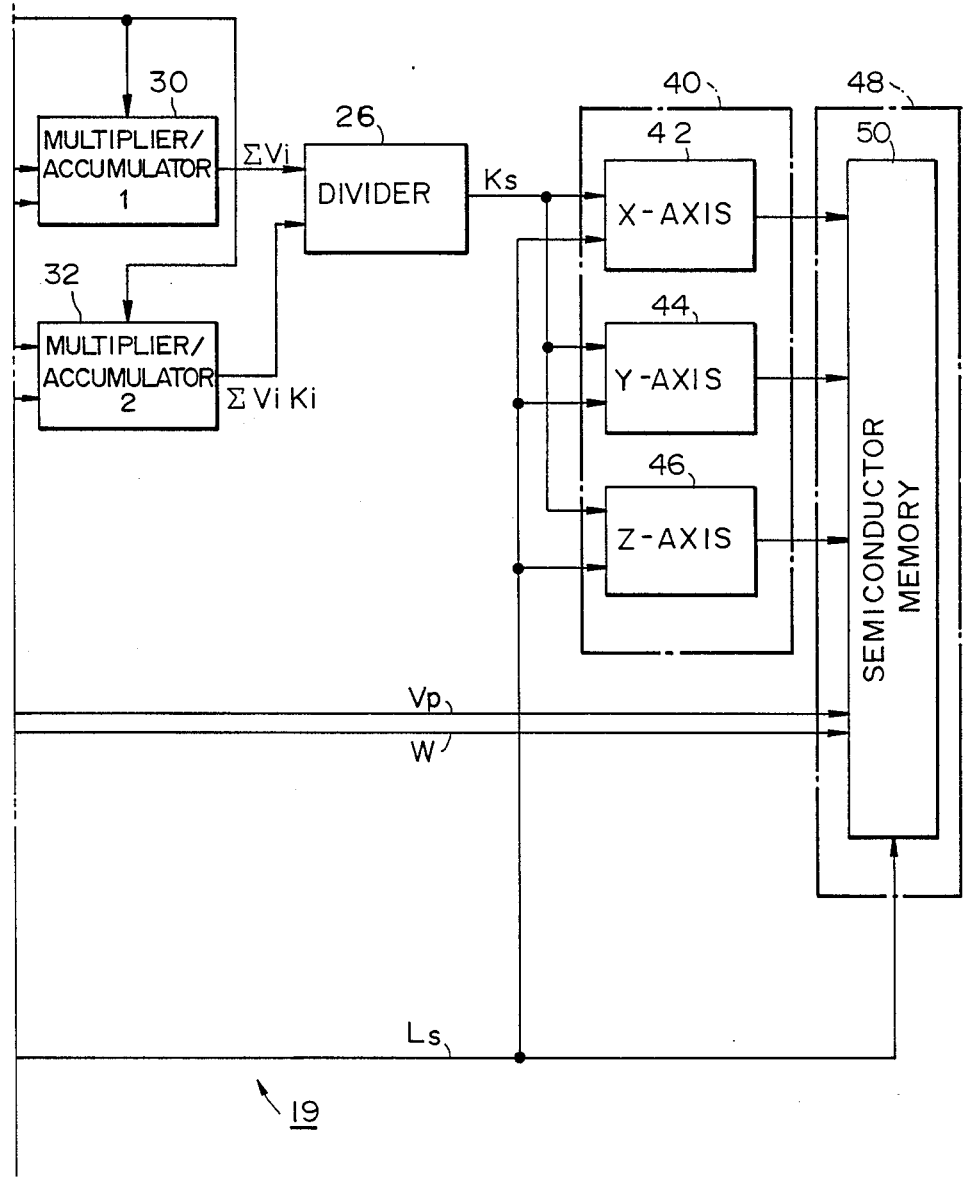

FIG. 29 shows a circuit diagram of the XYZ coordinates measuring system according to the fifth concrete example of the second embodiment, which system comprises a maximum light line value detecting circuit 90 and a light line width detecting circuit 92.

The maximum light line value detecting circuit 90 is of an arrangement similar to that of FIG. 17. More particularly, the maximum value detecting circuit 90 is adapted to detect the maximum value $V_p$ of a light line 200 extracted for each horizontal scan. In the fifth concrete example, the detecting circuit 90 comprises a latch circuit 90a and a comparator 90b.

The latch circuit 90a is adapted to latch the maximum light line value $V_p$ with the latch output thereof being supplied to the memory circuit 48.

The light line width detecting circuit 92 is of a configuration similar to that of FIG. 17 and adapted to detect the width W of a light line for each horizontal scan. More particularly, the detecting circuit 92 utilizes a counter adapted to count clock signals in the TV camera 14 during a period of time for which light line detecting signals are being output from the light line detecting circuit 22. Thus, the light line width detecting circuit 92 detects the number of picture elements in the imaging device 14b receiving that light line 200, that is, the width W of the same to produce a detection signal which in turn is provided to the memory circuit 48.

As in the measuring system of FIG. 17, the fifth concrete example can high-speed measure the maximum light line value $V_p$ and the light line width W as well as the measurement of XYZ coordinates (X, Y and Z) for each horizontal scan, leaving a sufficient margin.

The fifth concrete example also may be provided with a light line assigning circuit 60, if required. Furthermore, the fifth concrete example may utilize a microcomputer for writing data as into the semiconductor memory 50, if required.

Although the fifth concrete example has been described as to both the maximum light line value detecting circuit 90 and light line width detecting circuit 92 incorporated into the XYZ coordinates measuring system, the second embodiment is not limited to such an arrangement and may be applied to a similar system having only any one of the detecting circuits 90 or 92.

SIXTH CONCRETE EXAMPLE

Figures 30, 30A:
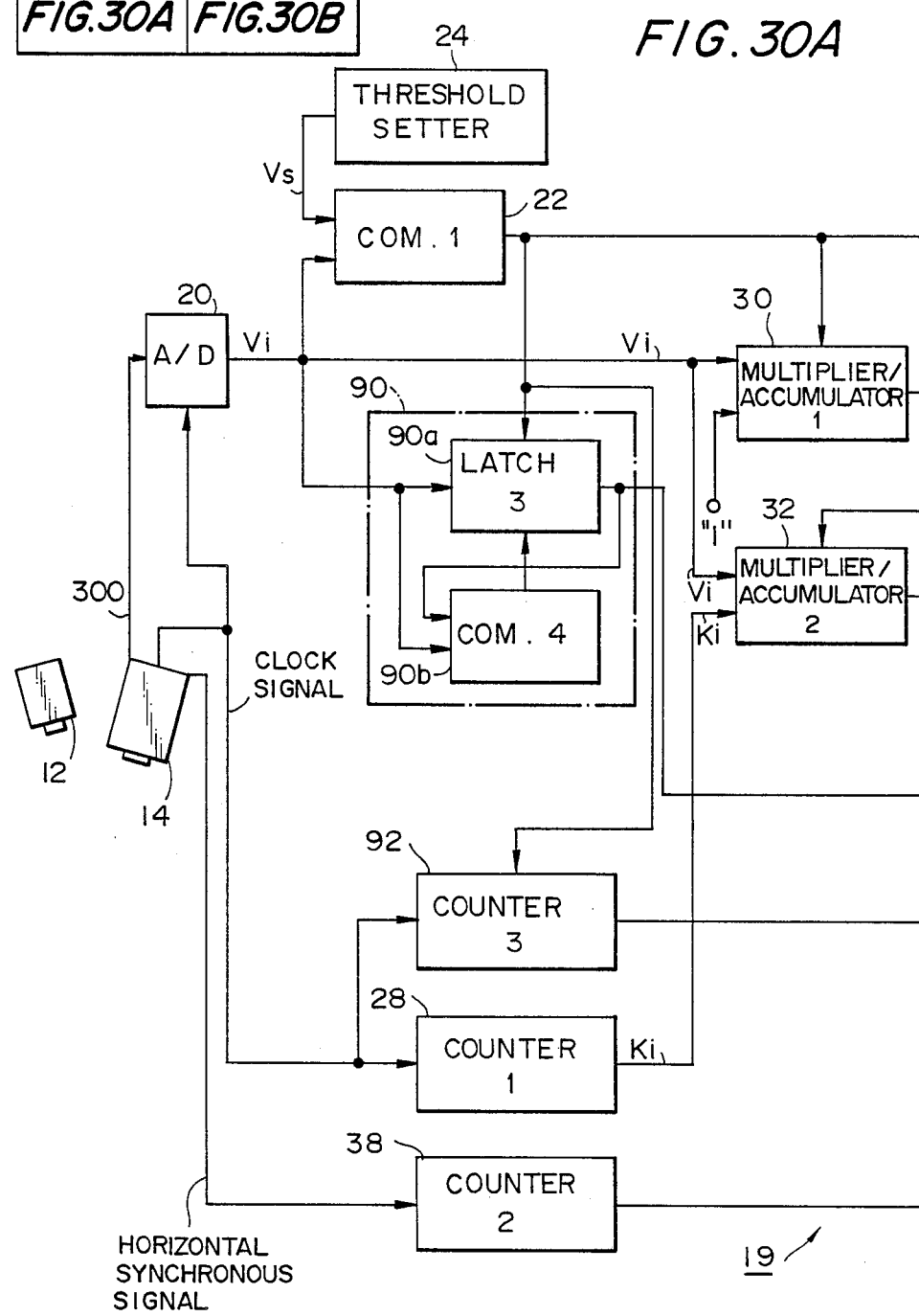
FIGS. 30, 30A and 30B are block diagrams showing a sixth concrete example of the XYZ coordinates measuring system according to the second embodiment.
Figure 30B:
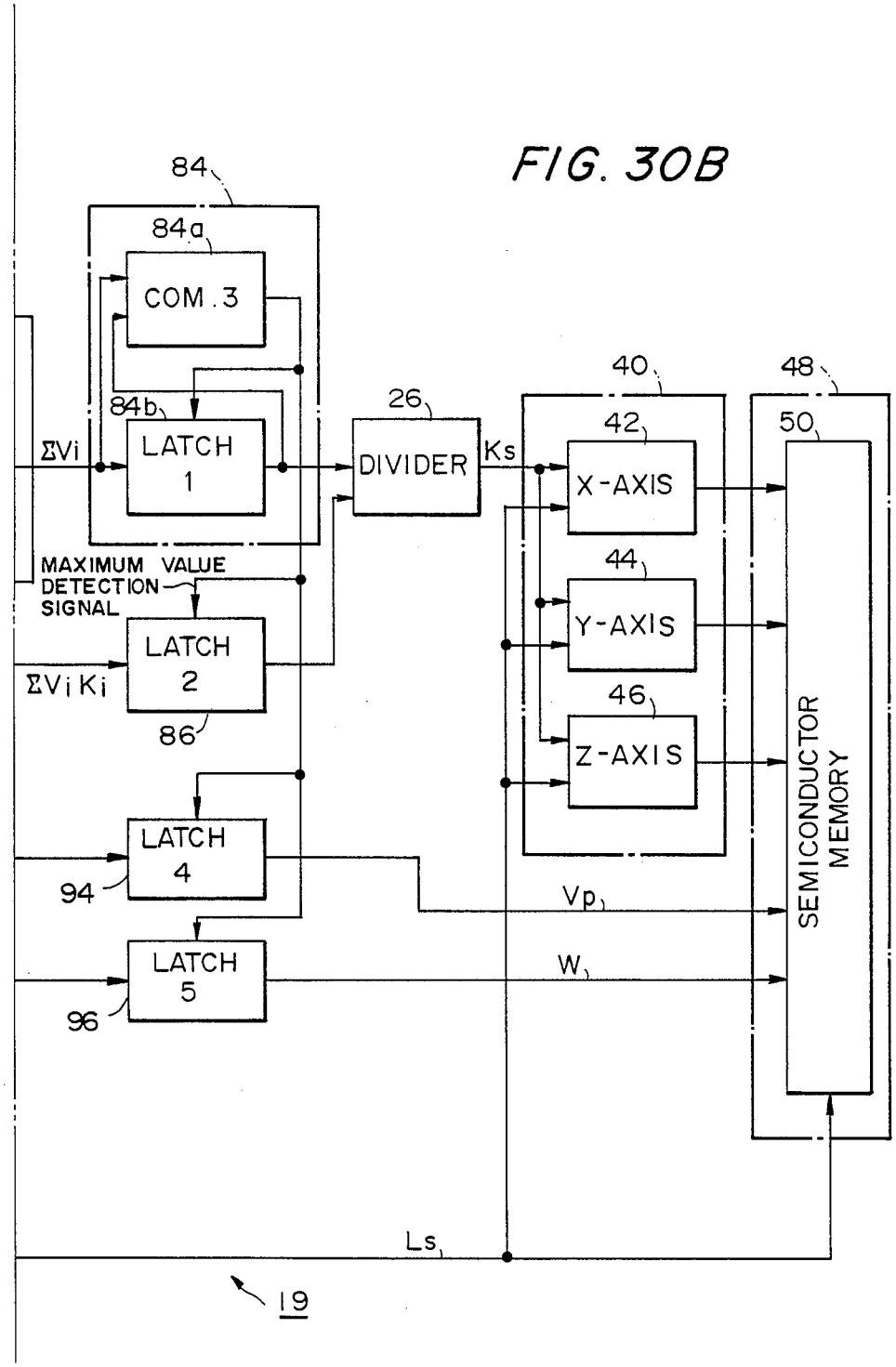

FIG. 30 shows a sixth concrete example of the second embodiment, which is characterized by that when two or more light lines 200 exist on one horizontal scanning line, the width W and maximum value $V_p$ of a true light line 200 (having the maximum output $\Sigma Vi$ of the adder-/accumulator) is detected by the measuring system.

The measuring system thus comprises a temporal storage circuit 96 for temporally storing the light line width and another temporal storage circuit 94 for temporally storing the maximum light line value.

The temporal storage circuit 96 consists of a latch circuit adapted to latch a light line width W outputted from the light line width detecting circuit 92 in synchronism with the maximum detection signal from the storage circuit 84 storing the maximum $\Sigma Vi$ value and send it to write in the memory circuit 48.

The temporal storage circuit 94 consists of a latch circuit adapted to latch the maximum light line value $V_p$ from the maximum light line value detecting circuit 90 in synchronism with the maximum detection signal from the storage circuit 84 and send it to write in the memory circuit 48.

In such a manner, the measuring system of the sixth concrete example of the second embodiment can specify a light line 200 having the highest peak value to detect the width W and maximum value $V_p$ thereof even if two or more light lines 200 exist on one horizontal scanning line.

Since there is a delay time equal to several tens nanoseconds in each of the latch circuits respectively defining the storage circuits 94 and 96, the measuring system of the sixth concrete example can latch the width W and maximum value $V_p$ of that light line 200 for about several hundreds of nanoseconds after termination of the effective horizontal scan.

The writing of data into the memory circuit 48 at this time can be performed in the DMA manner. Therefore, the width W and maximum value $V_p$ of the light line per one point can be detected within 63.5 microseconds at the same time as the coordinate measurement.

SEVENTH CONCRETE EXAMPLE

The seventh concrete example of the second embodiment will now be described.

The seventh concrete example is characterized by a control circuit 110 which is adapted to control the width and intensity of a slit light beam into proper levels based on the light line width W and the maximum light line value $V_p$ which are detected for each horizontal scan, as shown in FIG. 18.

The control circuit 110 comprises a comparator 112, a maximum light line value setting device 114, a memory circuit 116, a comparator 118, a light line width setting device 120 and a microcomputer 122.

In such an arrangement, the measuring system can provide the same functions and advantages as those of the sixth concrete example of said first embodiment.

More particularly, the control circuit 110 is adapted to control the intensity of the slit light beam into a level slightly smaller than the saturation level $V_{sat}$ (for example, 0.8 to $0.9 \times V_{sat}$) in the imaging device 14b, based on the maximum light line value $V_p$ from the maximum light line value detecting circuit 90.

The control circuit 110 also controls the slit light beam to have its width ranged between three and five picture elements in the imaging device 14b, based on the light line width W output from the light line width detecting circuit 92.

The seventh concrete example can be of course applied to the measuring system of the sixth concrete example of the second embodiment.

EIGHTH CONCRETE EXAMPLE

Figures 31, 31A:
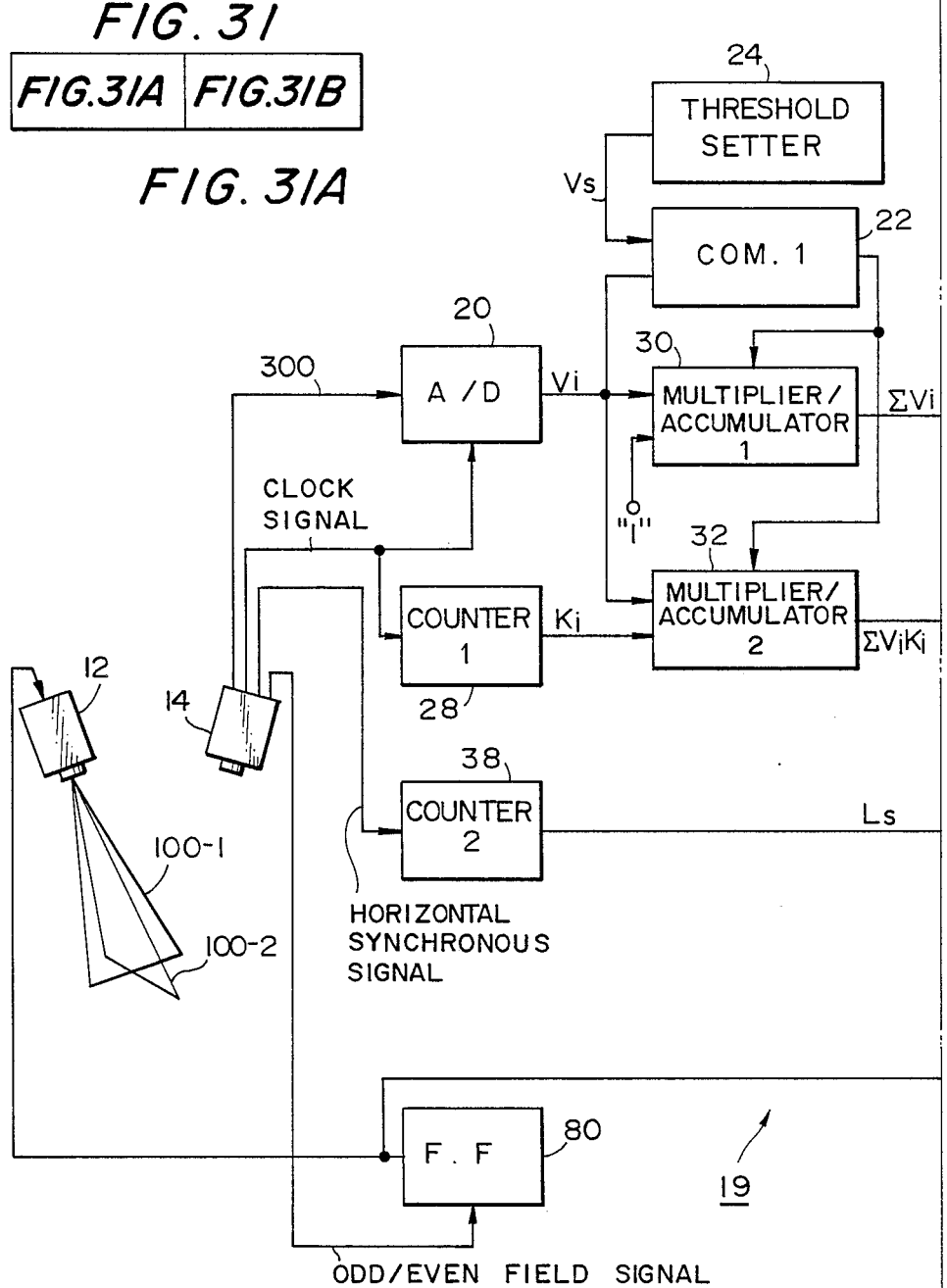
FIGS. 31, 31A and 31B are block diagrams of the system relating to the eighth concrete example.
Figure 31B:
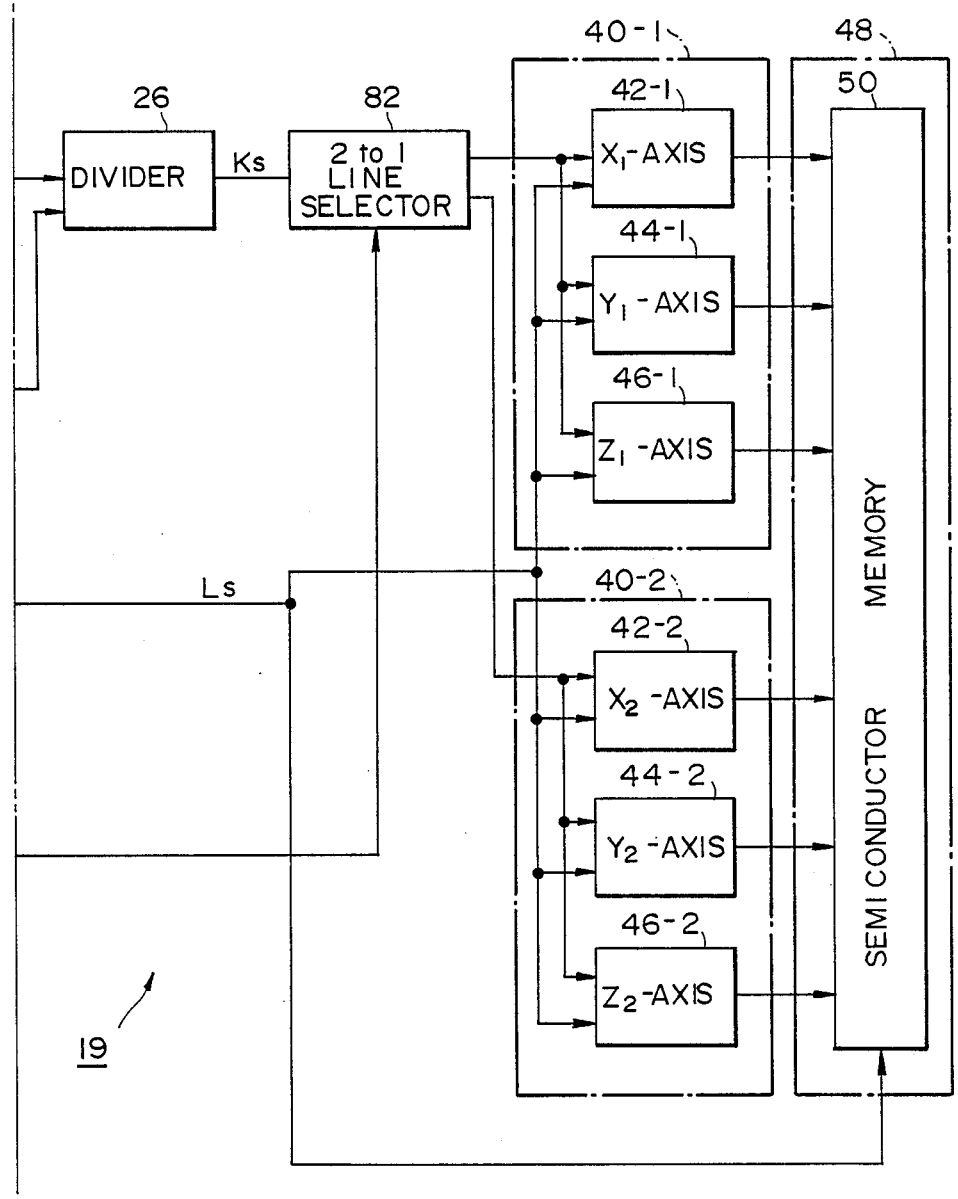

FIG. 31 shows the eighth concrete example of the XYZ coordinates measuring system according to the second embodiment.

The eighth concrete example is characterized by that it is intended to perform the high-speed measurement with respect to the attitude of a work, the internal and external diameters of a tubular work and the centers of these works to perform the automatic assembly by the robot and the measurement of size in the production of three-dimensional machine parts or products, as described with respect to the fourth concrete example of the first embodiment shown in FIG. 12.

The measuring system of the eighth concrete example comprises a pair of look-up tables 40-1 and 40-2 for two slit light beams 100-1 and 100-2 projected from a slit light source 12 and a coordinate table selecting circuit 82 for switching the look-up tables 40-1 and 40-2 from one to another.

One of the look-up tables 40-1 stores the interrelationship between the imaging positions Ks and Ls obtained on projection of the slit light beam 100-1 and the XYZ coordinates on the surface of the actual work 10.

Similarly, the other look-up table 40-2 stores the interrelationship between the imaging positions Ks and Ls obtained on projection of the slit light beam 100-2 and the XYZ coordinates on the surface of the actual work.

Although the eighth concrete example has been described as to the paired look-up tables 40-1 and 40-2 used to utilize two slit light beams 100-1 and 100-2, the second embodiment is not limited to this arrangement and may be applied to a measuring system which uses look-up tables corresponding in number to the slit light beams used therein.

The eighth concrete example further comprises a slit light selecting circuit 80 which consists of a flip flop adapted to switch the slit light beams 100-1 and 100-2 from one to another at a cycle of one frame time (33.3 milliseconds) based on odd/even field signals from the TV camera 14.

The eighth concrete example further comprises a coordinate table selecting circuit 82 which consists of a line selector adapted to suitably switching the look-up tables 40-1 and 40-2 from one to another at a cycle of one frame time by odd/even field signals from the TV camera 14.

The imaging positions Ks and Ls are supplied from the horizontal and vertical imaging position detecting circuits 26 and 38 to the look-up table 40-1 or 40-2 which correspond to the selected slit light beam 100-1 or 100-2.

Thus, the measuring system of the eighth concrete example can measure the XYZ coordinates on the surface of the work using a plurality of slit light beams 100-1 and 100-2. For example, the measuring system may be incorporated into an actuator in a robot or the like so as to measure the XYZ coordinate measurement on a work to be measured such that the high-speed detection of the attitude of the work 10 or the measurement of the diameter of the circular bore shown in FIG. 10 can be made at an increased speed.

The eighth concrete example may be applied to the measuring system of the seventh concrete example of the second embodiment. In such a case, a plurality of light lines (200-1, 200-2 . . . ) formed on the work 10 can be controlled into the optimum intensity and width.

Although the first through eighth concrete examples have been described as to any optional arrangement with respect to the slit light source 12 and TV camera 14, the second embodiment may be simplified in construction by placing the slit light 100 at the same plane as the Y-Z plane of FIG. 4(b) and also by defining the X-axis to be zero at all times, such that there are only two coordinates Y and Z to reduce the number of coordinate tables.

(3) THIRD EMBODIMENT

There are known XYZ coordinates measuring systems of one-camera and one-slit light type and one-camera and two-slit light type.

Figure 34B:
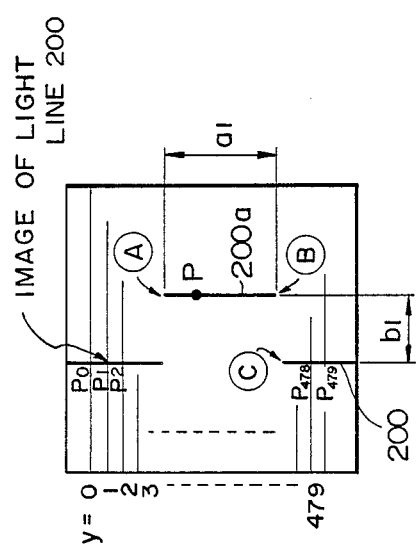
FIGS. 34(a) and 34(b) illustrate a one-camera and one-slit light type measuring system in the related art.
Figure 34A:
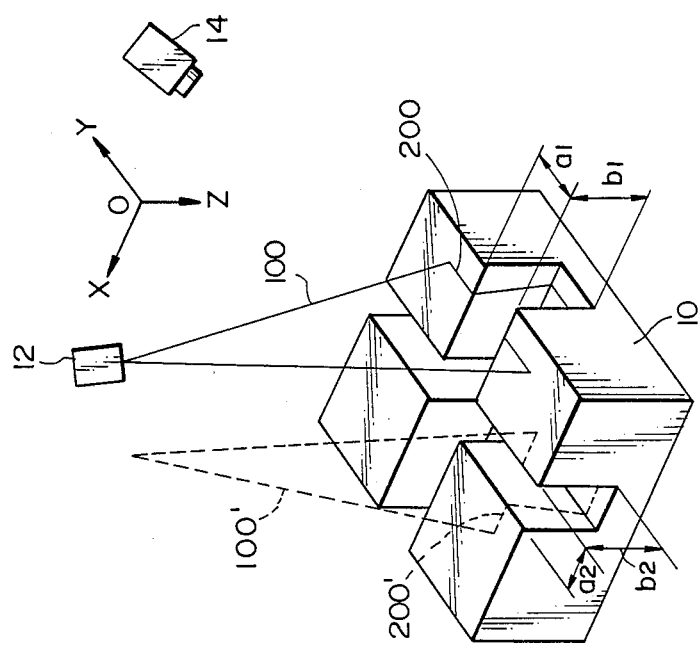

FIG. 34(a) shows a one-camera and one-slit light type XYZ coordinates measuring system in the prior art, which system comprises a slit light source 12 for projecting a first slit light beam 100 onto the surface of a work 10 with a predetermined angle and a TV camera 14 for taking a light line 200 formed on the surface of the work by the first slit light 100.

FIG. 34(b) illustrates the image 200a of a light line taken by the TV camera 14. As will be apparent from this figure, the light line image 200a can be grasped as data relating to points (P0, P1, P2 . . . ) each of which intersects the respective one of horizontal scanning lines (y=0, 1, 2 . . . ). For example, if a conventional TV camera having 480 horizontal scanning lines is used, each of light lines 200 to be taken will be detected as three-dimensional coordinate data with respect to a maximum of 480 points.

In this connection, the width a1 and depth b1 of the work shown in FIG. 34(a) correspond to distances between the opposite ends A and B of the light line 200a and between the end B of the light line 200a and one end C of the light line 200a, respectively.

Thus, the measuring system will determine the dimensions a1 and b1 in the work 10 by measuring the XYZ coordinates at each of the end points A, B and C.

FIG. 35(a) shows a one-camera and two-slit light type XYZ coordinates measuring system which may be used to detect the attitude and bore center in a cylindrical part. The measuring system comprises two slit light sources 12-1 and 12-2 adapted to image a cross-shaped light line pattern on a work 10 and a TV camera 14.

FIG. 35(b) illustrates four light lines 200a taken by the TV camera 14. The XYZ coordinates measuring system is adapted to measure XYZ coordinates at the end points D, E, F and G of the respective light line images 200a to detect the attitude and bore center of the work.

The slit light sources 12 and the TV camera 14 may be united into an imaging head.

If the one-camera and one-slit light type XYZ coordinates measuring system shown in FIG. 34(a) is to be used to measure the width and thickness (a2 and b2) of the work 10, it is required that the system has a rotary mechanism on which the imaging head is mounted so that it can be rotated through 90 degrees to form a slit light 100' as shown. Such a rotary mechanism must be provided separately from a drive mechanism for moving the imaging head along all the X-, Y- and Z-axes. This means that the measuring system becomes complicated in construction with the resulting reduction of accuracy in measurement. Further, the manufacturing cost also is increased.

The work 10 itself may be rotated in place of the rotation of the imaging head. If the work 10 is relatively large in size, however, a heavy-duty rotary mechanism is required to rotate the work 10.

Even when the imaging head shown in FIG. 34(a) is used to detect the attitude and bore center of the work as shown in FIG. 35(a), one will have the same problem as mentioned above.

On the other hand, the imaging head may be moved simply along the X-, Y- and Z-axes if the one-camera and two-slit light type XYZ coordinates measuring system shown in FIG. 35(a) is used to form two slit light beams 100-1 and 100-2 intersecting each other with the right angle so that the detection of the attitude as shown in FIG. 35(a) or the measurement of the dimensions (a1, b1, a2 and b2) as shown in FIG. 34(a) is made.

Thus, the XYZ coordinates measuring system shown in FIG. 35(a) has an advantage in that the linear drive mechanism can be simplified in construction without any rotary mechanism and reduced in manufacturing cost.

This XYZ coordinates measuring system also has a disadvantage in that the two light lines 200-1 and 200-2 formed by the slit light beams 100-1 and 100-2 cannot be observed optically in the optimum condition since one TV camera 14 will receive these light lines 200-1 and 200-2 one at a time.

In other words, the XYZ coordinates measuring system as shown in FIG. 35(a) cannot obtain wide-angle and focused images by positioning the TV camera lens with a swinging angle as in the optical triangulation.

In order to overcome this problem, the aperture of the TV camera is closed as much as possible so that wide-angle and focused images can be obtained in the Z-axis direction under the depth of focus.

As a result, there is created a problem in that the resulting images become dark and yet speckles tends to generate in the images. This reduces the S/N ratio and further deforms the distribution of light line intensity from the Gaussian distribution to reduce the accuracy of measurement.

The object of the third embodiment is to provide an XYZ coordinates measuring system in which the imaging head consisting of the slit light sources and the TV camera can be simplified in construction and which can perform a high-accuracy measurement.

FIG. 32 is an XYZ coordinates measuring system constructed according to the third embodiment of the present invention, considering the aforementioned problems in the prior art.

The XYZ coordinates measuring system comprises a cross-shaped slit light source for projecting first and second slit light beams intersecting each other on Z-axis in an orthogonal XYZ coordinate system onto the work, the first slit light beam being parallel to the X-Z plane while the second slit light beam being parallel to the Y-Z plane; a slit light switching circuit for alternately projecting the first and second slit light beams from the cross-shaped slit light source onto the work; a first TV camera located with the imaging device thereof having the vertical axis substantially parallel to the X-axis and a second TV camera positioned with the imaging device thereof having the vertical axis substantially parallel to the Y-axis, the TV cameras adapted to take the light lines formed on the work by the slit light beams; a TV camera switching circuit for selecting the output signal of the first TV camera when the first slit light beam is projected onto the work or the output signal of the second TV camera when the second slit light beam is projected onto the work; a coordinate measuring circuit for processing the output of the TV camera selecting circuit to output XZ coordinate value when the first slit light beam is projected onto the work or YZ coordinate value when the second slit light beam is projected onto the work.

Figures 33, 33A:
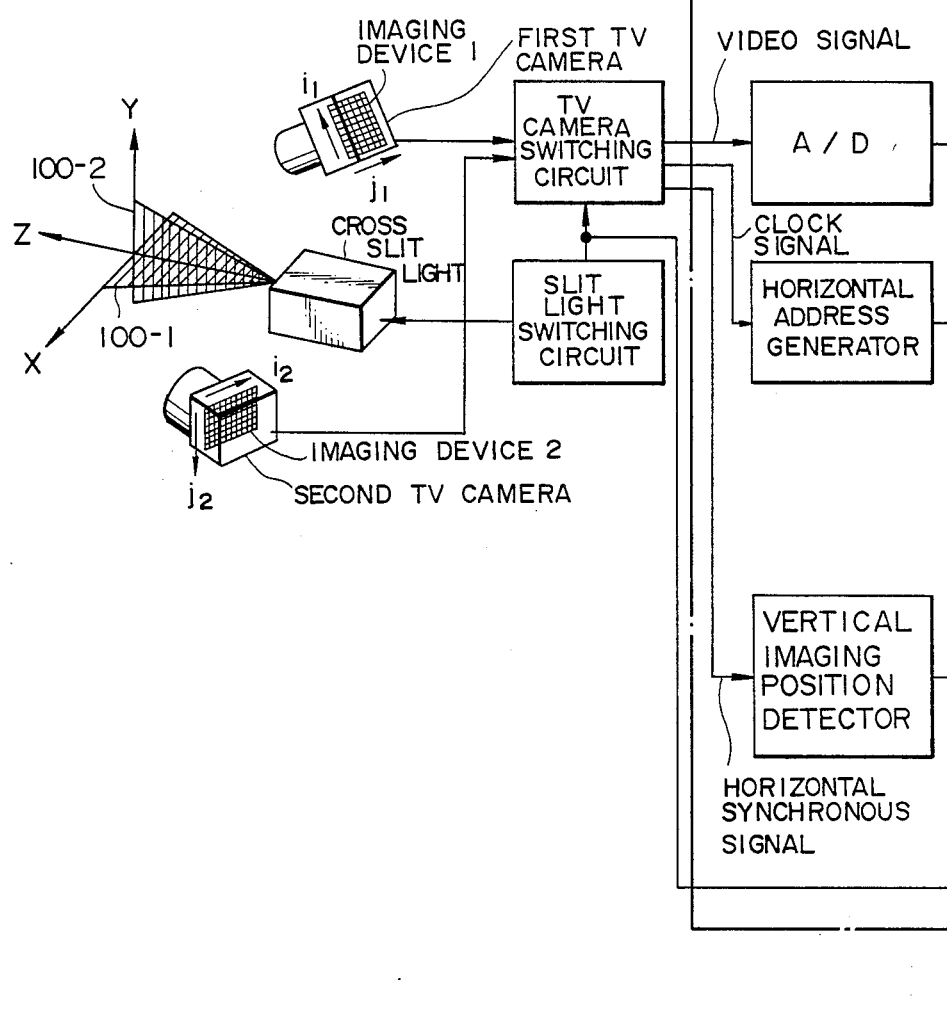
FIGS. 33, 33A and 33B illustrate a coordinates measuring system used in the third preferred embodiment shown in FIG. 32.
Figure 33B:
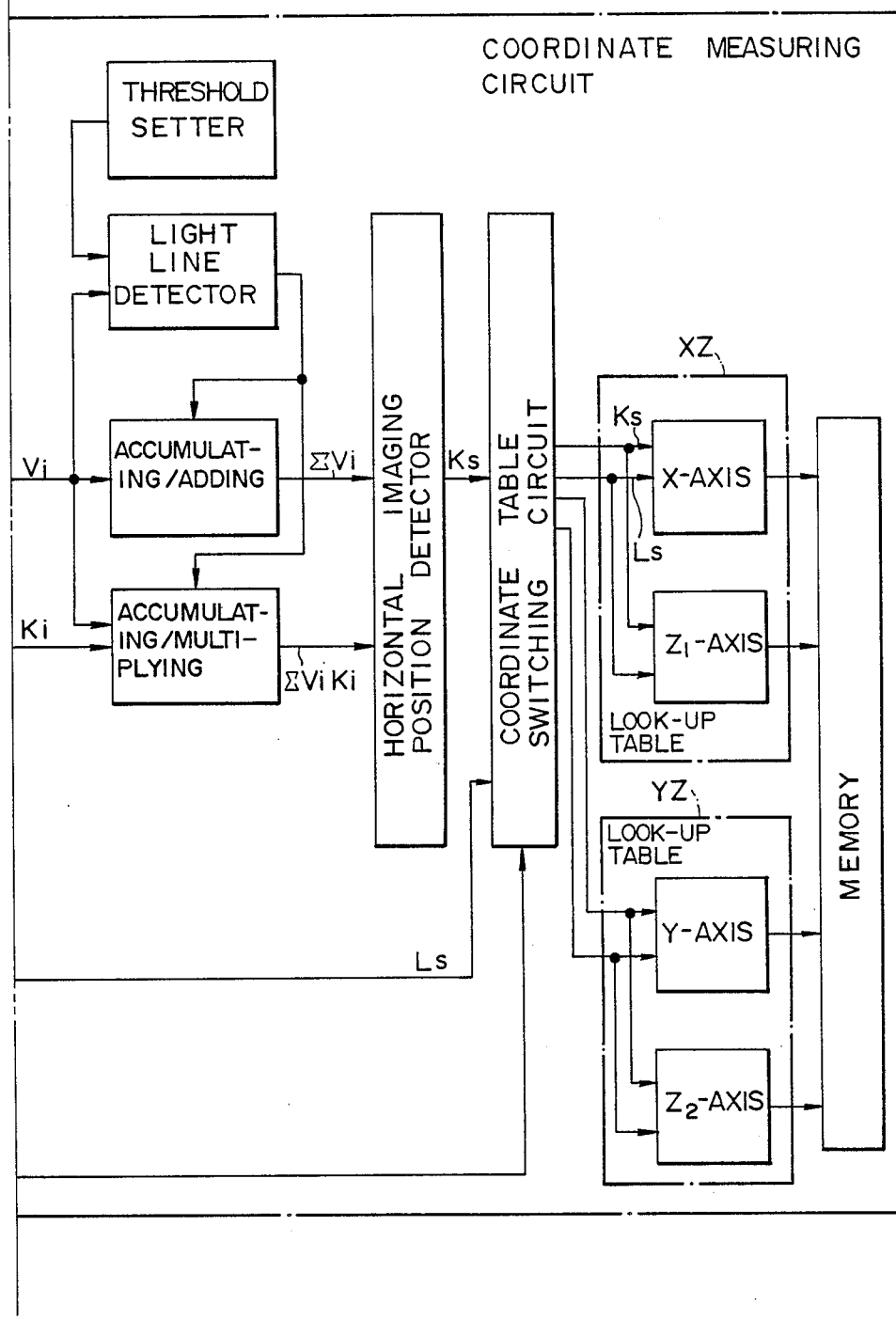

As seen from FIG. 33, the coordinate measuring circuit preferably comprises an A/D converter for converting a video signal from the TV camera switching circuit into a digital video signal Vi in synchronism with one horizontal scan; a threshold setting circuit for setting a threshold level for detecting a light line from the video signal; a light line detecting circuit for generating output light line detection signals only during a time period for which the digital video signal Vi exceeds the threshold level; a horizontal address generating circuit for generating a horizontal address Ki representative of the position of a horizontal picture element in the imaging device of the corresponding TV camera; an adder/accumulator for accumulating video signals Vi from the A/D converter during a time period for which light line detecting signals are being output from the light line detecting circuit; a multiplier/accumulator for accumulating a product of each video signal Vi from the A/D converter and each horizontal address Ki from the horizontal address generating circuit during a time period for which light line detection signals are being output from the light line detecting circuit; a horizontal imaging position detecting circuit for dividing the output $\Sigma Vi \times Ki$ of the multiplier/accumulator by the output $\Sigma Vi$ of the adder/accumulator with the result Ks being output as a horizontal imaging position; a vertical imaging position detecting circuit for counting horizontal synchronous signals in the TV cameras to detect a vertical imaging position Ls; an XZ look-up table for previously storing the interrelationship between the values Ks, Ls and the X- and Z-axis coordinate values such that when the first slit light beam is projected onto the work and if horizontal and vertical imaging positions Ks and Ls are input into the XZ look-up table, the actual X- and Z-axis coordinate values on the surface of the work are output therefrom; a YZ look-up table for previously storing the interrelationship between the values Ks, Ls and the Y- and Z-axis coordinate values such that when the second slit light beam is projected onto the work and if horizontal and vertical imaging positions Ks and Ls are input into the YZ look-up table, the actual Y- and Z-axis coordinate values on the surface of the work are output therefrom; a coordinate table switching circuit for inputting the outputs Ks and Ls into the XZ look-up table when the first slit light beam is projected onto the work or for inputting the output Ks and Ls into the YZ look-up table when the second slit light beam is projected onto the work; and a memory for storing the outputs of said look-up tables.

The XYZ coordinates measuring system of the third embodiment will be described below with respect to its operation.

As shown in FIG. 32, the slit light switching circuit is adapted to control the cross-shaped slit light source such that the first and second slit light beams 100-1 and 100-2 are alternately projected from the cross-shaped slit light source onto the work 10.

A timing at which the slit light beams are switched from one to another can be easily attained, for example, by detecting an ODD/EVEV signal from the TV camera to project the first slit light beam at the beginning of the ODD and then to switch the first slit light beam to the second slit light beam at the beginning of the ODD.

The first and second slit light beams 100-1 and 100-2 intersects each other on the Z-axis in the orthogonal XYZ coordinate system. The first slit light beam 100-1 is projected parallel to the XZ plane while the second slit light beam 100-2 is projected parallel to the YZ plane.

When the first slit light beam 100-1 is projected onto the surface of the work, the light line formed by the first slit light 100-1 is taken by the first TV camera. When the second slit light beam 100-2 is projected onto the surface of the work, the light line formed by the second slit light 100-1 is taken by the second TV camera.

In the third embodiment, the first slit light beam 100-1 is parallel to the ZX plane and the imaging device 1 of the first TV camera has the vertical axis (j1) substantially coincide with the X-axis direction. If the lens of the first TV camera has a swinging angle, therefore, the plane (XZ plane) formed by the first slit light beam 100-1 can be observed in a substantially focused state. As a result, there can be obtained a light line image having an increased brightness and which is reduced in speckle.

This is true for a combination of the second slit light beam 100-2 with the second TV camera.

Thus, the XYZ coordinates measuring system of the third embodiment can detect a cross-shaped light line image formed through an increased range of measurement (in the Z-axis direction) with more brightness and less speckles (actually one slit light image for one camera).

The output signals of the first and second TV cameras are switched from one to another such that when the first slit light beam 100-1 is projected onto the work, the output of the first TV camera is supplied to the coordinate measuring circuit. When the second slit light beam is projected onto the work, the output of the second TV camera is provided to the coordinate measuring circuit. The coordinate measuring circuit determines X and Z1 coordinates at each measurement point when the output of the first TV camera is selected and Y and Z2 coordinates at that measurement point when the output of the second TV camera is selected.

The measuring system of the third embodiment does not require any rotary mechanism for the imaging head as in the prior art one-camera and one-slit slit type measuring system and may be provided with an imaging head drive mechanism which is simplified in construction and reduced in manufacturing cost.

Further, the measuring system of the third embodiment can measure XYZ coordinates with an increased accuracy since it can provide a light line image having more brightness and less speckles in comparison with the conventional one-camera and two-slit light type XYZ coordinates measuring system.

The coordinate measuring circuit may be of any one of the known coordinate measuring circuits. The third embodiment utilizes such a coordinate measuring circuit as shown in FIG. 33 such that the real-time measurement of XYZ coordinates can be attained.

The operation of this coordinate measuring circuit will now be described in detail.

The coordinate measuring circuit is adapted to detect a horizontal imaging position Ks by the use of the center-of-gravity calculation as in the second embodiment. The coordinate measuring circuit is also adapted to detect a vertical imaging position Ls in the same manner as in the second embodiment.

In such a manner, the XYZ coordinates measuring system of the third embodiment can detect horizontal and vertical imaging positions Ks and Ls at a point P on a horizontal scanning line in the TV camera within about 5–6 microseconds after termination of the effective horizontal scan period of that horizontal scanning line.

The imaging positions Ks and Ls obtained when the first slit light beam 100-1 is projected onto the work constantly relates to the X- and Z-axis coordinate values on the surface of the actual work. The imaging positions K2 and Ls obtained when the second slit light beam 100-2 is projected onto the work constantly relates to the Y- and Z-axis coordinate values on the surface of the actual work.

In view of this features, the third embodiment is characterized by two look-up tables, that is, XZ and YZ look-up tables corresponding to the slit light beams 100-1 and 100-2 from the cross-shaped slit light source 12, respectively.

The XZ look-up table previously stores the interrelationship between the values Ks, Ls and the X- and Z-axis coordinates such that X- and Z-axis coordinate values on the surface of the actual work will be output from the XZ look-up table when the first slit light beam 100-1 is projected onto the work and if the horizontal and vertical imaging positions Ks and Ls are input into the look-up table.

The YZ look-up table previously stores the interrelationship between the values Ks, Ls and the X- and Z-axis coordinates such that X- and Z-axis coordinate values on the surface of the actual work will be output from the XZ look-up table when the first slit light beam 100-1 is projected onto the work and if the horizontal and vertical imaging positions Ks and Ls are input into the look-up table.

The YZ look-up table previously stores the interrelationship between the values Ks, Ls and the Y- and Z-axis coordinates such that Y- and Z-axis coordinate values on the surface of the actual work will be output from the YZ look-up table when the second slit light beam 100-2 is projected onto the work and if the horizontal and vertical imaging positions Ks and Ls are input into the look-up table.

Such interrelationships can be pre-determined theoretically or experimentally.

The coordinate table switching circuit is adapted to input the outputs Ks and Ls into the XZ look-up table when the first slit light beam 100-1 is projected onto the work or to input the outputs Ks and Ls into the YZ look-up table when the second slit light beams 100-2 is projected onto the work.

At each time when the horizontal and vertical imaging positions Ks and Ls are detected, therefore, the three-dimensional coordinates (X, O and Z) or (O, Y and Z) at a measurement point P on the work 10 can be rapidly measured by the XYZ coordinates measuring system of the third embodiment without any particular calculation or software processing. In this connection, the coordinates (X, O and Z) are three-dimensional coordinates obtained from the first slit light beam 100-1 while the coordinates (O, Y and Z) are three-dimensional coordinates obtained from the second slit light beam 100-2. This is because of the projection of the first slit light beam 100-1 parallel to the ZX plane at $Y=0$ and of the second slit light beam 100-2 parallel to the ZY plane at $X=0$.

If each of the aforementioned look-up tables is formed by any existing electronic parts, for example, by an existing ROM, the look-up table can output XYZ coordinates within a very short time period which is in the order of several hundreds of nanoseconds.

The XYZ coordinates from each of the look-up tables are sequentially stored in the memory in synchronism with the horizontal scan period of the TV camera.

The memory may be formed, for example, by a commercially available RAM. If data are written into such a RAM in the DMA (direct memory addressing) manner, XYZ coordinates at each point can be stored in the memory within several hundreds of nanoseconds after the output of the XYZ coordinates from each of the look-up tables.

Therefore, the three-dimensional coordinates at one point corresponding to a light line on that horizontal scanning line can be completely detected and stored within a maximum of 6–7 microseconds, that is, within the blanking time after termination of the effective horizontal scan period in the TV camera.

In such a manner, the XYZ coordinates measuring system of the third embodiment can detect XYZ coordinates at one point within one horizontal scanning period (63.5 microseconds) in the TV camera, leaving a sufficient margin. It thus becomes possible to perform the real-time measurement of three-dimensional coordinates at each of the points (P0, P1, P2 . . . ) along a light line 200.

The division used to detect the horizontal imaging positions Ks and the writting of the XYZ coordinates into the memory may be accomplished through a microcomputer.

In such a case, the division requires a period equal to about 20 microseconds, and the memory requires a period equal to about 20 microseconds. This means that these processing operations cannot be completed within the blanking period. If the output of the look-up table is held during one horizontal scan period as shown in FIG. 20(b), however, the storage will be performed in the next horizontal scan period so that the real-time measurement can be realized within the effective horizontal scan period (63.5 microseconds) in the TV camera.

This arrangement can provide a simplified construction without formation of the horizontal imaging position detecting circuit by a hardware divider or without writing data into the memory in the DMA manner.

COMPARISON OF THE THIRD EMBODIMENT WITH THE RELATED ART

(A) Related Art

One-camera and one-slit light type XYZ coordinates measuring system of the related art requires a linear drive mechanism as well as a rotary mechanism for measuring the dimensions of each part on a three-dimensional work. This raises up problems in measurement accuracy and manufacturing cost.

One-camera and two-slit light type XYZ coordinates measuring system of the related art may have only one linear drive mechanism since the cross-shaped slit light pattern is used therein, but cannot have an optical system optimumly designed. Thus, this measuring system must process light line images having less brightness and more speckles with the accuracy of measurement being reduced.

(B) The Third Embodiment

On the contrary, the optical system used in the XYZ coordinates measuring system can be optimumly designed by introducing the swinging angle with the resulting light line images being more bright and having less speckles. This means that the measurement of the dimensions and attitude at each point on the surface of a work to be measured can be carried out with an increased accuracy without increase of load on the linear drive mechanism.

CONCRETE EXAMPLES

The third embodiment of the present invention will be described in connection with some concrete examples illustrated in the drawings, in which parts similar to those of the first and second embodiments are designated by similar reference numerals and the description thereof will be omitted.

FIRST CONCRETE EXAMPLE

Figure 36B:
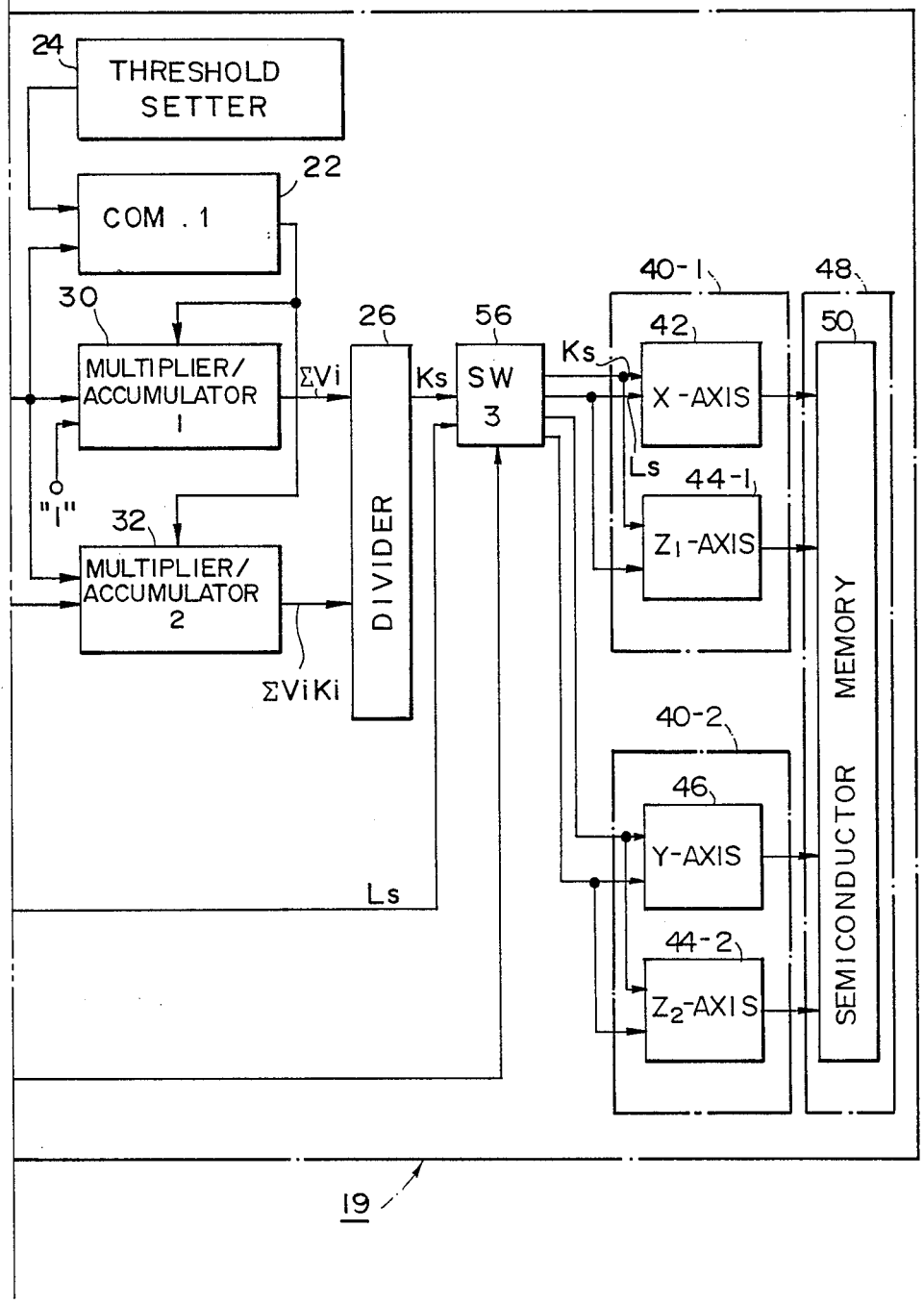

FIG. 36 shows a first concrete example of an XYZ coordinates measuring system constructed according to the third embodiment of the present invention.

The XYZ coordinates measuring system comprises a single cross-shaped slit light source 12, two TV cameras 14-1 and 14-2 and a slit light switching circuit 16.

The cross-shaped slit light source 12 is adapted to project first and second perpendicularly intersecting slit light beams 100-1 and 100-2 onto a three-dimensional work 10. The first slit light beam 100-1 is projected parallel to the ZX plane at Y=0 while the second slit light beam 100-2 is projected parallel to the ZY plane at X=0.

The slit light switching circuit 16 is adapted to control the aforementioned cross-shaped slit light source 12 such that the first and second slit light beams 100-1 and 100-2 will be alternately projected from the source 12 onto the work to perform the alternate formation of the light lines 200-1 and 200-2 on the surface of the work as shown in FIG. 35. In the first concrete example, the slit light switching circuit 16 is formed by a flip flop which is adapted to switch the slit light beams 100-1 and 100-2 from one to another within a cycle equal to one frame time (33.3 milliseconds) depending on odd/even field signals from the TV cameras 14.

The light lines 200-1 and 200-2 are taken by the TV cameras 14-1 and 14-2, respectively.

The first TV camera 14-1 is so positioned that the vertical axis (j1) of its imaging device 1 substantially coincides with the X-axis to take the light line 200-1.

The second TV camera 14-2 is so positioned that the vertical axis (j2) of its imaging device 2 substantially coincides with the Y-axis to take the light line 200-2.

Considering the positional relationship between the slit light beam 100-1 and the TV camera 14-1, it is understood that the first slit light beam 100-1 is parallel to the ZX plane at Y=O, and the imaging device 1 of the first TV camera 14-1 has its vertical axis substantially coinciding with the X-axis. Therefore, the lens of the TV camera 14-1 can have a swinging angle such that the ZX plane formed by the first slit light beam 100-1 can be observed in a substantially focused state. And yet, the first TV camera 14-1 can receive a light line 200-1 having more brightness and less speckles.

This is true for the positional relationship between the second slit light beam 100-2 and the second TV camera 14-2.

In such a manner, the two TV cameras 14-1 and 14-2 can take a cross-shaped light line image having more brightness and less speckles through an increased range of measurement (in the Z-axis direction). The output of each of the TV cameras 14-1 and 14-2 is input in the coordinate measuring circuit 19 through the TV camera switching circuit 18.

The TV camera switching circuit 18 is formed of a switch which is selectively adapted to direct the output signal of the first TV camera 14-1 to the coordinate measuring circuit 19 when the first slit light beam 100-1 is projected onto the work or to provide the output signal of the second TV camera 14-2 to the same circuit 19 when the second slit light beam 100-2 is projected onto the work, depending on the switching command from the slit light switching circuit 16.

The coordinate measuring circuit 19 is adapted to calculate the video signals from the TV cameras 14-1 and 14-2 so that the three-dimensional coordinates (X, O and Z1) at each point on the surface of the work will be output therefrom on projection of the first slit light beam while the three-dimensional coordinates (O, Y and Z2) at that point will be output from the coordinate measuring circuit 19 on projection of the second slit light beam 100-2.

The reason why in the first concrete example of the third embodiment, the Y-axis coordinate corresponding to the first slit light beam 100-1 is zero is that the first slit light beam 100-1 is projected onto the work parallel to the ZX plane at Y=O. Similarly, the reason why the X-axis coordinate corresponding to the second slit light beam 100-2 is zero is that the second slit light beam 100-2 is projected onto the work parallel to the ZY plane at X=0.

The coordinate measuring circuit 19 is operated as follows.

As previously mentioned, the video signal 300 input into the coordinate measuring circuit 19 is first converted into a digital video signal Vi by the A/D converter 20 in synchronism with the clock cycle in the TV camera 14, the digital video signal being then supplied to the light line detecting circuit 22, the adder/accumulator 30 and the multiplier/accumulator 32.

The threshold setting circuit 24 has set a threshold Vs used to detect the light line 200 from the video signal, the set threshold Vs being provided to the light line detecting circuit 22.

The light line detecting circuit 22 is formed by a comparator which is adapted to compare the video signal Vi with the threshold Vs, as shown in FIG. 20(a). During a period of time for which the video signal Vi is higher than the threshold Vs, the comparator 22 generates light line detection signals which in turn are send to the adder/accumulator 30 and the multiplier/accumulator 32.

In the first concrete example of the third embodiment, the horizontal address generating circuit 28 includes a counter adapted to count clock signals from the TV camera 14, with the count Ki being applied to the multiplier/accumulator 32 as a horizontal address representative of the horizontal position of the imaging device 14b.

The adder/accumulator 30 consists of a hardware type multiplier/accumulator which is adapted to multiply each of the outputs Vi of the A/D converter 20 by a value "1" to accumulate products into $$\sum_{i=is}^{ie} Vi$$

during a time period for which the light line detecting circuit 22 is detecting the light lines 200.

The multiplication/accumulation is repeated at each time when a horizontal synchronizing signal is output from the TV camera 14. Therefore, the adder/accumulator 30 will calculate and accumulate the denominator in the first equation at each time when a horizontal scan video signal is generated from the output of the TV camera 14.

The multiplier/accumulator 32 includes a hardware type multiplier/accumulator which is adapted to accumulate a product of each signal Vi from the A/D converter 20 and each horizontal address Ki from the horizontal address generating circuit 28 to form an accumulated value $$\sum_{i=is}^{ie} Vi \times Ki$$

During a time period for which the light line detecting circuit 22 is outputting the light line detecting signals.

The accumulation is repeated at each time when a horizontal synchronous signal is generated from the TV camera 14. Therefore, the multiplier/accumulator 32 will calculate and accumulate the numerator in the first equation at each time when a horizontal scan video signal is generated from the TV camera.

These two accumulated values $\Sigma Vi$ and $\Sigma Vi \times Ki$ are supplied to the horizontal imaging position detecting circuit 26 consisting of a divider which is adapted to divide the value $\Sigma Vi \times Ki$ by the value $\Sigma Ki$ to determine the horizontal imaging position Ks shown in the first equation.

The vertical imaging position detecting circuit 38 is formed by a counter which is adapted to count horizontal synchronous signals from the TV camera 14 to detect the number of a horizontal scanning line presently being scanned by the TV camera 14, that is, the vertical imaging position Ls.

In the first concrete example of the third embodiment, the adder/accumulator and multiplier/accumulator 30, 32 are of a hardware type which has a delay time equal to several tens nanoseconds. Thus, the values $\Sigma Vi$, $\Sigma Vi \times Ki$ and Ls can be detected at least within several tens of nanoseconds after termination of the corresponding effective horizontal scan shown in FIG. 20(a).

If the horizontal imaging position detecting circuit 38 is made of a standard and commercially available hardware type divider, time required to perform a division is in the order of a few microseconds. One horizontal imaging position Ks can be detected within 5–6 microseconds after termination of the effective horizontal scan shown in FIG. 20(a).

The horizontal and vertical imaging positions Ks and Ls so detected at each point P are then supplied to the look-up table 40.

The first concrete example of the third embodiment is characterized by that there are provided XZ and YZ look-up tables 40-1 and 40-2 corresponding to the slit light beams 100-1 and 100-2 from the cross-shaped slit light source 12, respectively.

In such an arrangement, the XZ look-up table 40-1 previously stores the interrelationship between the imaging positions Ks and Ls obtained by the projection of the slit light beam 100-1 and the coordinates X and Z1 on the surface of the actual work 10. This interrelationship can be pre-determined theoretically or experimentally.

Similarly, the YZ look-up table 40-2 previously stores the interrelationship between the imaging positions Ks and Ls obtained by the projection of the slit light beam 100-2 and the coordinates Y and Z2 on the surface of the actual work.

The first concrete example of the third embodiment utilizes a coordinate table switching circuit 56 for switching the look-up tables 40-1 and 40-2 from one to another depending on the odd/even field signals from the corresponding TV camera 14. The coordinate table switching circuit 56 is adapted to provide the outputs Ks and Ls to the XZ look-up table 40-1 when the first slit light beam 100-1 is projected onto the work or to supply the outputs Ks and Ls to the YZ look-up table 40-2 when the second slit light beam 100-2 is projected onto the work.

In such a manner, three-dimensional coordinates on the surface of the work can be determined from the detected values Ks and Ls without any software processing operation using the equation and simply read out from the look-up table corresponding to the detected values Ks and Ls.

In accordance with the first concrete example of the third embodiment, at each time when the horizontal and vertical imaging position Ks and Ls are detected, XYZ coordinates at each point P on the work 10 can be rapidly determined without any particular calculation or software processing.

The XZ look-up table 40-1 consists of an X-axis table 42 and a Z-axis table 44-1, each of these tables 42 and 44-1 being formed by a ROM which is adapted to previously store an interrelationship between the values Ks and Ls obtained by the projection of the slit light beam 100-1 and the three-dimensional coordinates X and Z1.

The YZ look-up table 40-2 includes a Y-axis table 46 and a Z-axis table 44-2. Each of the tables 46 and 44-2 is composed of a ROM which is adapted to previously store the values Ks and Ls obtained by the projection of the slit light beam 100-2 and the three-dimensional coordinates X and Z2.

At the same time as each of the effective horizontal scan period shown in FIG. 20(a) is terminated, the values Ks and Ls are applied to either of the tables 40-1 or 40-2, which table generates the corresponding coordinates after several hundreds of nanoseconds, the coordinates being then written in the memory 48.

In such a manner, the XYZ coordinates measuring system of the first concrete example of the third embodiment can complete the detection and storage of XYZ coordinates at each point corresponding to the light line 200 on the horizontal scanning line within about 6–7 microseconds, that is, the blanking time after termination of the effective horizontal scan period in the TV camera 14.

As a result, the XYZ coordinates at one point can be detected during one horizontal scanning period (63.5 microseconds) in the TV camera 14, such that the realtime measurement of XYZ coordinates at each of various points (P0, P1, P2 . . . ) along the light line 200 can be realized.

The division for detecting the horizontal imaging position Ks and the writing of the XYZ coordinates into the semiconductor memory 50 may be performed by utilizing the software processing due to a microcomputer.

The microcomputer will not be further described herein since it has been described in connection with the second embodiment of the present invention.

SECOND CONCRETE EXAMPLE

Figures 37, 37A:
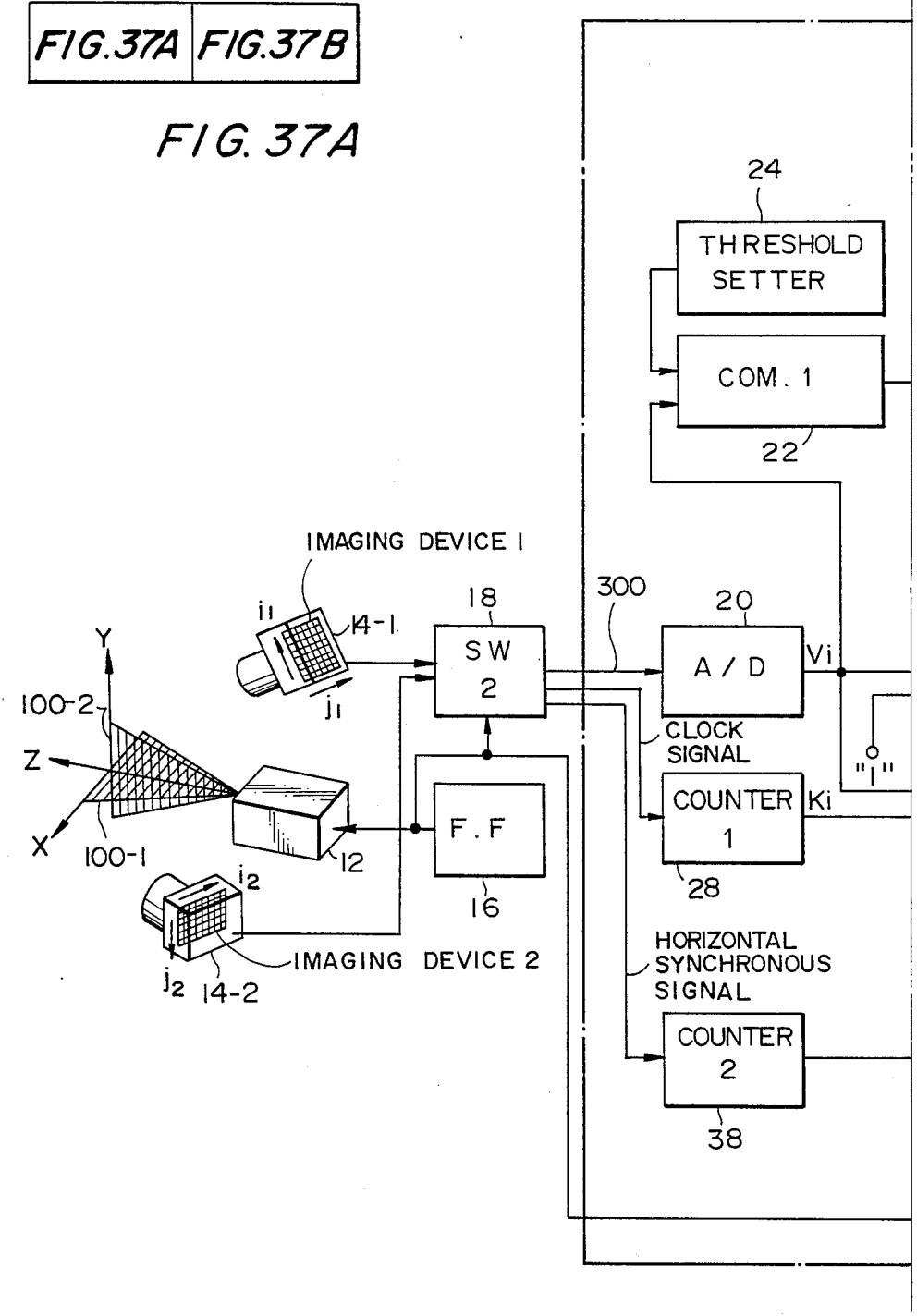
FIGS. 37, 37A and 37B are block diagrams showing a second concrete example of the XYZ coordinates measuring system according to the third preferred embodiment of the present invention.
Figure 37B:
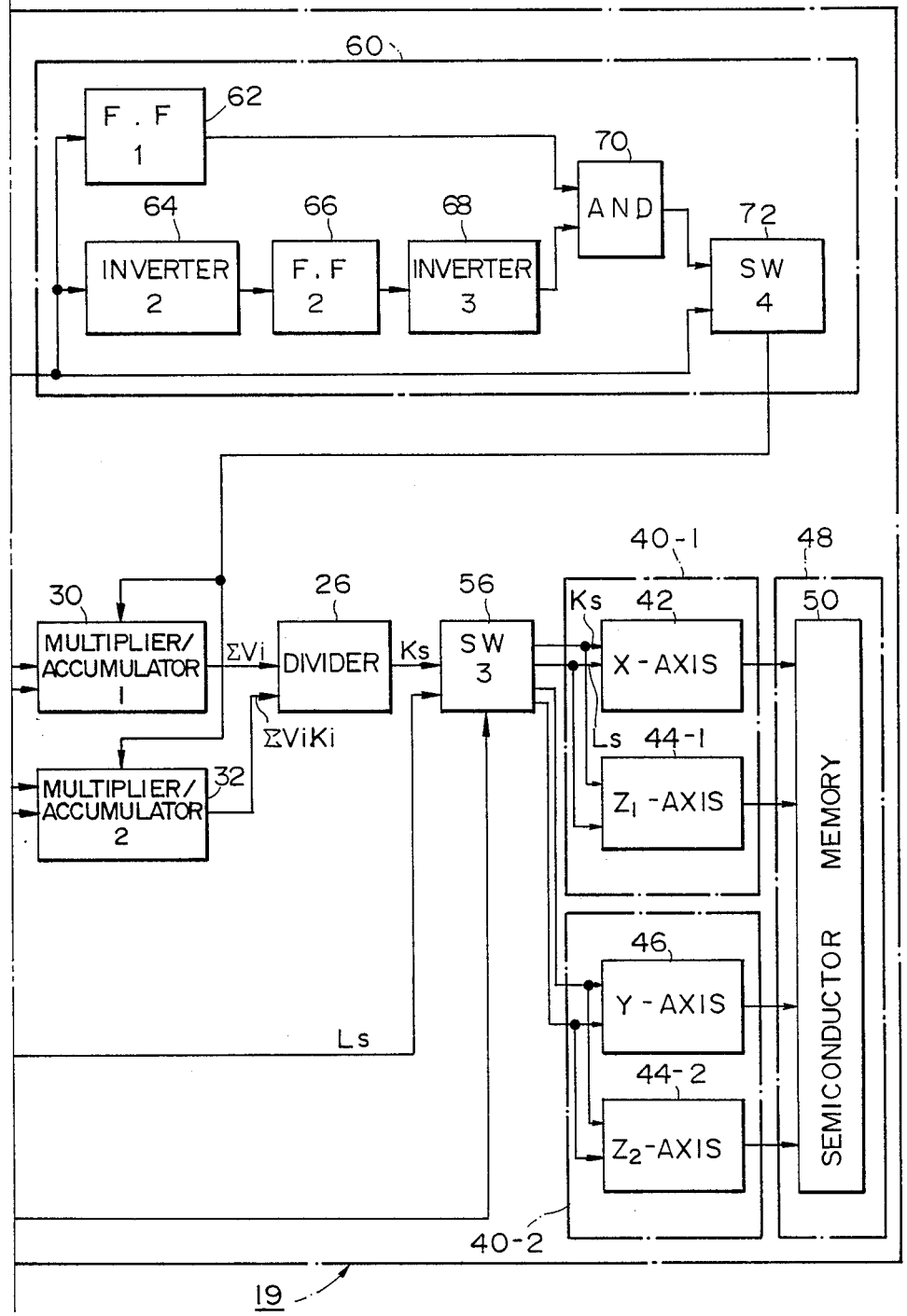

FIG. 37 shows the second concrete example of an XYZ coordinates measuring system constructed according to the third embodiment of the present invention.

The second concrete example is characterized by a light line assigning circuit 60 adapted to select any one of two detection signals from the light line detecting circuit 22 and send it to the adder/accumulator 30 and the multiplier/accumulator 32 when two light lines 200 exist on one horizontal scanning line.

The arrangement and function of this light line assigning circuit 60 is the same as those of the second concrete example of the second embodiment shown in FIG. 22 and will not be further described.

In such an arrangement, three-dimensional coordinates on the surface of a work can be precisely measured even if two light lines 200 are created on one horizontal scanning line under the multi-reflection. Further, the necessary three-dimensional coordinates can be accurately measured even if two light lines are produced on one horizontal scanning line from the configuration of the work and the positional relationship between the slit light source and the TV cameral.

THIRD CONCRETE EXAMPLE

If there is a light reflected from the interior of a recess on the surface of the work under the multi-reflection as shown in FIG. 24(a), the root of the peak value in the video signal is lifted as shown in FIG. 25(b). In such a case, the position of a light line cannot be accurately detected due to the multi-reflection if a fixed threshold Vs is used to detect the light line 200.

The XYZ coordinates measuring system of the third concrete example of the third embodiment can exactly detect the position of the light line even in the above case and is thus characterized by that a proportional threshold resulting from a product of the peak value $V_p$ in the video signal multiplied by a value q is set.

The value q may be initially determined from various factors such as the reflection coefficient in the work 10 and so on. Even if the peak value $V_p$ in the video signal is variable, therefore, the position of the light line can be exactly detected without influence due to the reflective signals from the root of the peak value.

Figures 38, 38A:
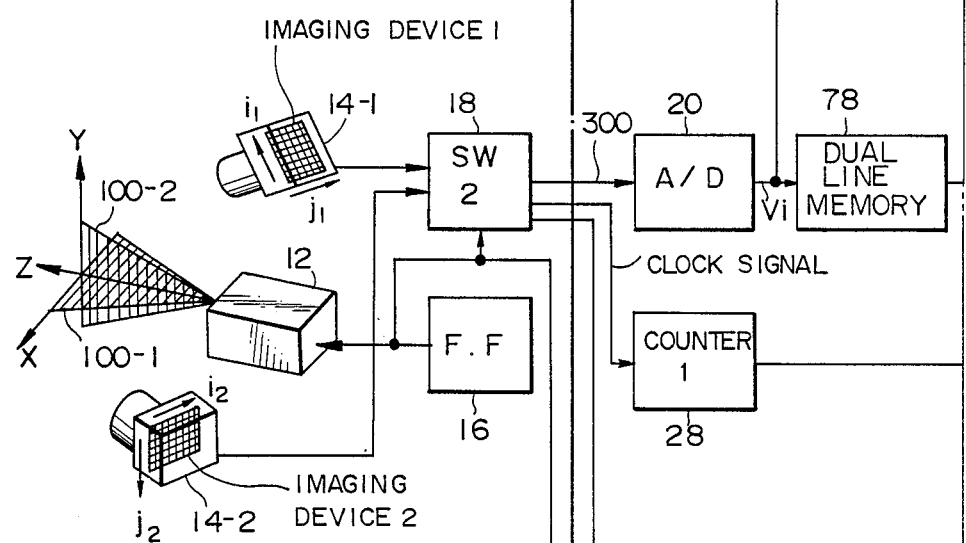
FIGS. 38, 38A and 38B are block diagrams showing a third concrete example of the XYZ coordinates measuring system according to the third preferred embodiment of the present invention.
Figure 38B:
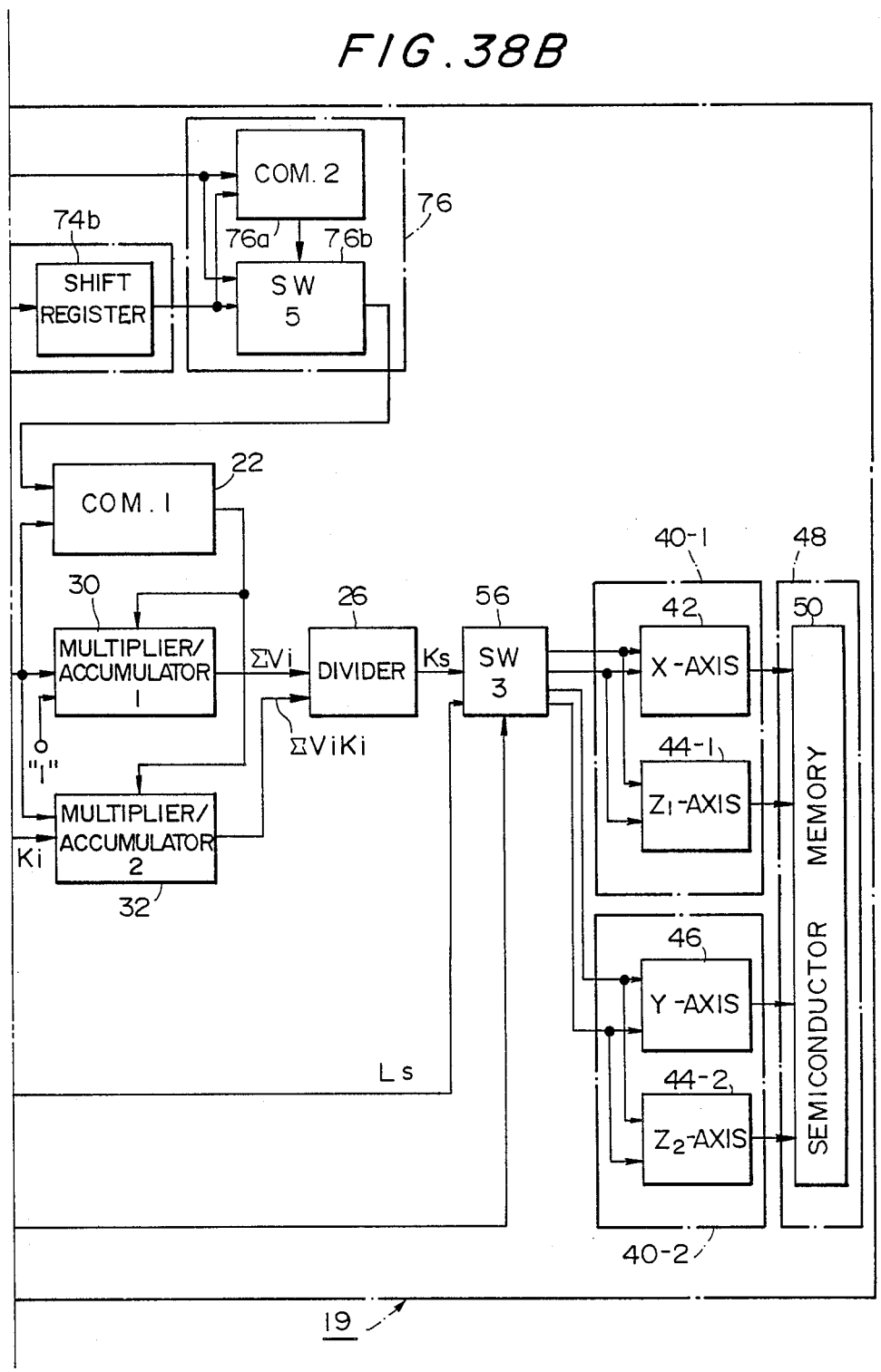

FIG. 38 more concretely shows the arrangement of the XYZ coordinates measuring system according to the third concrete example of the third embodiment, which comprises a porportional threshold setting circuit 74, a threshold setting circuit 76 and a dual-line memory 78.

The arrangements and functions of the proportional threshold setter, threshold setter and dual-line memory (74, 76 and 78) are the same as those of the third concrete example of the second embodiment shown in FIG. 23 and will not be further described herein.

In such a manner, the horizontal imaging position Ks for the light line 200 can be positively detected to perform the realtime measurement of XYZ coordinates even though the root of the light line 200 included in the video signal is raised under the multi-reflection from the surface of the work so that the light line 200 cannot be detected only by the use of the fixed threshold Vs.

The XYZ coordinates measuring system just described may use a microcomputer to write the three-dimensional coordinates into the semiconductor memory 50, for example.

FOURTH CONCRETE EXAMPLE

When the multi-reflection is created on the surface of the work, two or more peaks may exist on the video signal for one horizontal scan as shown in FIG. 25(c). If so, it cannot be judged which one of the peak values is a true peak value corresponding a light line 200 to be measured.

Even in such a case, the fourth concrete example can positively select a proper light line 200 to be measured to made the real-time measurement of XYZ coordinates at each point on the surface of the work.

Figures 39, 39A:
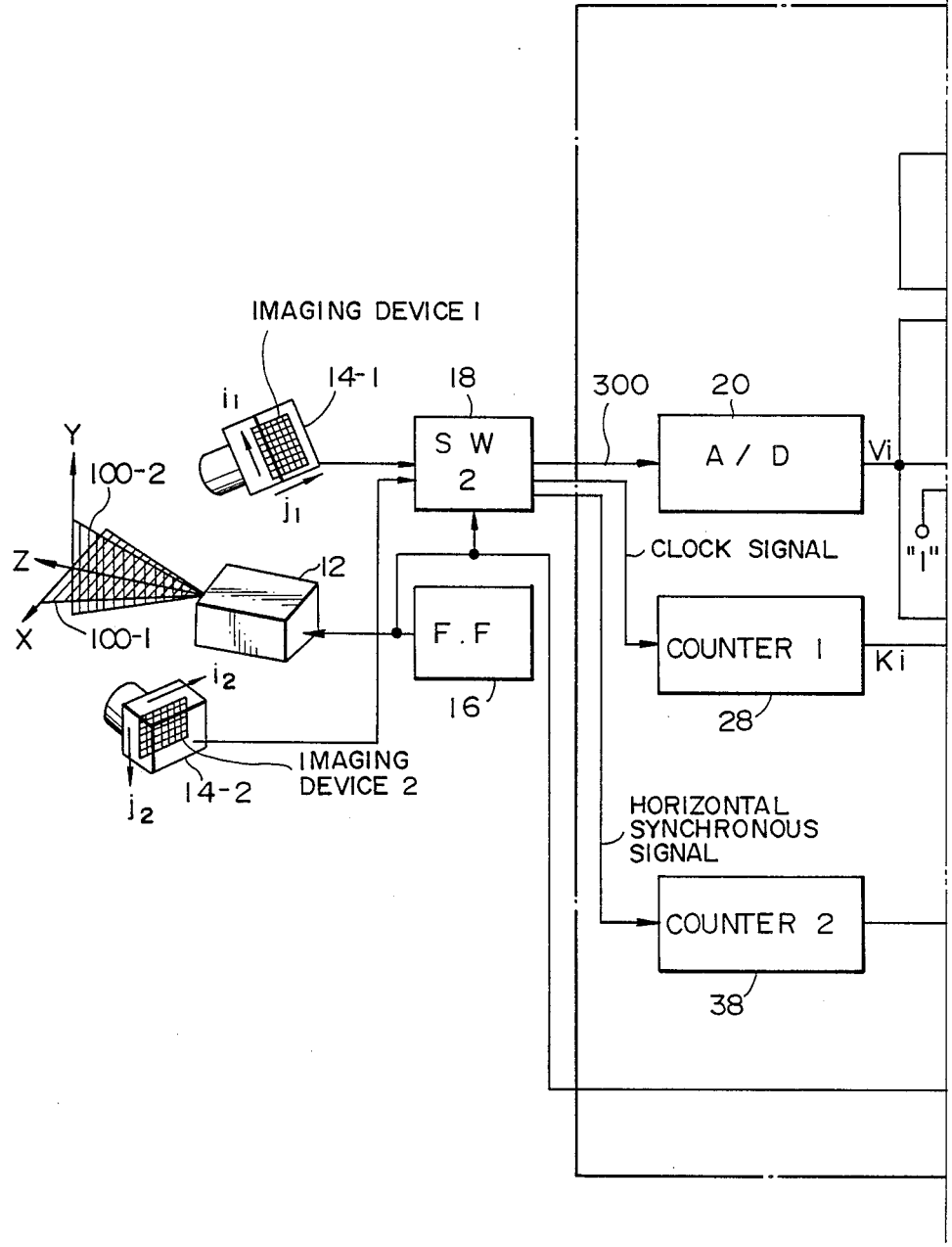
FIGS. 39, 39A and 39B are block diagrams showing a fourth concrete example of the XYZ coordinates measuring system according to the third preferred embodiment of the present invention.
Figure 39B:
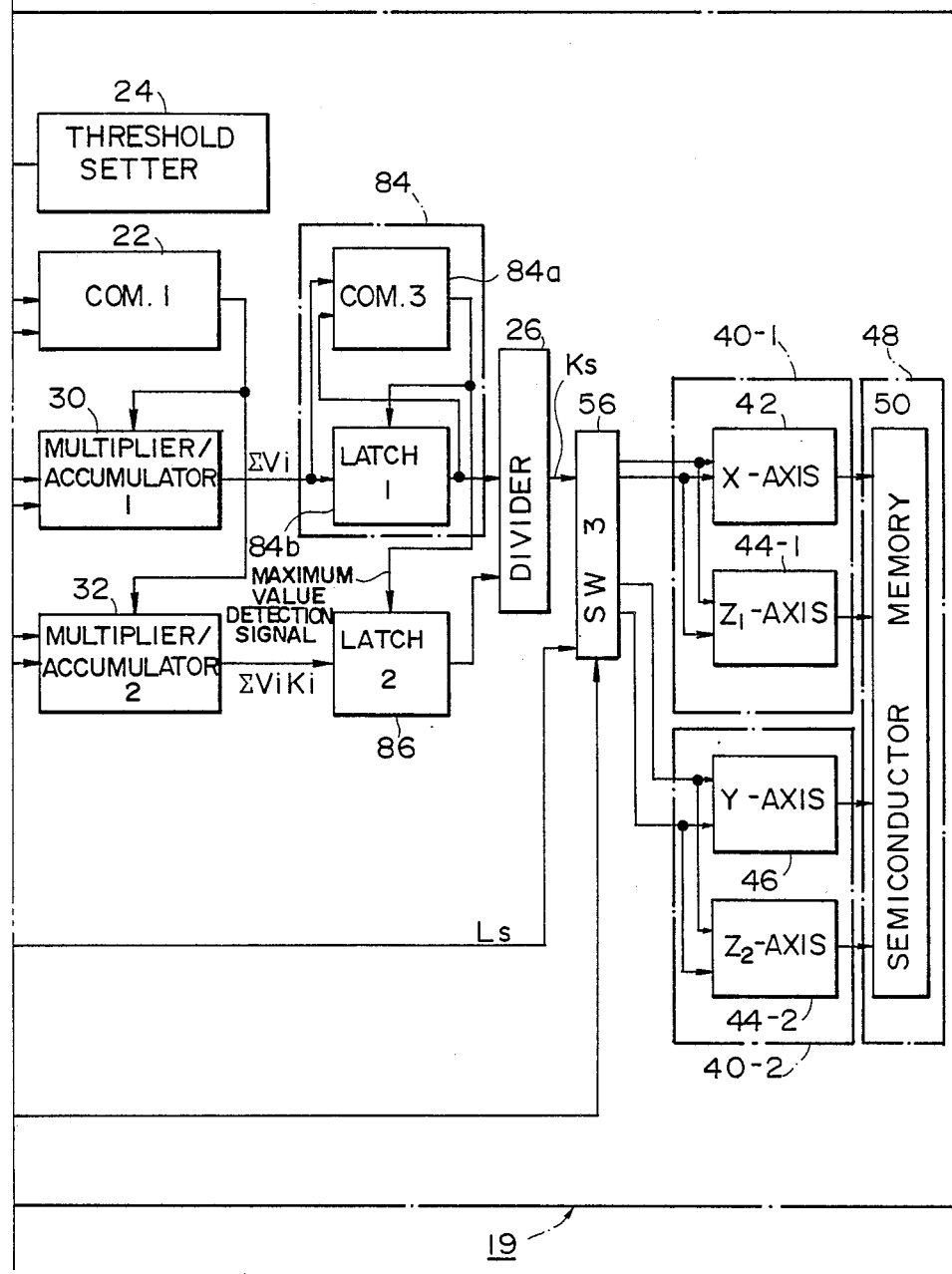

Referring now to FIG. 39, there is shown an XYZ coordinates measuring system constructed according to the fourth concrete example. The measuring system is characterized by that a true peak value for a light line 200 to be determined can be properly selected from the fact that the true light line 200 to be measured provides the maximum value of $\Sigma$ Vi.

To this end, the measuring system comprises a storage circuit 84 for storing the maximum value of $\Sigma$ Vi and another storage circuit 86 for storing a value $\Sigma$ ViKi.

The arrangements and functions of the storage circuits 84 and 86 are the same as those of the fourth concrete example of the second embodiment shown in FIG. 26 and will not be further described herein.

In such an arrangement, the peak value corresponding to the true light line 200 can be positively selected to calculate the XYZ coordinates by the use of the storage circuits 84 and 86 even if it cannot be judged which one of a plurality of existing peaks during one horizontal scan period is representative of the true light line 200 as shown in FIG. 25(c).

Figures 40, 40A:
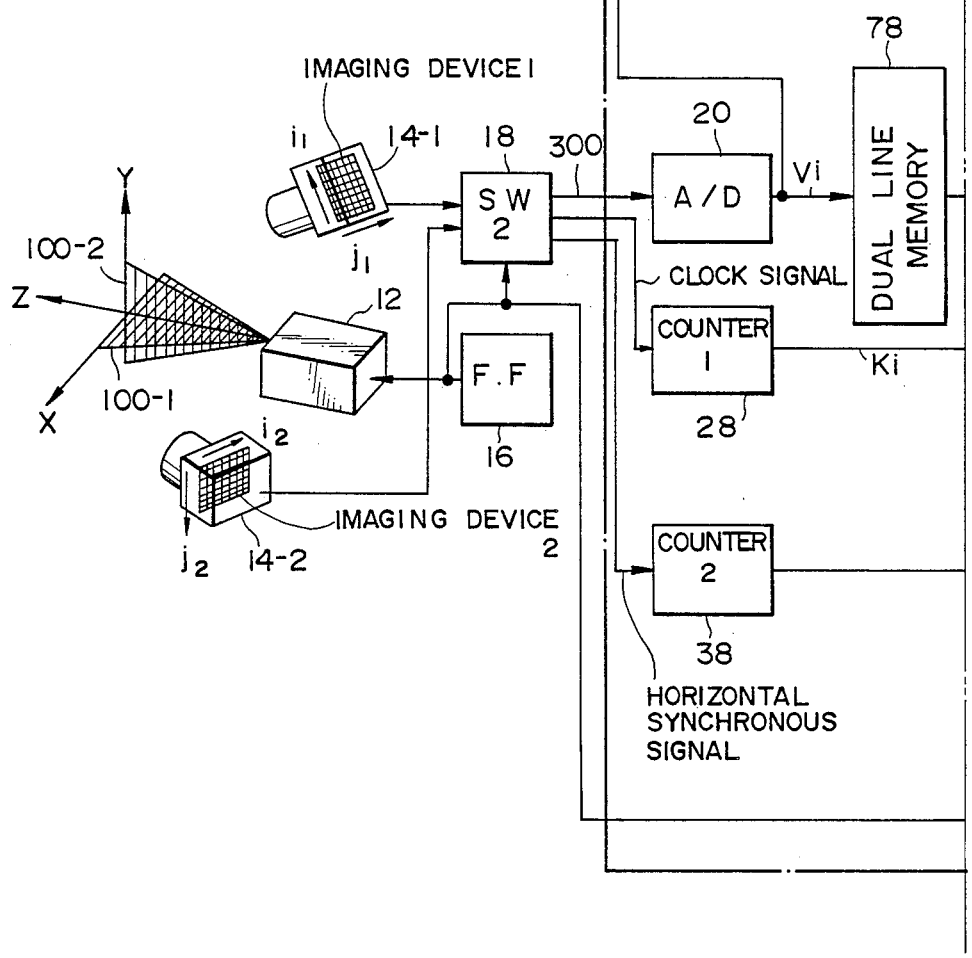
FIGS. 40, 40A and 40B are block diagrams of the fourth concrete example shown in FIG. 39 when a proportional threshold setting circuit is provided therein.
Figure 40B:
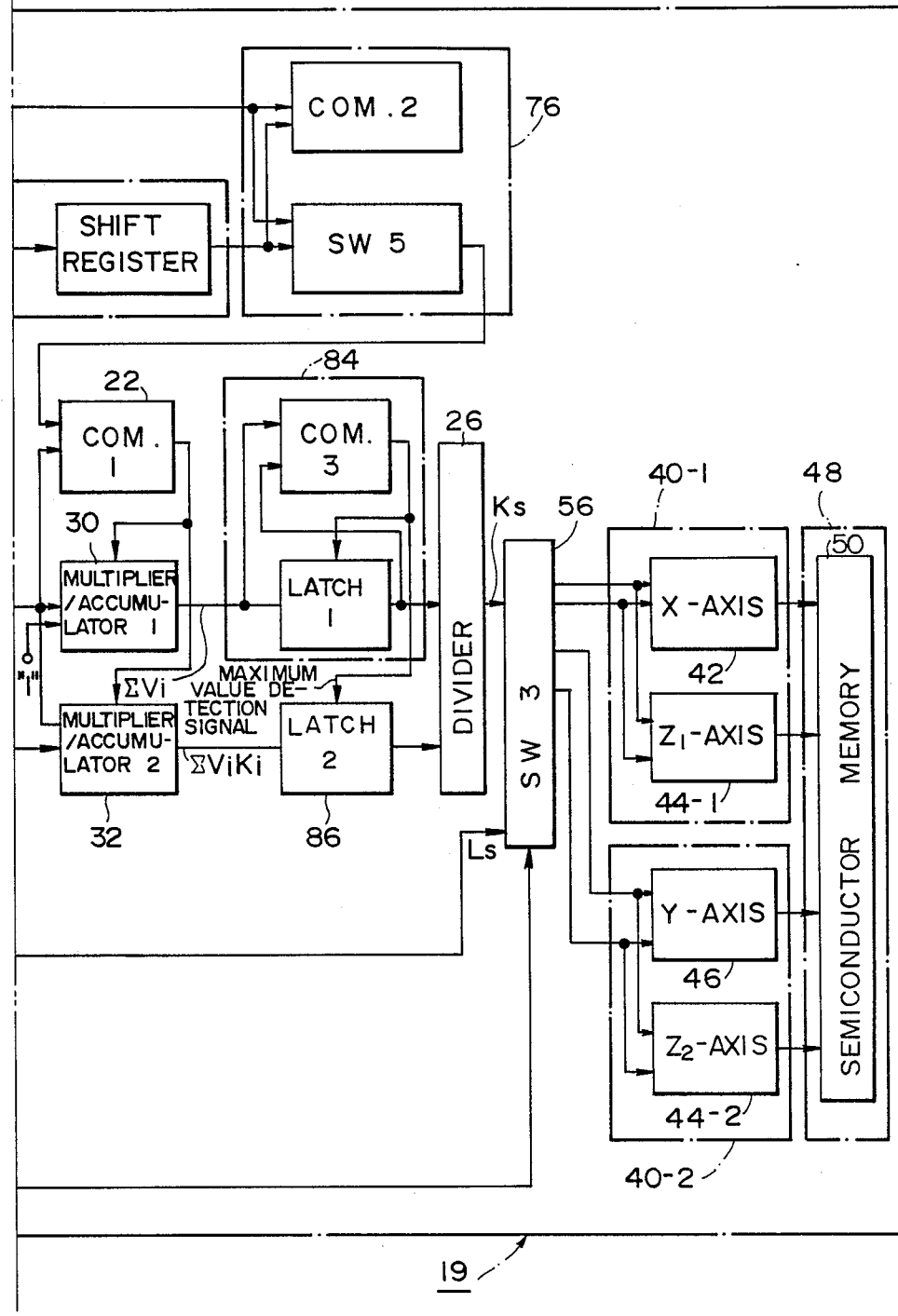

The fourth concrete example may include such a proportional threshold setting circuit 74, threshold setting circuit 76 and dual-line memory 78 as shown in FIG. 40.

FIFTH CONCRETE EXAMPLE

Where the measurement of coordinates is carried out by the use of a triangulation utilizing a slit light beam 100 and a TV camera 14, the width W of a light line 200 detected by the TV camera 14 may highly influence the accuracy of measurement as described in the second embodiment.

In such a triangulation, further, the accuracy of measurement is greatly influenced by whether or not the maximum value $V_p$ in a light line to be detected is lower than the saturation level in the imaging device 14b of the TV camera 14.

The fifth concrete example of the third embodiment is characterized by that the width W and maximum value $V_p$ of a light line is high-speed detected at the same time as the measurement of XYZ coordinates for each horizontal scanning such that it is judged whether the width W and maximum value of that light line is proper.

Figure 41B:
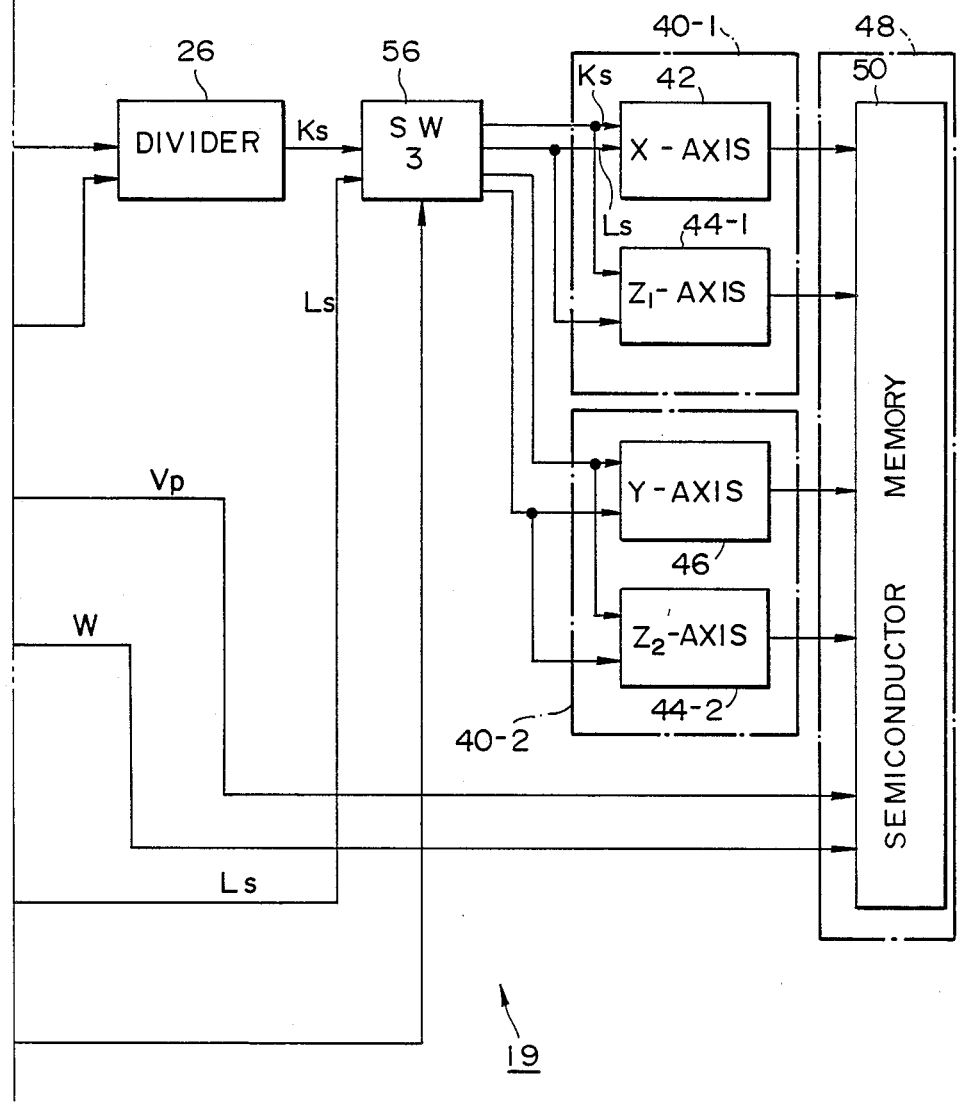

FIG. 41 shows an XYZ coordinates measuring system constructed according to the fifth concrete example of the third embodiment, which comprises a maximum light line value detecting circuit 90 and a light line width detecting circuit 92.

The arrangements and functions of these detecting circuits 90 and 92 are the same as those of the fifth concrete example of the first embodiment shown in FIG. 17 and the fifth concrete example of the second embodiment shown in FIG. 29 and will not be further described herein.

Such an arrangement can carry out the high-speed measurement of the maximum value $V_p$ and width W of the light line as well as the high-speed measurement of XYZ coordinates for each horizontal scan in the TV camera 14.

The fifth concrete example of the third embodiment may have a light line assigning circuit 60, if required. It also may utilize a microcomputer for writing the data into the semiconductor memory 50, if required.

SIXTH CONCRETE EXAMPLE

Figure 42B:
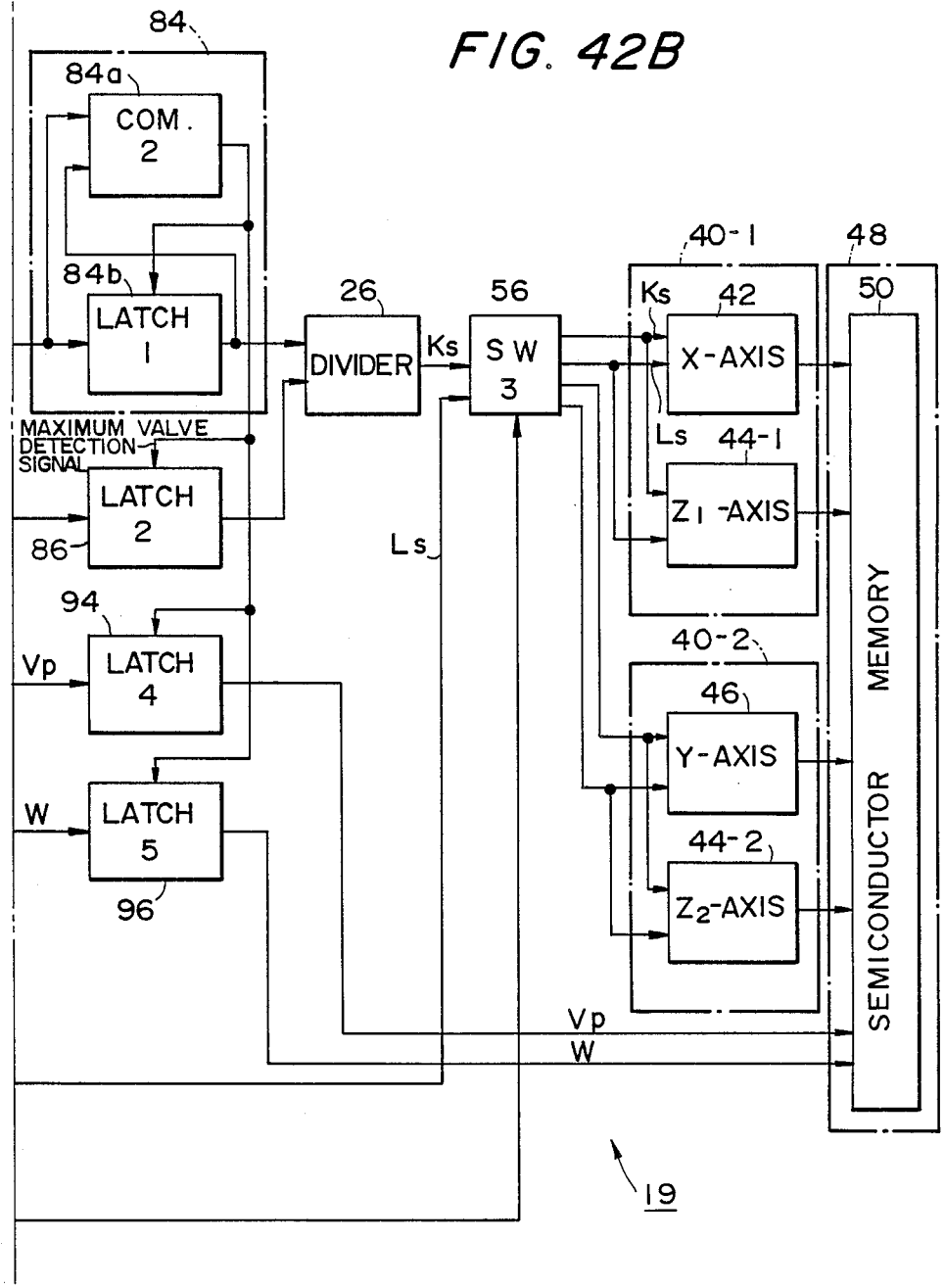

FIG. 42 shows the sixth concrete example of an XYZ coordinates measuring system according to the third embodiment, which is characterized by that if two or more light lines 200 exist on one horizontal scanning line, the width W and maximum value $V_p$ of the true light line 200 (providing the maximum value of the output $\Sigma$ Vi of the adder/accumulator) are detected.

To this end, the XYZ coordinates measuring system of the sixth concrete example comprises a temporal storage circuit 96 for temporally storing the light line width and another temporal storage circuit 94 for temporally storing the maximum light line value.

The arrangements and functions of these temporal storage circuits 96 and 94 are the same as those of the sixth concrete example of the second embodiment shown in FIG. 30 and will not be further described herein.

SEVENTH CONCRETE EXAMPLE

The seventh concrete example of the third embodiment will be described below.

The seventh concrete example is characterized by a control circuit 110 for controlling the width and intensity of a slit light beam into the optimum levels, depending on the width W and maximum value $V_p$ of a light line detected for each horizontal scanning, as shown in FIG. 18.

The control circuit 110 comprises a comparator 112, a maximum light line value setter 114, a memory circuit 116, a compartor 118, a light line width setter 120 and a microcomputer Such an arrangement can provide the same functions and advantages as those of the sixth concrete example of the first embodiment and the seventh concrete example of the second embodiment.

Although the aforementioned concrete examples of the third embodiment have been described as to the center-of-gravity calculation for determining the horizontal imaging positions Ks, they are not limited to the center-of-gravity calculation and may be adapted to add addresses Kis and Kie at the respective positive and negative edges with the result being a horizontal imaging position Ks, during a time period for which light line detection signals are being output from the light line detecting circuit 22, for example.

We claim:

1. An XYZ coordinates measuring system comprising:
   a slit light source means for projecting a slit light beam onto a surface of a work to be measured with a predetermined angle;
   television camera means for taking a light line formed on the surface of the work by said slit light beam to generate an output video signal; and
   coordinate measuring circuit means for processing said video signal and for detecting horizontal and vertical imaging positions Ks and Ls of said light line, said coordinate measuring circuit means including look-up table means for previously storing an interrelationship between horizontal and vertical imaging positions of said light line and XYZ coordinates thereof on said surface of the work, thereby outputting XYZ coordinates on the surface of the work from the look-up table means, based on detected values of the horizontal and vertical imaging positions Ks and Ls,
   whereby the XYZ coordinates on the surface of the work are real-time measured along the light line.

2. The XYZ coordinates measuring system as defined in claim 1 wherein said slit light source means includes a slit light source for projecting slit light beams onto the surface of the work with a predetermined angle and wherein said television camera means includes a television camera for taking a light line formed on the surface of the work by said slit light beam to generate an output video signal in synchronism with a horizontal scan and wherein said coordinate measuring circuit means comprises a threshold setting circuit for setting a threshold used to detect the light line from the video signal, a light line detecting circuit for generating at its output light line detection signals during a period for which the video signal is higher than said threshold, a horizontal address generating circuit for generating a horizontal address representative of a position of a horizontal picture element in an imaging device of said television camera, a horizontal imaging position detecting circuit for adding addresses at positive and negative edges to form and generate a horizontal imaging position value during a period for which light line detection signals are being output from said light line detecting circuit, a vertical imaging position detecting circuit for counting horizontal synchronous signals from the television camera to detect a vertical imaging position, a look-up table for previously storing the interrelationship between the horizontal and vertical imaging positions and the XYZ coordinates on the surface of the actual work, said look-up table generating at its output the XYZ coordinates on the surface of the work, based on the horizontal and vertical imaging positions detected, and a memory for storing the XYZ coordinates from said look-up table, whereby the XYZ coordinates on the surface of the work are real-time measured along the light line.

3. The XYZ coordinates measuring system as defined in claim 2 wherein said coordinate measuring circuit means includes a light line assigning circuit for selecting any one of two light line detection signals from said light line detecting circuit within a horizontal scan period when two light lines exist on one horizontal scanning line, the selected light line detection signal being then supplied to said horizontal imaging position detecting circuit.

4. The XYZ coordinates measuring system as defined in claim 2 wherein said slit light source projects at least two non-parallel slit light beams onto the surface of the work with predetermined angles and wherein there is provided a slit light selecting circuit for selecting and projecting any one of said at least two slit light beams onto the surface of the work and wherein said look-up table means includes a plurality of look-up tables corresponding in number to said slit light beams, one of said look-up tables corresponding to a selected slit light beam being selected whereby the corresponding XYZ coordinates are output on the surface of the work.

5. The XYZ coordinates measuring system as defined in claim 2 wherein said coordinate measuring circuit means comprises a light line width detecting circuit for counting clock signals from the television camera means to detect a light line width for each horizontal scan period during a period for which the light line is being detected, a maximum light line value detecting circuit for detecting a maximum value in the detected light line for each horizontal scan, a control circuit for controlling intensity of the slit light into a proper level, depending on at least one of a width and a maximum value in the light line detected for each horizontal scan.

6. The XYZ coordinates measuring system as defined in claim 2 wherein said slit light source means comprises a cross-shaped slit light source for projecting first and second slit light beams onto the work, said first and second slit light beams perpendicularly intersecting each other on a Z-axis in an orthogonal XYZ coordinate system, the first slit light beam being parallel to an XZ plane while the second slit light beam being parallel to a YZ plane, and a slit light switching circuit for performing the alternate projection of the first and second slit light beams from said cross-shaped slit light beams from said cross-shaped slit light source and wherein said television camera means includes first and second television cameras for taking light lines formed on the work by said slit light beams, the first television camera extends the vertical axis of its imaging device substantially parallel to an X-axis while the second television camera being positioned to extend the vertical axis of its imaging device substantially parallel to a Y-axis, and a television camera switching circuit for selecting the output signal of said first television camera on projection of the first slit light beams or the output signal of the second television camera on projection of the second slit light beam and wherein said coordinate measuring circuit processes the output of said television camera switching circuit to output an XZ coordinate when the first slit light beam is projected and a YZ coordinate when the second slit light beam is projected.

7. The XYZ coordinates measuring system as defined in claim 1 wherein said slit light source means includes a slit light source for projecting a slit light beam onto the surface of the work with a predetermined angle and wherein said television camera means includes a television camera for taking a light line formed on the surface of the work by said slit light beam and wherein said coordinate measuring circuit comprising an A/D converter for converting a video signal from the television camera into a digital video signal Vi in synchronism with a horizontal scan, a threshold setting circuit for setting a threshold used to detect the light line from the video signal, a light line detecting circuit for generating at its output light line detection signals during a period for which the digital video signal Vi is higher than said threshold, a horizontal address generating circuit for generating horizontal addresses representative of a position of a horizontal picture element in an imaging device of said television camera, an adder/accumulator for accumulating video signals Vi from the A/D converter during a period for which light line detection signals are being output from said light line detecting circuit, a multiplier/accumulator for accumulating a product Vi X Ki of each video signal Vi from the A/D converter and each of said horizontal addresses Ki from said horizontal address generating circuit for a period for which light line detection signals are being output from said light line detecting circuit, a horizontal imaging position detecting circuit for dividing an output Σ Vi of said adder/accumulator to form a calculated valve Ks representative of a horizontal imaging position, a vertical imaging position detecting circuit for counting horizontal synchronous signals from the television camera to detect a vertical imaging position Ls, a look-up table for previously storing the interrelationship between the horizontal and vertical imaging positions and the XYZ coordinates on the surface of the actual work, said look-up table generating at its output the XYZ coordinates on the surface of the work, depending on the horizontal and vertical imaging positions Ks and Ls detected, and a memory for storing the XYZ coordinates from said look-up table.

8. The XYZ coordinates measuring system as defined in claim 7 wherein said coordinate measuring circuit includes a light line assigning circuit for selecting any one of two light line detection signals from said light line detecting circuit when two light lines exist on one horizontal scanning line, the selected light line detection signal being applied to said adder/accumulator and multiplier/accumulator.

9. The XYZ coordinates measuring system as defined in claim 7 wherein said coordinate measuring circuit comprises a dual-line memory for alternately storing video signals Vi for the respective horizontal scanning lines from the A/D converter, said dual-line memory providing a video signal stored in an immediately preceding horizontal scan period to said light line detecting circuit, adder/accumulator and multiplier/accumulator, a proportional threshold setting circuit for detecting a maximum value in a video signal Vi for each horizontal scan in the television camera, the maximum value being multiplied by a preset proportional coefficient to obtain a result with the result being then output as a proportional threshold, and a threshold selecting circuit for generating a proportional threshold to said light line detecting circuit when a threshold set by said proportional threshold setting circuit is higher than a usual threshold set by said threshold setting circuit and for supplying said usual threshold to said light line detecting circuit when said proportional threshold is lower than said usual threshold.

10. The XYZ coordinates measuring system as defined in claim 7 wherein said coordinate measuring circuit comprises a maximum $\Sigma Vi$ value storing circuit for storing the maximum value of $\Sigma Vi$ from said adder/accumulator and simultaneously generating a maximum value detection signal, when at least two light lines exist on one horizontal scanning line, and a $\Sigma ViKi$ storing circuit for storing the output $\Sigma Vi \times Ki$ of said multiplier/accumulator in synchronism with the maximum value detection signal from said maximum $\Sigma Vi$ value storing circuit.

11. The XYZ coordinates measuring system as defined in claim 10 wherein said coordinate measuring circuit comprises:
   a light line width detecting circuit for counting clock signals from the television camera to detect a width of a light line for a period from which the light line is being detected for each horizontal scan;
   a temporal storage circuit for temporally storing the light line width from said light line width detecting circuit depending on a maximum value detection signal from said maximum Vi value storing circuit;
   a maximum light line value detecting circuit for detecting the maximum value of the detected light line for each horizontal scan;
   a temporal storage circuit for temporally storing the maximum light line value from said maximum light line value detecting circuit depending on the maximum value detection signal from said maximum $\Sigma Vi$ value storing circuit; and
   a control circuit for controlling an intensity of the slit light beam into a proper level depending on at least one of the width and maximum value detected for that light line for each horizontal scan.

12. The XYZ coordinates measuring system as defined in claim 7 wherein said slit light source means projects at least two non-parallel slit light beams onto the surface of the work with predetermined angles and wherein there is provided a slit light selecting circuit for selecting any one of said at least two slit light beams, the selected slit light beam being projected onto the surface of the work and wherein said look-up table means includes a plurality of look-up tables corresponding in number to said slit light beams, one of the look-up tables corresponding to the selected slit light beam outputting corresponding XYZ coordinates on the surface of the work.

13. The XYZ coordinates measuring system as defined in claim 7 wherein said slit light source means comprises a cross-shaped slit light source for projecting first and second slit light beams onto the work, said first and second slit light beams perpendicularly intersecting each other on a Z-axis in an orthogonal XYZ coordinate system, said first slit light beam being parallel to an XZ plane while said second slit light beam being parallel to an XZ plane, and a slit light switching circuit for performing the alternate projection of said first and second slit light beams from said cross-shaped slit light source and wherein said television camera means includes first and second television cameras for taking the light lines formed on the work by said slit light beams, said first television camera being located to extend a vertical axis of its imaging device substantially parallel to the X-axis while said second television camera extending the vertical axis of its imaging device substantially parallel to the Y-axis, and a television camera switching circuit for selecting the output signal of said first television camera when the slit light beam is projected onto the work or the output signal of said second television camera when the second slit light beam is projected onto the work and wherein said coordinate measuring circuit processes the output of said television camera switching circuit to output an XZ coordinate when the first slit light beam is projected and a YZ coordinate when the second slit light beam is projected.

14. The XYZ coordinates measuring system as defined in claim 13 wherein said coordinate measuring circuit comprises:
   an A/D converter for converting a video signal from said television camera switching circuit into a digital video signal Vi in synchronism with a horizontal scan;
   a threshold setting circuit for setting a threshold level used to detect the light line from the video signal;
   a light line detecting circuit for outputting light line detection signals during a period for which the digital video signal Vi is higher than the threshold level;
   a horizontal address generating circuit for generating a horizontal address Ki representative of a position of a horizontal picture element in the imaging device of the television camera;
   an adder/accumulator for accumulating video signals Vi from the A/D converter during a period for which light line detection signals are being output from the light line detecting circuit;
   a multiplier/accumulator for accumulating a product $Vi \times Ki$ of each video signal Vi from said A/D converter and each horizontal address Ki from said horizontal address generating circuit for a period for which light line detection signals are being output from the light line detecting circuit;
   a horizontal imaging position detecting circuit for dividing the output $\Sigma Vi \times Ki$ of said multiplier/accumulator by the output $\Sigma Vi$ of said adder/accumulator with the resulting value Ks being then output from said horizontal imaging position detecting circuit as a horizontal imaging position;
   a vertical imaging position detecting circuit for counting horizontal synchronous signals from the television camera to detect a vertical imaging position Ls;
   an XZ look-up table for previously storing the interrelationship between the values Ks, Ls and the X- and Z-axis coordinates such that when the first slit light beam is projected onto the work and if the horizontal and vertical imaging positions Ks and Ls are input into said XZ look-up table, actual X- and Z-axis coordinates on the surface of the work are output from said XZ look-up table;

a YZ look-up table for previously storing the interrelationship between the values Ks, Ls and the Y- and Z-axis coordinates such that when the second slit light beam is projected onto the work and if the horizontal and vertical imaging positions Ks and Ls are input into said YZ look-up table, actual Y- and Z-axis coordinates on the surface of the work are output from said YZ look-up table;

a coordinate table switching circuit for supplying the outputs Ks and Ls to the XZ look-up table on projection of the first slit light beam and for applying the outputs Ks and Ls to the YZ look-up table on projection of the second slit light beam; and a memory for storing the outputs of said look-up tables.

15. The XYZ coordinates measuring system as defined in claim 14 wherein said coordinate measuring circuit includes a light line assigning circuit for selecting any one of two light line detection signals from said light line detecting circuit when two light lines exist on one horizontal scanning line, the selected light line detection signal being supplied to said adder/accumulator and multiplier/accumulator.

16. The XYZ coordinates measuring system as defined in claim 14 wherein said coordinate measuring circuit comprises a dual-line memory for alternately storing video signals Vi for the respective horizontal scanning lines from the A/D converter, said dual-line memory providing a video signal stored in an immediately preceding horizontal scan period to said light line detecting circuit, adder/accumulator and multiplier/accumulator, a proportional threshold setting circuit for detecting the maximum value in a video signal Vi for each horizontal scan in the television camera, the maximum value being multiplied by a preset proportional coefficient with the result being then output as a proportional threshold, and a threshold selecting circuit for generating a proportional threshold to said light line detecting circuit when a threshold set by said proportional threshold setting circuit is higher than a usual threshold set by said threshold setting circuit and for supplying said usual threshold to said light line detecting circuit when said proportional threshold is lower than said usual threshold.

17. The XYZ coordinates measuring system as defined in claim 14 wherein said coordinate measuring circuit comprises a maximum $\Sigma Vi$ value storing circuit for storing the maximum value of $\Sigma Vi$ from said adder/accumulator and simultaneously generating a maximum value detection signal, when at least two light lines exist on one horizontal scanning line, and a $\Sigma ViKi$ storing circuit for storing the output $\Sigma Vi \times Ki$ of said multiplier/accumulator in synchronism with the maximum value detection signal from said maximum $\Sigma Vi$ value storing circuit.

18. The XYZ coordinates measuring system as defined in claim 17 wherein said coordinate measuring circuit comprises:

a light line width detecting circuit for counting clock signals from the television camera to detect the width of a light line for a period for which the light line is being detected for each horizontal scan;

a temporal storage circuit for temporally storing the light line width from said light line width detecting circuit depending on the maximum value detection signal from said maximum Vi value storing circuit;

a maximum light line value detecting circuit for detecting the maximum value of the detected light line for each horizontal scan;

a temporal storage circuit for temporally storing the maximum light line value from said maximum light line value detecting circuit depending on the maximum value detection signal from said maximum $\Sigma Vi$ value storing circuit; and a control circuit for controlling the intensity of the slit light beam into a predetermined level depending on at least one of the width and maximum value detected for that light line for each horizontal scan.

19. The XYZ coordinates measuring system as defined in claim 1 wherein said slit light source means comprises a cross-shaped slit light source for projecting first and second slit light beams onto the work, said first and second slit light beams perpendicularly intersecting each other on a Z-axis in an orthogonal XYZ coordinate system, said first slit light beam being parallel to the XZ plane while said second slit light beam being parallel to the YZ plane, and a slit light switching circuit for performing the alternate projection of said first and second slit light beams from said cross-shaped slit light source and wherein said television camera means includes first and second television cameras for taking of light lines formed on the work by said slit light beams, said first television camera extending the vertical axis of its imaging device substantially parallel to the X-axis while said second television camera being positioned to extend the vertical axis of its imaging device substantially parallel to the Y-axis, and a television camera switching circuit for selecting the output signal of said first television camera when the slit light beam is projected onto the work or the output signal of said second television camera when the second slit light beam is projected onto the work and wherein said coordinate measuring circuit processes the output of said television camera switching circuit to output an XZ coordinate when the first slit light beam is projected and a YZ coordinate when the second slit light beam is projected.

20. An XYZ coordinates measuring system comprising:

a slit light source means including a slit light source for projecting a slit light beam onto a surface of a work to be measured with a predetermined angle;

television camera means for taking a light line formed on the surface of the work by said slit light beam to generate an output video signal; and coordinate measuring circuit means including:

a light line detecting circuit for outputting light line detection signals based on said video signal, a horizontal imaging position detecting circuit for adding addresses at the positive and negative edges to generate a horizontal imaging position Ks during a period for which light line detection signals are being output from said light line detecting surface, a vertical imaging position detecting circuit for detecting a vertical imaging position Ls based on said video signal, and look-up table means for previously storing an interrelationhsip between horizontal and vertical imaging positions of said light line and XYZ coordinates thereof on said surface of the work, thereby outputting XYZ coordinates on the surface of the work from said look-up table means, based on detected values of the horizontal and vertical imaging positions Ks and Ls, whereby the XYZ coordinates on the surface of the work are real-time measured along the light line.

* * * * *